United States Patent
Inoue et al.

(10) Patent No.: US 7,830,107 B2
(45) Date of Patent: Nov. 9, 2010

(54) SAFETY DEVICE FOR POWER WINDOW

(75) Inventors: Satoshi Inoue, Kanagawa (JP); Masayuki Kato, Kanagawa (JP); Kazushi Hirose, Kanagawa (JP); Takao Koba, Osaka (JP); Yoshihiro Fujimura, Osaka (JP); Minoru Tanaka, Osaka (JP); Hiroki Nishida, Osaka (JP); Takashi Inoue, Osaka (JP)

(73) Assignees: Shiroki Kogyo Co., Ltd., Kanagawa (JP); Tachibana ELETECH Co., Ltd., Osaka (JP)

( * ) Notice: Subject to any disclaimer, the term of this patent is extended or adjusted under 35 U.S.C. 154(b) by 385 days.

(21) Appl. No.: 11/988,227

(22) PCT Filed: Jul. 3, 2006

(86) PCT No.: PCT/JP2006/313240
§ 371 (c)(1),
(2), (4) Date: Jan. 3, 2008

(87) PCT Pub. No.: WO2007/004617
PCT Pub. Date: Jan. 11, 2007

(65) Prior Publication Data
US 2009/0206784 A1    Aug. 20, 2009

(30) Foreign Application Priority Data
Jul. 4, 2005    (JP) .............................. 2005-195043
Jul. 4, 2005    (JP) .............................. 2005-195044
Feb. 21, 2006  (JP) .............................. 2006-043893

(51) Int. Cl.
G05B 5/00    (2006.01)
(52) U.S. Cl. .................. 318/470; 318/434; 318/490
(58) Field of Classification Search ............... 318/470, 318/434, 490, 453, 15, 400.09, 400.23; 388/803
See application file for complete search history.

(56) References Cited
U.S. PATENT DOCUMENTS
2007/0110125 A1 * 5/2007 Fujita et al. ................ 375/130

* cited by examiner

Primary Examiner—Karen Masih
(74) Attorney, Agent, or Firm—Finnegan, Henderson, Farabow, Garrett & Dunner L.L.P.

(57) ABSTRACT

A safety device for power window comprises a storage unit for storing the pulse width change rate of continuous pulses detected by a pulse width detector during a window glass raising operation at a reference timing, a calculation unit for calculating the pulse width change rate of continuous pulses detected by the pulse width detector during a window glass raising operation at an operational timing and a control unit for comparing the stored value of a pulse width change rate with the calculated value of a pulse width change rate and driving a motor for raising/lowering window glass in a window opening direction when a total of differences between the both pulse change rates exceeds an allowable value.

29 Claims, 30 Drawing Sheets

Fig. 14
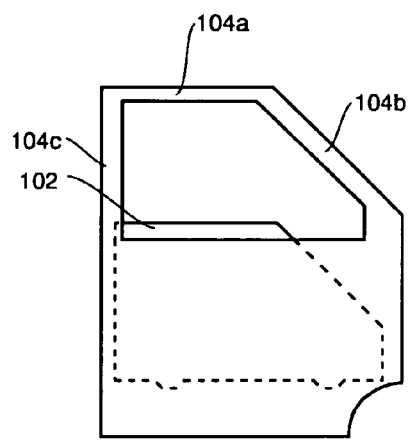
(a)
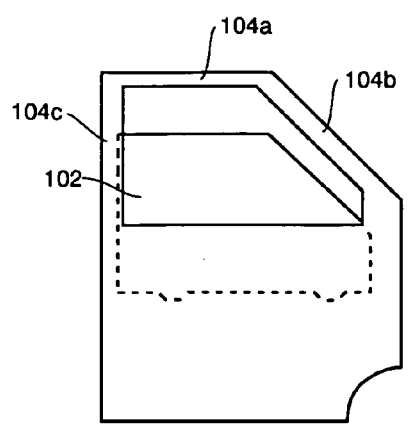
(b)
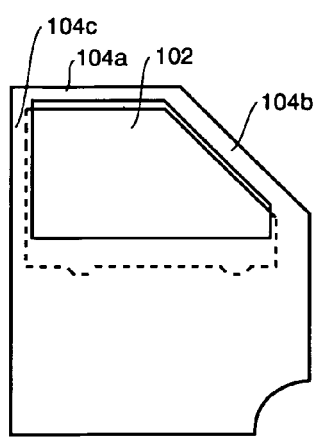
(c)
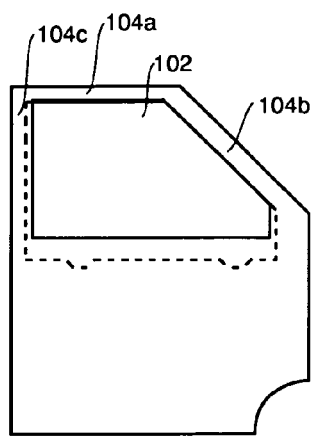
(d)
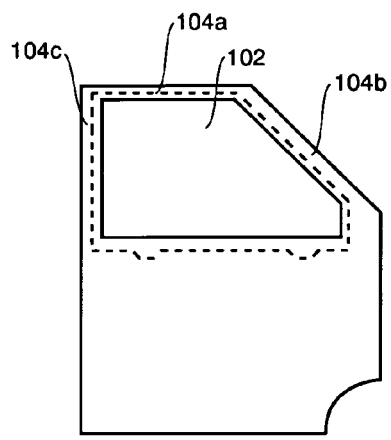
(e)

SAFETY DEVICE FOR POWER WINDOW

CROSS REFERENCE TO RELATED APPLICATION

This application is a national phase application based on PCT/JP2006/313240, filed Jul. 3, 2006, which claims the priority of Japanese Patent Application Nos. 2005-195043, filed Jul. 4, 2005; 2005-195044, filed Jul. 4, 2005; and 2006-043893, filed Feb. 21, 2006, the content of all of which is incorporated herein by reference.

TECHNICAL FIELD

The present invention relates to a safety device for power window of a vehicle door, and particularly relates to a device for preventing a human body or the like from being pinched by a power window.

BACKGROUND ART

In a power window that raises and lowers a window glass of a vehicle by drive force of a raising/lowering motor, when the window glass is gradually closed by continuously setting an operational switch to be on in a closing direction, a foreign substance may be pinched between the window glass and a window frame.

Thus, a safety device is proposed, in which a detection device is provided for detecting a fact that the foreign substance is pinched between the window glass and the window frame, and when the device detects pinching, it reversely drives a motor to lower the window glass irrespectively of a state of the operational switch (for example, refer to patent document 1). As one pinching detection device in the safety device, a device is known, in which repetitive pulses are generated in accordance with rotational frequency (angle) of the raising/lowering motor, and increase in width of each of the pulses is detected, thereby occurrence of pinching is determined. That is, pulse width in a normal condition is previously stored, and when a value of pulse width during operation is increased to an allowable value or more, the detection device determines that pinching of the foreign substance occurs.

Furthermore, an invention is proposed, in which half pulse width from a rising edge to a trailing edge of a pulse outputted from an encoder and half pulse width from a trailing edge to a rising edge of the pulse are measured to improve accuracy of pinching detection.

Since the raising/lowering motor is driven by a battery mounted in a vehicle, rotational frequency (rotational speed) of the motor is inevitably varied due to variation in voltage of the battery. When rotational speed is varied, pulse width is also varied in accordance with variation of the rotational speed. Therefore, when accurate pinching detection is tried to be performed, possibility of false detection is increased. That is, possibility of false operation is increased: while increase in pulse width is actually due to reduction in source voltage of the battery, the increase may be falsely determined to be caused by pinching of a foreign substance at relatively high possibility. This is completely the same in the case that a source voltage is increased above a reference voltage due to some reason.

Raising speed of the window glass is not constant due to change in sliding resistance or the like even after a certain period has passed from start, and may be changed due to aged deterioration or the like. Therefore, an error is large in a detection method based on detection of increase in pulse width, consequently pinching may be falsely detected at a higher possibility although pinching does not actually occur. Furthermore, in the encoder, a rotational angle during a high level from a rising edge to a trailing edge of a pulse may not be equal to a rotational angle during a low level from a trailing edge to a rising edge of the pulse. When the encoder itself includes an error in this way, a further large error occurs in the method based on detection of half pulse width, leading to increase in possibility of false pinching detection in spite of a fact that pinching does not actually occur.

As a usual example of the encoder, an encoder has been given, in which a cylindrical rotor including a magnet having a plurality of magnet poles is concentrically fixed on a rotating shaft of a raising/lowering motor for raising and lowering a window glass (for example, refer to patent document 2).

In this device, a plurality of N poles and S poles are disposed in a circumferential direction of the rotating shaft of the motor, and a magnetosensitive element disposed near the rotor is used to detect a rotational angle and a rotational direction of the motor rotating shaft, and such detection data are used to detect pinching.

In the device, a larger number of magnetic poles have been necessary to be provided to improve accuracy of pinching detection. However, a magnet having a plurality of magnetic poles is a member high in unit price, causing increase in cost of the device. Moreover, the device has a problem that much time is taken to provide the plurality of magnetic poles, leading to reduction in productivity of the device.

As an approach of controlling a power window, a method is given, in which an automatic mode where a window glass is reciprocated with operation of a user as a trigger between a closing position and an opening position of a window frame while avoiding pinching of a foreign substance, and a manual mode where the window glass is reciprocated according to operation of the user between the closing position and the opening position of the window frame are provided, and when false pinching avoidance is repeated in the automatic mode, the automatic mode is prohibited and only the manual mode is valid (for example, refer to patent document 3).

In such a case, to respond to temporal change in load condition of a motor, learning is conducted on a load condition of the motor in the case that pinching does not occur, and determination of pinching is made based on contents of the learning (for example, refer to patent document 4).

When the automatic mode is stopped due to repeated, false pinching avoidance, a user needs to perform opening and closing of the window in the manual mode. Moreover, even if an automatic mode recovery procedure is described in a manual, the user often does not see the manual, or even if the user sees the manual, it may not necessarily act just according to an instruction of the manual.

When the automatic mode is stopped due to repeated, false pinching avoidance, the user needs to perform full closing of the window in the manual mode. However, since pinching avoidance is not performed in the manual mode, for example, when a power window for a rear seat is closed by operation from a driver seat side, careless pinching of a human body may occur. When pinching avoidance is allowed even in the manual mode in order to avoid this, the window cannot be fully closed when false pinching avoidance is performed.

When a window glass during lowering is reversely raised, a load of a motor is changed in a manner that it is temporarily unloaded and then suddenly increased in the initial stage of raising due to backlash or play of a gear series or wire system. For the initial stage, a threshold value for pinching detection is previously set large compared with a typical threshold value so that such sudden load increase is not misrecognized as pinching of a foreign substance (for example, refer to patent document 5).

In this method, pinching detection sensitivity is bad in the initial stage of the reverse raising of the window glass, since the threshold value is large. Therefore, the pinching avoidance is substantially invalidated, and when pinching actually occurs, large force is applied to an object. In addition, since a period in which the large threshold value is used is set comparatively long in consideration of individual difference of the power window or the like, the large force is applied to the pinched object for a further long time.

When a door is closed during raising the window glass, false reverse-movement of the window glass may occur due to variation in load caused by shock or vibration associated with the door closing. To avoid this, the threshold value is temporarily increased, or a pinching prevention function is temporarily invalidated during door closing. While opening or closing of the door is determined based on an on or off state of a courtesy switch or the like, when a system recognizes the door closing after occurrence of the load variation due to delay in detection of the state of the courtesy switch or delay in transmission of a detection signal or the like, the false reverse-movement of the window glass cannot be prevented (for example, refer to patent documents 6 and 7).

Patent document 1: JP-A-2002-46468
Patent document 2: JP-A-2003-336444
Patent document 3: JP-A-7-317430
Patent document 4: JP-A-10-331524
Patent document 5: JP-A-7-113375
Patent document 6: JP-A-9-32414
Patent document 7: JP-A-9-328964

DISCLOSURE OF THE INVENTION

An object of the invention is to obtain a safety device for power window, in which even if voltage variation occurs in a battery, false detection (false operation) may hardly occur.

The safety device for power window according to the invention is characterized by having a raising/lowering motor that raises or lowers a window glass of a vehicle; an operational switch that provides a positive or negative rotation instruction to the raising/lowering motor; a pulse generator that generates repetitive pulses in accordance with the amount of rotation of the raising/lowering motor; a window position counter that counts the pulses generated by the pulse generator to obtain opening information of the window glass; a pulse width detector that detects pulse width of each of the pulses generated by the pulse generator; a calculation unit that extracts predetermined, particular two kinds of pulse width from a plurality of kinds of pulse width detected by the pulse width detector, and calculates a change rate between the extracted, two kinds of pulse width while relating the change rate to window position information given by the window position counter; a storage unit that stores the change rate of pulse width calculated by the calculation unit in a certain reference setting condition, the change rate being related to the window position information; and a control unit that compares respective stored values of the change rate of pulse width stored by the storage unit, the change rate being related to the window position information, to respective calculation values of the change rate of pulse width calculated by the calculation unit during raising operation of the window glass, the change rate being related to the window position information, and when the total of differences between both change rates of pulse width exceeds an allowable value, drives the raising/lowering motor in a direction of opening the window glass irrespectively of a state of the operational switch.

The predetermined, particular two kinds of pulse width may include not only pulse width of each of continuous two pulses, but also pulse width of each of two pulses being separated by particular, several pulses from each other.

The control unit can perform storage of the change rate of pulse width between two pulses into the storage unit at least in vehicle manufacturing. Furthermore, the control unit regularly updates the storage, so that it can respond to temporal deterioration.

According to the invention, a safety device for power window can be obtained, in which even if voltage variation occurs in a battery, and variation in pulse width occurs due to the voltage variation, the variation in pulse width is not determined as pinching of a foreign substance, and consequently false operation does not occur.

Moreover, another object of the invention is to obtain a safety device for power window, in which even opening and closing speed is not constant due to sliding resistance occurring when the window glass is opened and closed or the like, false detection (false operation) may hardly occur.

The safety device for power window according to the invention is characterized by having a raising/lowering motor that raises or lowers a window glass of a vehicle; an operational switch that provides a rotation instruction for raising or lowering to the raising/lowering motor; a pulse generator that generates repetitive pulses in accordance with the amount of rotation of the raising/lowering motor; a window position counter that counts the pulses outputted by the pulse generator to obtain opening information of the window glass; a pulse width detector that detects width of each pulse generated by the pulse generator; a storage unit that stores each pulse width detected by the pulse width detector while relating the pulse width to window position information given by the window position counter during raising operation of the window glass in a reference condition; and a control unit that compares the pulse width measured by the pulse width detector during raising operation of the window glass, to reference pulse width corresponding to the window position information given by the window position counter, and when a difference between the two kinds of pulse width exceeds an allowable value, reversibly drives the raising/lowering motor in a direction of opening the window glass irrespectively of a state of the operational switch.

The window position counter counts the pulses generated by the pulse generator every half cycle of the pulses, the pulse width detector detects width in a half cycle of the pulses, and the storage unit can store the pulse width obtained in the half cycle of the pulses while relating the pulse width to the window position information.

The storage of the pulse width in the reference condition and the window position information into the storage unit is updated regularly or when update switch means is operated, thereby the safety device can respond to temporal deterioration.

According to the invention, a safety device for power window can be obtained, in which even if opening and closing speed is not constant due to sliding resistance occurring when the window glass is opened and closed or the like, such inconstant speed is not falsely determined as pinching of a foreign substance, and consequently false operation does not occur.

Moreover, still another object of the invention is to obtain a safety device for power window, which has an encoder that enables highly accurate pinching detection, and is excellent in productivity.

The safety device for power window of the invention is characterized by having a raising/lowering motor that raises or lowers a window glass of a vehicle door, in which a rotor having a plurality of irregularities with constant intervals on an outer circumferential face of the rotor is provided on a rotating shaft of the motor; an operational switch that provides a positive or negative rotation instruction to the raising/lowering motor; light emitting means that emit light to the outer circumferential face of the rotor; pulse generation means that receives reflected light from the outer circumferential face, and generates pulses depending on quantity of radiation of the reflected light; and control means that reversely rotates the raising/lowering motor to lower the window glass irrespectively of a state of the operational switch based on a cycle of the pulses generated by the pulse generation means during raising operation of the window glass.

The rotor can be formed of resin material or metal material by molding. A light-reflective layer is preferably provided on at least a convex portion in the outer circumferential face. The light emitting means are disposed with constant angular intervals with respect to a central axis of the rotor, and more preferably have two light emitting sections that emit light to the outer circumferential face respectively.

According to the invention, the rotor is provided on the rotating shaft of the raising/lowering motor, and pinching is detected by using a cycle of the pulses based on the reflected light from the outer circumferential face of the rotor, thereby highly accurate pinching detection can be performed while controlling reduction in productivity of the device.

Moreover, still another object of the invention is to achieve a safety device for power window, in which a user easily recovers an automatic mode.

A control unit of a safety device for power window of the invention is characterized in that when false pinching avoidance occurs in an automatic mode, the control unit moves the window glass in a direction of opening a window frame, and prohibits the automatic mode; when duration time of operation of a user reaches a predetermined time in a condition that the window frame is fully closed in a manual mode, the operation being for moving the window glass in a direction of closing the window frame, the control unit recovers the automatic mode; and when the operation is stopped before the window frame is fully closed, or the duration time of the operation is shorter than the predetermined time in the condition that the window frame is fully closed in the manual mode, the control unit moves the window glass in the direction of opening the window frame.

According to the invention, when false pinching avoidance occurs in the automatic mode, the control unit moves the window glass in the direction of opening the window frame, and prohibits the automatic mode; when duration time of operation of a user reaches the predetermined time in a condition that the window frame is fully closed in the manual mode, the operation being for moving the window glass in the direction of closing the window frame, the control unit recovers the automatic mode; and when the operation is stopped before the window frame is fully closed, or the duration time of the operation is shorter than the predetermined time in the condition that the window frame is fully closed in the manual mode, the control unit moves the window glass in the direction of opening the window frame, therefore the safety device for power window can be achieved, in which a user easily recovers the automatic mode.

Moreover, a control unit of a safety device for power window of the invention is characterized in that when false pinching avoidance occurs in an automatic mode, the control unit invalidates previous learning contents and moves the window glass in a direction of opening a window frame, and prohibits the automatic mode; the control unit starts learning for pinching avoidance with start of operation of a user for moving the window glass in a direction of closing the window frame in a manual mode; when duration time of the operation reaches a predetermined time in a condition that the window frame is fully closed in the manual mode, the control unit finishes the learning for pinching avoidance, and recovers the automatic mode; and in the manual mode, when the operation is stopped before the window frame is fully closed, or the duration time of the operation is shorter than the predetermined time in the condition that the window frame is fully closed, the control unit stops the learning, and moves the window glass in the direction of opening the window frame.

The learning is learning in a learning area in a movement area of the window glass, the movement area being divided into two areas of the learning area and a non-learning area, and the movement of the window glass in the direction of opening the window frame is movement to the non-learning area.

According to the invention, when false pinching avoidance occurs in the automatic mode, the control unit invalidates the previous learning contents and moves the window glass in the direction of opening the window frame, and prohibits the automatic mode; the control unit starts the learning for pinching avoidance with start of the operation of a user for moving the window glass in the direction of closing the window frame in the manual mode; when the duration time of the operation reaches the predetermined time in the condition that the window frame is fully closed in the manual mode, the control unit finishes the learning for pinching avoidance, and recovers the automatic mode; and in the manual mode, when the operation is stopped before the window frame is fully closed, or the duration time of the operation is shorter than the predetermined time in the condition that the window frame is fully closed, the control unit stops the learning, and moves the window glass in the direction of opening the window frame, therefore the safety device for power window can be achieved, in which a user easily recovers the automatic mode.

Moreover, when successive, false reverse-movement occurs, relearning of pulse width or capacitance is performed and then the automatic mode is recovered. Therefore, a threshold value for pinching determination is updated based on a result of the relearning, so that proper pinching avoidance can be performed in an automatic mode after recovery.

Since the learning is learning in the learning area in the movement area of the window glass being divided into the two areas of the learning area and the non-learning area, and the movement of the window glass in the direction of opening the window frame is movement to the non-learning area, learning can be efficiently performed, and a user can easily know an unrecovered state of the automatic mode.

Moreover, still another object of the invention is to achieve a safety device for power window, in which pinching can be avoided, and an opening can be fully closed even in the manual mode.

A control unit of a safety device for power window of the invention is characterized by having detection means that detects a load condition of a motor for driving a movable plate; and control means that allows operation of pinching avoidance based on a comparison result between a first threshold value and a detection signal from the detection means in an automatic mode, and allows operation of pinching avoidance based on a comparison result between a second threshold value and the detection signal from the detection means in a manual mode.

Moreover, the control unit is characterized by having display means that displays pinching detection in the manual mode. Moreover, the control unit is characterized by having cancelling means that cancels the display when an opening is fully closed. Moreover, the control unit is characterized in that the control means concentrically controls at a place opening-and-closing devices being dispersedly disposed in a plurality of places.

Moreover, the control unit is characterized in that the control means increases the second threshold value when pinching avoidance is repeated in the manual mode. Moreover, the control unit is characterized in that the control means does not allow operation of pinching avoidance after a repetition number of pinching avoidance reaches a predetermined number in the manual mode. Moreover, the control unit is characterized by having storage means that stores history of pinching avoidance in the manual mode. Moreover, the control unit is characterized by having erasing means that erases the history when an opening is fully closed.

Moreover, the control unit is characterized in that the detection means has conversion means that converts rotational frequency of a motor for driving a movable plate into two-phase pulses having a phase difference of 90 degrees in which pulse width is inversely proportional to the rotational frequency; pulse width measurement means that measures pulse width of the two-phase pulses at timing of each of rising and trailing edges of the two-phase pulses given by the conversion means respectively; and change measurement means that measures change in pulse width of the measured two-phase pulses respectively. Moreover, the control unit is characterized in that the change measurement means measures change in pulse width with respect to a pulse at least one cycle before the relevant pulse.

According to the invention, the control unit has the detection means that detects the load condition of the motor for driving the movable plate; and the control means that allows operation of pinching avoidance based on the comparison result between the first threshold value and the detection signal from the detection means in the automatic mode, and allows operation of pinching avoidance based on the comparison result between the second threshold value and the detection signal from the detection means in the manual mode, therefore a control device can be achieved, in which pinching can be avoided even in the manual mode, and an opening can be fully closed.

Moreover, since the control unit has the display means that displays pinching detection in the manual mode, occurrence of an abnormal state can be demonstrated. Moreover, since the control unit has the cancellation means that cancels the display when the opening is fully closed, cancellation of the abnormal state can be demonstrated. Moreover, since the control means concentrically controls at a place the opening-and-closing devices being dispersedly disposed in the plurality of places, the opening-and-closing devices situated in separated places can be controlled at a place.

Moreover, since the control means increases the second threshold value when pinching avoidance is repeated in the manual mode, false pinching avoidance can be finally finished. Moreover, since the control means does not allow operation of pinching avoidance after a repetition number of pinching avoidance reaches the predetermined number in the manual mode, full closing of an opening can be performed. Moreover, since the control unit has the storage means that stores history of pinching avoidance in the manual mode, a measure can be taken in response to the history. Moreover, since the control unit has the erasing means that erases the history when an opening is fully closed, a state can be returned to an initial control state.

Moreover, the detection means has the conversion means that converts rotational frequency of the motor for driving the movable plate into the two-phase pulses having a phase difference of 90 degrees in which pulse width is inversely proportional to the rotational frequency; the pulse width measurement means that measures pulse width of the two-phase pulses at timing of each of rising and trailing edges of the two-phase pulses given by the conversion means respectively; and the change measurement means that measures change in pulse width of the measured two-phase pulses respectively, therefore change in rotational frequency can be obtained in a time interval shorter than one cycle. Moreover, since the change measurement means measures change in pulse width from a pulse at least one cycle before the relevant pulse, a difference value of pulse width can be obtained.

Moreover, still another object of the invention is to achieve a safety device for power window having a control device that optimizes an invalid period of pinching avoidance for each of opening-and-closing devices when a movable plate is reversely moved.

A control unit of a safety device for power window of the invention is characterized by having invalidation means that invalidates pinching avoidance in an initial stage of movement of a movable plate in a direction opposite to a direction in which the movable plate has been moved; and setting means that sets a period in which the pinching avoidance is invalidated through learning of the period.

The setting means learns the period based on stability of rotational frequency of a motor for driving the movable plate. The stability is stability of rotational frequency that has temporarily increased and then decreased. Moreover, the control unit is characterized by having storage means that stores the period.

According to the invention, since the control unit has the invalidation means that invalidates pinching avoidance in the initial stage of movement of the movable plate in a direction opposite to a direction in which the movable plate has been moved; and the setting means that sets the period in which the pinching avoidance is invalidated through learning of the period, the control unit can optimize the invalidation period of pinching avoidance for each opening-and-closing device when the movable plate is reversely moved.

Moreover, since the setting means learns the period based on stability of rotational frequency of the motor for driving the movable plate, the setting means appropriately performs the learning of the invalidation period. Moreover, since the stability is stability of rotational frequency that has temporarily increased and then decreased, the setting means can learn an optimum invalidation period. Moreover, since the control unit has the storage means that stores the period, control of pinching avoidance can be effectively performed when the movable plate is reversely moved.

Moreover, still another object of the invention is to achieve a safety device for power window with a pinching prevention function, which is excellent in stability in door closing.

A control unit of a safety device for power window of the invention is characterized by having adjustment means that adjusts the threshold value such that pinching detection sensitivity is relatively low in an opening state of the door, and the pinching detection sensitivity is relatively high in a closing state of the door.

The adjustment means keeps a threshold value to which the pinching detection sensitivity is relatively low until a predetermined time passes after the door is closed.

According to the invention, since the control unit has the adjustment means that adjusts the threshold value such that pinching detection sensitivity is relatively low in the opening state of the door, and the pinching detection sensitivity is relatively high in the closing state of the door, a control device of power window with a pinching prevention function, which is excellent in stability in door closing, can be achieved.

Since the adjustment means keeps the threshold value to which the pinching detection sensitivity is relatively low until the predetermined time passes after the door is closed, a safety for power window with a pinching prevention function, which is further excellent in stability in door closing, can be achieved.

BRIEF DESCRIPTION OF THE DRAWINGS

FIG. 12 shows a block diagram of a power window using a safety device of an example of the best mode for carrying out the invention;

FIG. 14 shows diagrams showing raising and closing states of the window glass;

FIG. 26 shows a flowchart of operation of a safety device of an example of the best mode for carrying out the invention;

BEST MODE FOR CARRYING OUT THE INVENTION

Figure 1:
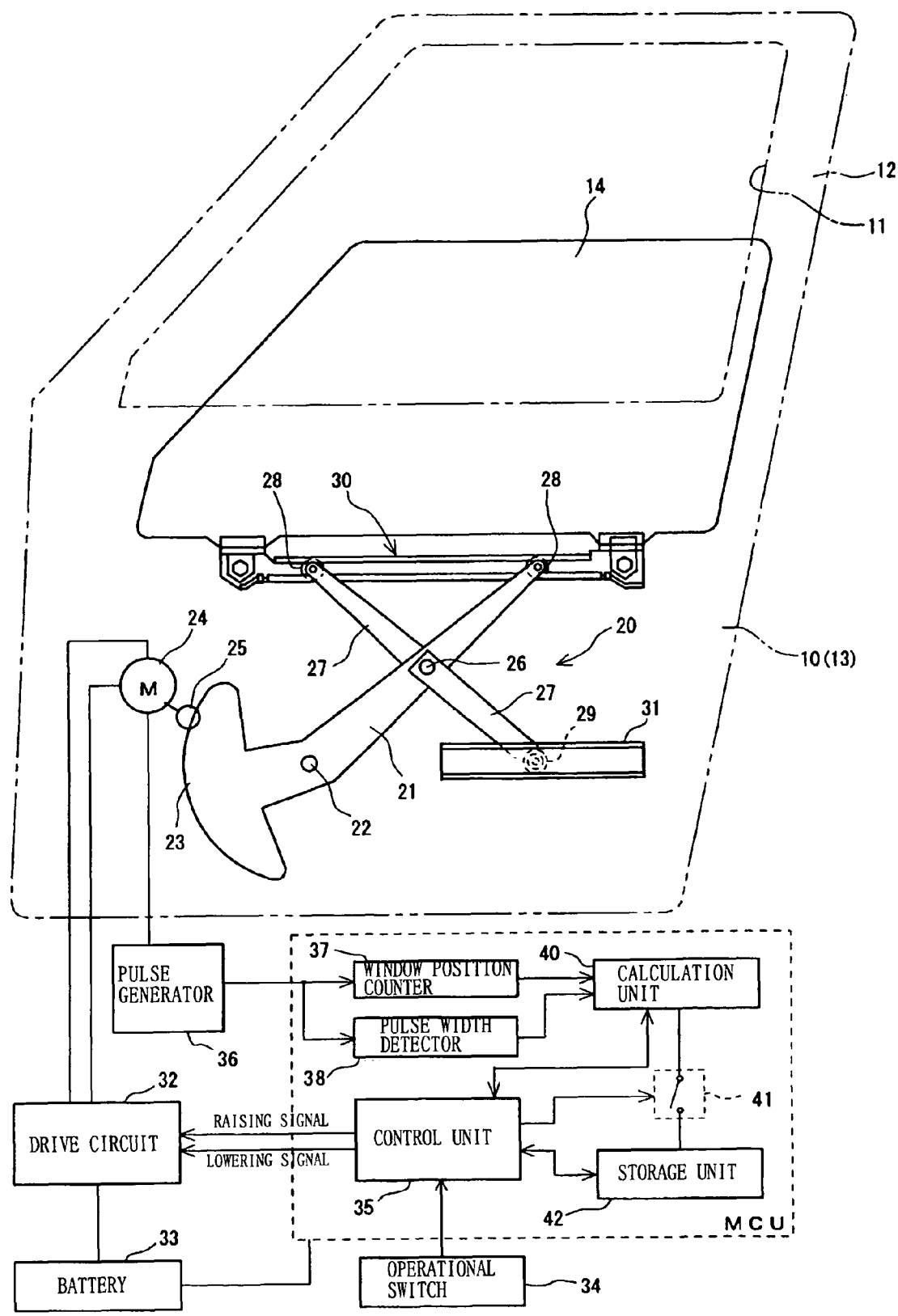
FIG. 1 shows a system connection diagram showing an embodiment in which a safety device for power window according to the invention is applied to an X-arm type power window.

FIG. 1 shows an example where the invention is applied to a vehicle door 10 having an X-arm type power window (regulator) 20. The vehicle door 10 has a sash part 12 having a window opening 11 in an upper side, and a panel part 13 in a lower side. The window opening 11 is opened and closed by a window glass 14.

The X-arm type power window 20 for raising and lowering the window glass 14 is supported in the panel part 13. That is, in the panel part 13, a lift arm 21 of the X-arm type power window 20 is swingably supported by a shaft 22, and the lift arm 21 integrally has a sector gear (driven gear) 23 with the shaft 22 as a center. The sector gear 23 is engaged with a pinion 25 that is rotationally driven by a raising/lowering motor 24.

A middle portion in a longitudinal direction of the lift arm 21 is pivotally connected with a middle portion of an equalizer arm 27 by a shaft 26. A guide piece (roller) 28 is pivotally attached in a rotatable manner to an upper end portion (tip) of each of the lift arm 21 and the equalizer arm 27. Similarly, a guide piece (roller) 29 is pivotally attached to a lower end portion of the equalizer arm 27.

Each of the guide pieces 28 of the lift arm 21 and the equalizer arm 27 is movably fitted in a window glass bracket 30 fixed to a lower end of the window glass 14, and the guide piece 29 of the equalizer arm 27 is movably guided in an equalizer arm bracket 31 to be fixed in the panel part 13.

In the X-arm type power window 20, when the pinion 25 is driven positively and negatively via the raising/lowering motor 24, the lift arm 21 swings with the shaft 22 as a center via a sector gear 23, as a result, the window glass bracket 30 (window glass 14) moves up and down while being held in an approximately horizontal manner by the equalizer arm 27, guide pieces 28, 29, and equalizer arm bracket 31. Such up and down motion itself is the same as motion of the typical X-arm type power window 20.

The raising/lowering motor 24 is driven positively and negatively by a drive circuit 32. That is, the drive circuit 32 to be applied with a current from a battery 33 is supplied with a raising signal or a lowering signal via an operational switch 34 and a control unit 35, and drives the raising/lowering motor 24 positively and negatively according to the signal. Moreover, a pulse generator 36 is provided for the raising/lowering motor 24, which generates a pulse in accordance with a rotational angle (frequency) of the motor (generates a pulse every time when a rotating shaft rotates by a certain angle).

While the pulse generator 36 is described later, for example, in a pulse generator using a Hall element, a magnet rotor is fixed on a shaft of the raising/lowering motor 24, which is circumferentially magnetized in repetitive order of N and S, and a Hall element disposed adjacently to the magnet rotor generates pulses in accordance with rotation (angle) of the motor rotating shaft. Moreover, two Hall elements are disposed in the raising/lowering motor 24, thereby a rotation direction of the raising/lowering motor 24 can be known, that is, whether the window glass 14 is in raising operation (window closing operation) or in lowering operation (window opening operation) can be known. Such detection means of the rotation direction of the raising/lowering motor 24 is well known. Furthermore, the rotation direction of the raising/lowering motor 24 can be detected from a state of an operational switch 34.

The pulses from the pulse generator 36 are inputted into a window position counter 37 and a pulse width detector 38. The window position counter 37 counts the pulses from the pulse generator 36 and thus obtains opening information of the window glass 14. The window opening information can be obtained depending on the number of pulses generated by the pulse generator 36 in a period from a fully opened state to a fully closed state of the window glass 14. In the embodiment, the number of pulses is assumed to be 400.

Figure 2:
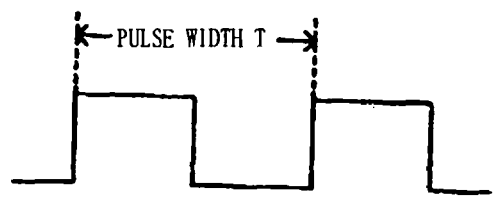
FIG. 2 shows a diagram showing pulses generated by a pulse generator and pulse width of the pulses.

The pulse width detector 38 detects width of a pulse inputted from the pulse generator 36. As the pulse width, an interval (time) from a rising edge to a next rising edge (or from a trailing edge to a next trailing edge) of pulses as illustrated in FIG. 2 is measured. Such a pulse width detector is well known.

The window opening information given by the window position counter 37 and pulse width information given by the pulse width detector 38 are continuously provided to a calculation unit 40, and the calculation unit 40 calculates a change rate of width between two adjacent pulses, which are successively inputted when the window glass 14 is raised, while relating the change rate to the window opening information of the window glass 14. That is, in the example, the degree of opening of the window glass 14 can be detected with a resolution of a first pulse to a 400th pulse counted by the window position counter 37, and the calculation unit 40 calculates a change rate of a change rate of width between successive, two pulses (width of a Nth pulse and width of a (N+1)th pulse (N includes 1 to 399)) for all pulses generated during raising operation of the window glass. With a specific example, when width (time) of the Nth pulse is, for example, 10 ms, and width (time) of the (N+1)th pulse is 10.1 ms, a change rate between them is calculated as (10.1−10)/10=0.01 (1%). The above change rate of pulse width is calculated according to all the window opening information.

A storage unit 42 stores a calculation result of the calculation unit 40 when a setting (update) switch 41 is turned on via the control unit 35, that is, stores the change rate of width between the successive, two pulses when the window glass 14 is raised while relating the change rate to the window opening information. The storage operation is performed at least in manufacturing of a vehicle. It can be performed regularly or at optional timing.

Figure 3:
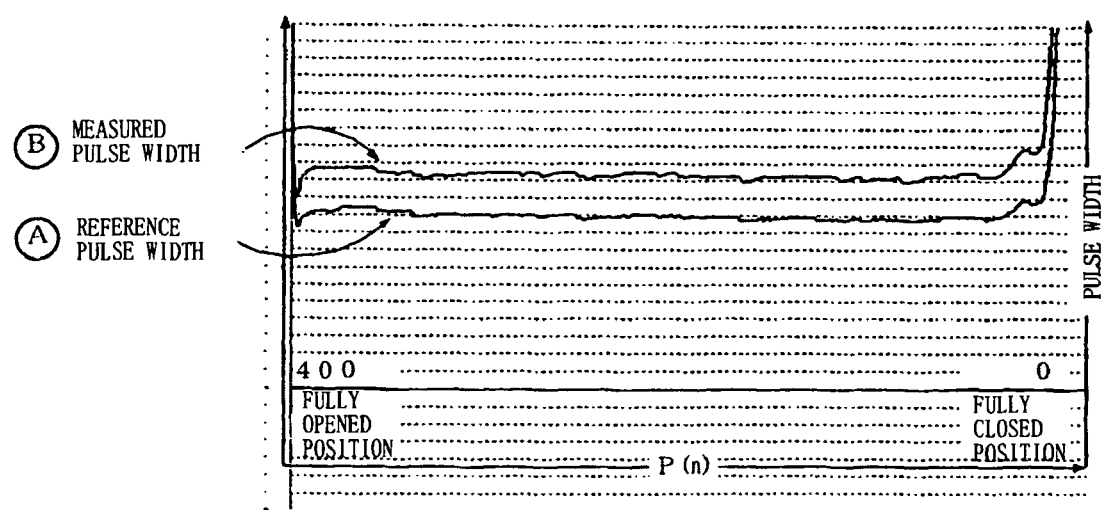
FIG. 3 shows a graph showing a distribution example of pulse width to a degree of window opening in a reference condition, and a distribution example of pulse width to a degree of window opening in a dropped-battery-voltage condition.

FIG. 3 is a diagram depicting an example of change in pulse width in both of a case that a voltage of a battery 33 is normal (reference condition) (A) and a case that the voltage of the battery 33 is dropped (B), when window opening information (pulse number) is plotted in a horizontal axis, and pulse width is plotted in a vertical axis. As shown in the figure, it is recognized that when the voltage of the battery 33 is dropped, rotational speed of the raising/lowering motor 24 is decreased, consequently pulse width generally tends to be increased.

The control unit 35 compares a stored value of the change rate of pulse width in relation to the window position information stored by the storage unit 42, to a calculated value of the change rate of pulse width in relation to the window position information calculated by the calculation unit 40. That is, when the total of differences between the change rate of pulse width between a Nth pulse and a (N+1) th pulse, which is calculated by the calculation unit 40 every time when the window glass 14 is raised, and the change rate of pulse width between a Nth pulse and a (N+1)th pulse, which is stored in the calculation unit 40, exceeds an allowable value, the raising/lowering motor 24 is reversely rotated to lower the window glass 14 via the X-arm type power window 20 irrespectively of a state of the operational switch 34 (even if the operational switch 34 is operated in a window closing direction).

Figure 4:
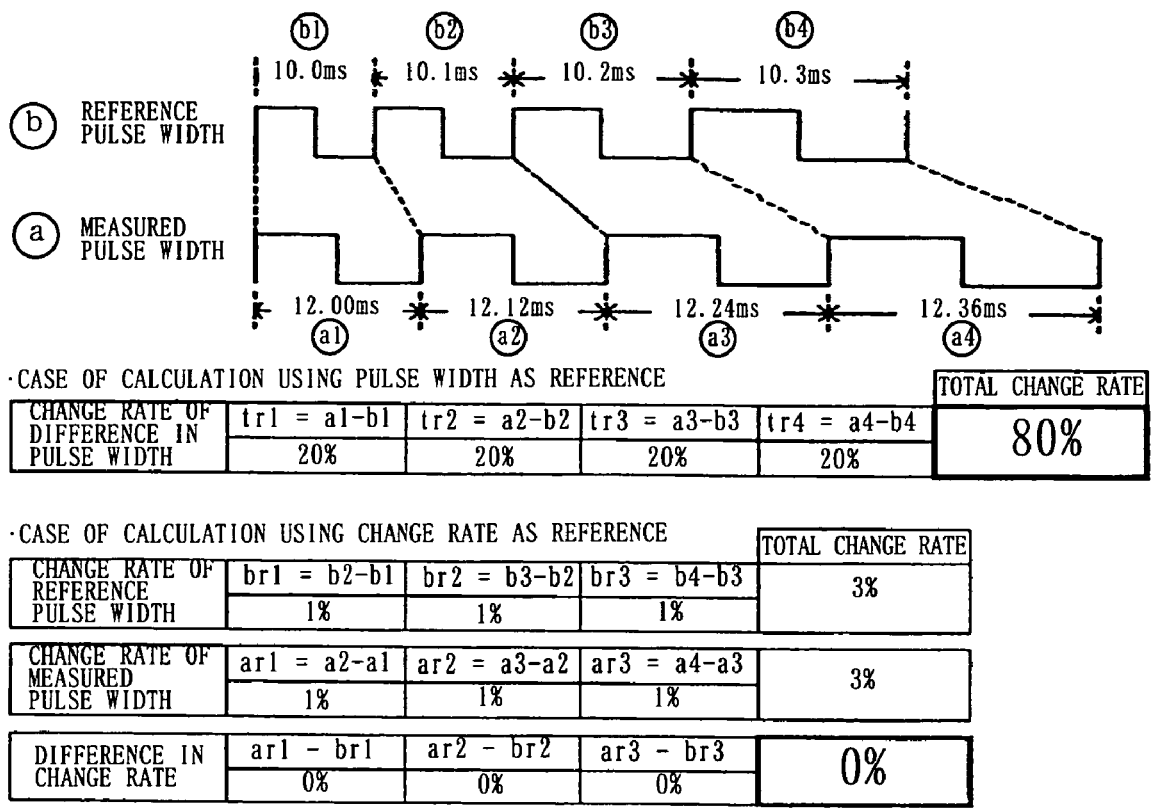
FIG. 4 shows a chart showing an example of control by the safety device for power window according to the invention.

FIG. 4 is a diagram for explaining the above control example using specific, numerical values. It is assumed that each of four kinds of pulse width b1, b2, b3 and b4 in a top stage in FIG. 4 corresponds to pulse width in the reference condition (in the case that a voltage of the battery 33 has a predetermined value) stored in the storage unit 42, and each of four kinds of pulse width a1, a2, a3 and a4 in a stage thereunder corresponds to pulse width calculated by the calculation unit 40 when the window glass 14 is raised and lowered in a condition that the voltage of the battery 33 is dropped. When the calculated pulse width a1, a2, a3 and a4 are simply compared to the stored pulse width b1, b2, b3 and b4 respectively, and differences in change rate between them are added, the total is as large as 80%, consequently a usual device may easily determine occurrence of pinching of a foreign substance. However, such increase in pulse width is not caused by the pinching of a foreign substance, but caused by voltage drop in the battery 33, and if a device determines occurrence of pinching of foreign substance at that time, false determination is effected.

On the other hand, a change rate of pulse width between successive, two pulses (or a pulse and a pulse several pulses before the pulse) stored by the storage unit 42 (change rate between b1 and b2, b2 and b3, and b3 and b4 respectively) is 1% respectively. Similarly, a change rate of pulse width between successive, two pulses calculated by the calculation unit 40 (change rate between a1 and a2, a2 and a3, and a3 and a4 respectively) is 1% respectively.

In the embodiment, respective differences between change rates of pulse width stored in the storage unit 42, and change rates of pulse width calculated by the calculation unit 40 are increasingly added, and when the total of the differences exceeds a certain value, pinching of a foreign substance is determined to occur. In the embodiment, any of (a change rate of pulse width between b1 and b2) minus (a change rate of pulse width between a1 and a2), (a change rate of pulse width between b2 and b3) minus (a change rate of pulse width between a2 and a3), and (a change rate of pulse width between b3 and b4) minus (a change rate of pulse width between a3 and a4) is 0%, and total sum of them is also 0%. Therefore, false determination of occurrence of pinching of a foreign substance is not made. That is, for example, in the case of uniform reduction in rotational speed of the raising/lowering motor 24 due to voltage drop in the battery, false detection of pinching of a foreign substance does not occur, which prevents false operation where the raising/lowering motor 24 is reversely rotated although a foreign substance is actually not pinched.

In the embodiment, the total of differences in change rate of pulse width, which is used for determining occurrence of pinching of a foreign substance, can be optionally set. Moreover, the invention does not consider a way to perform pinching of a foreign substance when the battery voltage is normal (reference value) as a subject of discussion.

In the embodiment, the invention was described with a case as an example that the voltage of the battery 33 is dropped compared with the reference voltage. However, the invention is still valid when the voltage of the battery 33 is increased compared with the reference voltage due to some reason. Moreover, while the power window in the shown example is a power window of the X-arm type, the invention can be used irrespectively of a type including wire type, if it is a motor-driven power window. Furthermore, the invention can be used not only for a side door of a vehicle, but also a back door, sunroof and the like.

Figure 5:
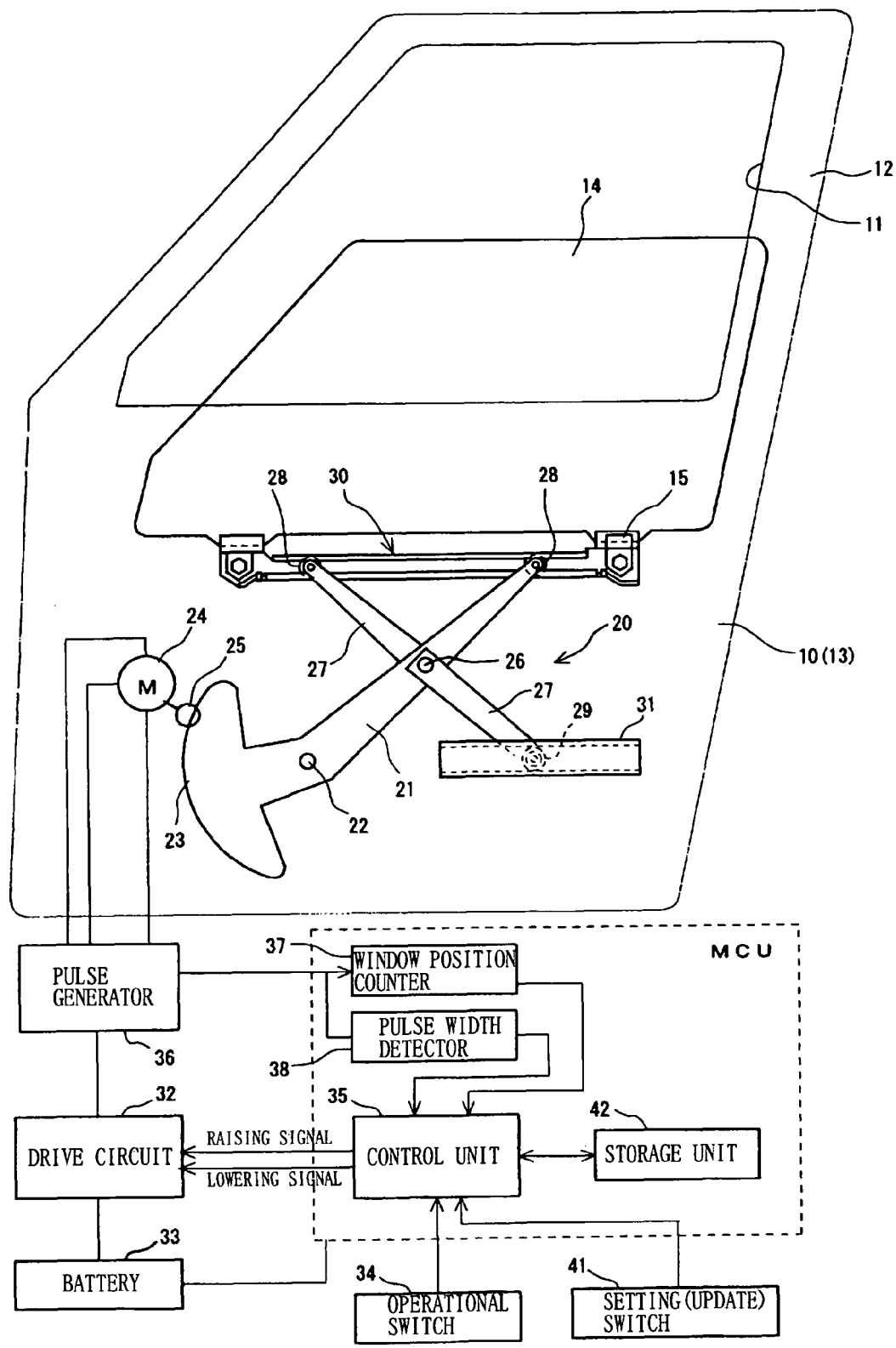
FIG. 5 shows a system connection diagram showing an embodiment in which a safety device for power window according to the invention is applied to the X-arm type power window.

FIG. 5 shows another example of the best mode for carrying out the invention. As shown in FIG. 5, pulses from a pulse generator 36 are inputted into a window position counter 37 and a pulse width detector 38. The window position counter 37 counts the number of pulses from the pulse generator 36 and thus obtains opening information of a window glass 14. The window opening information can be obtained depending on the number of pulses outputted by the pulse generator 36 when the window glass 14 is moved between a fully opened state and a fully closed state. In the embodiment, the window position counter 37 counts the pulses inputted from the pulse generator 36 every half cycle. That is, the window position counter 37 counts up or counts down every time when a rising edge or trailing edge of a pulse is detected. In the embodiment, assuming that the total number of pulses, which are generated in a period in which the window glass 14 is moved from the fully opened state to the fully closed state, is 800, and pulse number of the fully opened state is 0, and pulse number of the fully closed state is 800, window opening information is obtained from the pulse number. Furthermore, the pulse width detector 38 measures a count interval of the window position counter 37, that is, measures pulse width from the rising edge to the trailing edge of a pulse (high-level time), and pulse width from the trailing edge to the riding edge of the pulse (low-level time).

While duty of a pulse outputted by the pulse generator 36, that is, a ratio of high level time in a pulse cycle is ideally 50 percent, a certain tolerance occurs. FIG. 6(A) shows a waveform in the case of duty of 45 percent, wherein pulse width in a high level is 3.6 ms, and pulse width in a low level is 4.4 msec.

In a storage unit 42, data of window opening information (pulse number) and pulse width being related to the window opening information when the window glass 14 is driven from the fully opened position to the fully closed position are previously stored as reference pulse width data. When a setting (update) switch 41 is turned on, the control unit 35 measures pulse number (window opening information) and pulse width using the window position counter 37 and the pulse width detector 38 while raising the window glass 14, and stores the measured pulse width in the storage unit 42 while relating the pulse width to the pulse number (window opening information). In such storage operation, first storage processing is performed during manufacturing in the embodiment. After that, the storage operation is performed regularly or in response to on-operation of the setting (update) switch 41. It is noted that when the setting (update) switch 41 is turned on, in the case that the window glass 14 is not in the fully opened state, learning (update) processing is preferably performed after the window glass 14 is fully opened.

When window closing operation is performed in response to operation of the operational switch 34, the pulse number (window opening information) outputted from the window position counter 37 and pulse width information outputted from the pulse width detector 38 are provided to the control unit 35. FIG. 6(B) shows a measured pulse waveform based on the measured pulse number and the measured pulse width. When the window glass 14 is raised, the control unit 35 calculates difference between inputted, measured pulse width and reference pulse width corresponding to the inputted pulse number. That is, in the above example, an opening degree of the window glass 14 is detected with resolution of a first pulse to a 800th pulse counted by the window position counter 37, and the control unit 35 obtains difference between width of a measured pulse generated during raising operation of the window glass, and reference pulse width at a pulse number corresponding to the measured pulse. Then, when the width of the measured pulse is larger than the reference pulse width, and a difference between them is larger than a certain threshold value, the control unit 35 detects pinching, and moves and opens the window glass 14 to an opening position.

Figure 7:
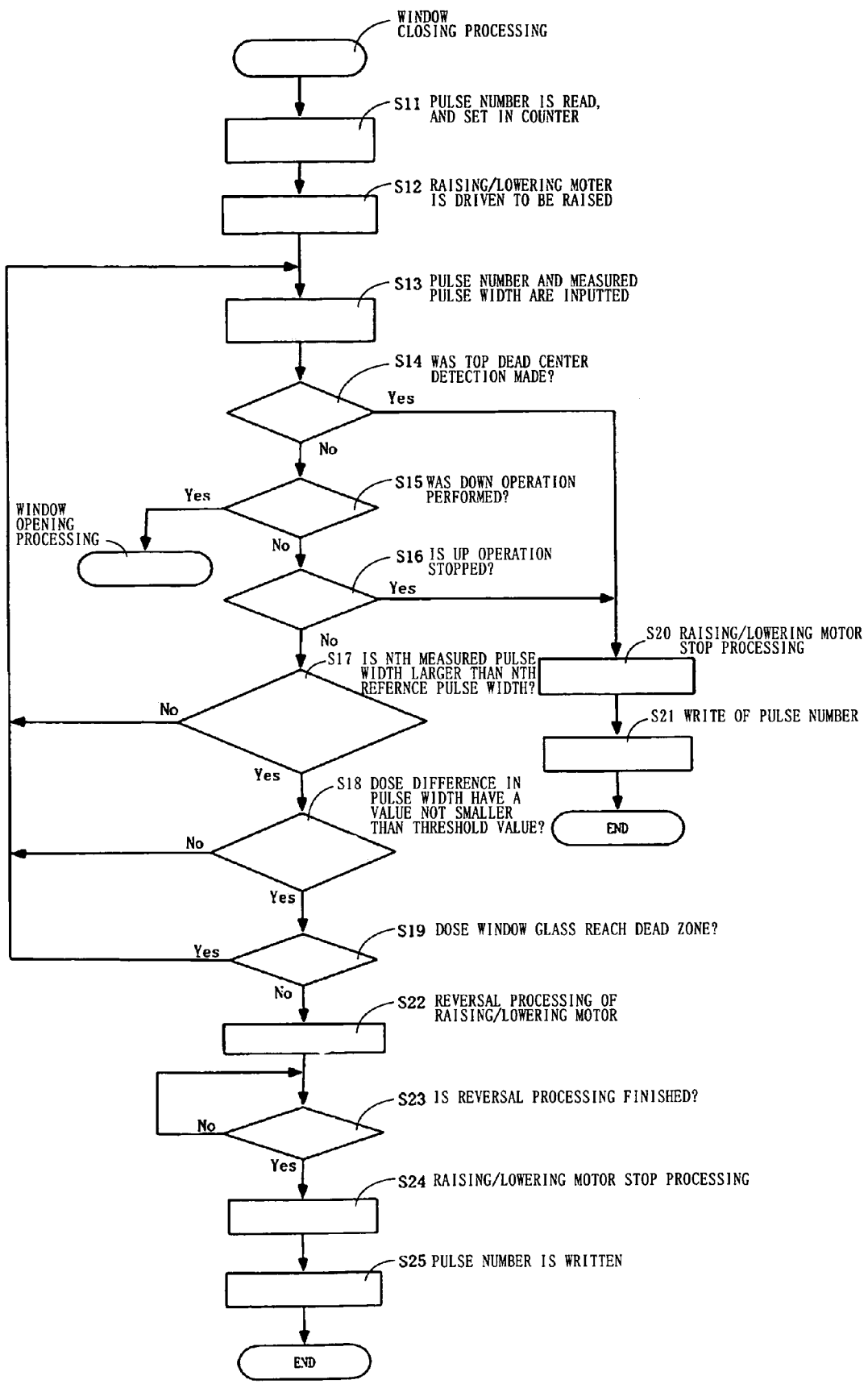
FIG. 7 shows a diagram showing by a flowchart an embodiment of window closing processing by the safety device for power window according to the invention.

An embodiment of closing processing of the window glass 14 is described in more detail with reference to a flowchart shown in FIG. 7. The window closing processing is performed by the control unit 35. It is assumed that the control unit 35 enters the window closing processing when the operational switch 34 is subjected to UP operation. First, the control unit 35 reads a pulse number from the storage unit 42 and sets the pulse number into the window position counter 37 (S11), then provides a raising signal to a drive circuit 32 to positively rotate the raising/lowering motor 24, so that raising operation (window closing operation) of the window glass 14 is started (S12). When the raising/lowering motor 24 starts rotation operation, a pulse is outputted from the pulse generator 36 every time when a rotating shaft 24a (magnet rotor) is rotated at a predetermined angle, then each of rising and trailing edges of the pulse is counted as a pulse number by the window position counter 37, and then pulse width from the rising edge to the trailing edge and pulse width from the trailing edge to the rising edge are measured by the pulse width detector 38, and then the pulse number (window opening information) and the measured pulse number are inputted into the control unit 35 (S13).

Whether the window glass 14 is in the fully closed state (top dead center) is detected (S14). Whether the window glass is in the fully closed state (top dead center) can be detected by a pulse number (window opening information) inputted from the window position counter 37, or a limit switch for detecting a fact that the window glass 14 is in the fully closed state (top dead center) or the like. When the control unit 35 detects the window glass 14 to be in the fully closed state (top dead center) (S14, Yes), it stops the raising/lowering motor 24 (S20), and writes a pulse number (window opening information) corresponding to the fully closed state (top dead center) into the storage unit 42, and finishes the window closing processing (S21, END).

When the window glass 14 is not in the fully closed state (top dead center) (S14, No), the control unit checks whether the operational switch 34 was subjected to DOWN operation from a state of the switch (S15). When the switch was subjected to the DOWN operation (S15, Yes), the control unit performs window opening processing. While a flowchart of the window opening processing is not shown, for example, the processing is performed as follows. The raising/lowering motor 24 is reversely rotated via the drive circuit 32 to lower the window glass 14, then the control unit checks whether the UP operation was performed, the DOWN operation was released, and the window glass 14 was in the fully opened state (bottom dead center) while inputting the pulse member from the window position counter 37. When the UP operation was performed, the control unit stops the raising/lowering motor 24 and returns processing to S12. When the DOWN operation was canceled, or the window glass 14 was in the fully opened state, the control unit stops the raising/lowering motor 24 via the drive circuit 32, and writes a pulse number (window opening information) into the storage unit 42 and finishes the window closing processing. During window opening operation, since pinching does not occur, the control unit 35 may be inputted with only a pulse number counted by the window position counter 37, and store the pulse number into the storage unit 42 when the window opening operation is finished.

When the DOWN operation is not performed (S15, No), the control unit checks whether the UP operation is stopped from the state of the operational switch 34 (S16). When the UP operation is stopped (S16, Yes), the control unit stops the raising/lowering motor 24 via the drive circuit 32 (S20), and writes a pulse number (window opening information) into the storage unit 42 and finishes the window closing processing (S21, END).

When the DOWN operation is not performed (S15, No), and the UP operation is not stopped (S16, No), the control unit checks whether measured pulse width inputted from the pulse width detector 38 exceeds reference pulse width corresponding to the pulse number (nth pulse) inputted from the window position counter 37 (S17). When the measured pulse width does not exceed the corresponding reference pulse width (S17, No), since pinching of a foreign substance may not occur, the control unit returns the processing to S13. This corresponds to each of cases of pulse numbers (1) to (4) in FIG. 6. Then, S13 to S17 are repeated, and when the control unit detects that the window is into the window closing state (top dead center) while pinching of a foreign substance is not detected (S14, Yes), the control unit stops the raising/lowering motor 28 via the drive circuit 32, and writes a pulse number into the storage unit 42 and finishes the raising processing (S20, S21, and END). The pulse number at that time corresponds to the value in the closed state, 800.

When the measured pulse width exceeds the corresponding reference pulse width (S17, Yes), the control unit checks whether a difference between them has a value not smaller than a predetermined threshold value (S18). When the difference has a value smaller than the predetermined threshold value (S18, No), the control unit returns the processing to S13. This is because when the difference has a value smaller than the predetermined threshold value, possibility of other factors such as vibration of a vehicle is larger than possibility of pinching of a foreign substance. This corresponds to each of cases of pulse numbers (5) and (6) in FIG. 6.

When the difference between the measured pulse width and the corresponding reference pulse width has a value not smaller than the threshold value (S18, Yes), since the control unit detects possibility of pinching, it checks whether the window glass 14 reaches a dead zone or not (S19). This corresponds to each of cases (7) or later in FIG. 6. The dead zone in the example means an area before full closing of the window glass 14 in which pinching detection is not allowed, and corresponds to a position at which an upper edge of the window glass 14 contacts to glass-run added to the inside of an upper part of a sash portion 12, which is checked by whether the window opening information given by the window position counter 37 has a number not smaller than a pulse number 760.

When the window glass 14 reaches the dead zone (when pulse number by the window position counter 37 is 760 or more) (S19, Yes), pinching of a foreign substance may not occur. Therefore, the control unit continues the positive rotation of the raising/lowering motor 24, and returns the processing to S13. In a period before the window glass 14 is into the fully closed state (top dead center), processing of each of the S13 to S19 is repeatedly performed. When the window glass 14 is into the fully closed state (S14, Yes), the control unit stops the raising/lowering motor 24 via the drive circuit 32 (S20), and writes the pulse number (800) of the fully closed state into the storage unit 42, and finishes the processing (S21, END).

When the window opening information of the window position counter 37 has a number smaller than pulse number of 760 (S19, No), pinching of a foreign substance may occur. Therefore, the control unit reversely rotates the raising/lowering motor 24 via the drive circuit 32 (S22), and waits finish of the reversal processing (S23). For example, the reversal processing is assumed to be finished when the window glass 14 is in the fully opened state (bottom dead center). When the reversal processing is finished (S23, Yes), the control unit stops the raising/lowering motor 24 via the drive circuit 32 (S24), and writes the pulse number (0) of the fully opened state into the storage unit 42, and finishes the window closing processing (S25, END).

In this way, according to the embodiment of the invention, current pulse width being measured (measured pulse width) is compared to the previously stored, reference pulse width of the relevant pulse number during raising of the window glass 14, which eliminates influence of change in pulse width due to sliding resistance of the glass-run. Furthermore, since the threshold value need not be set in previous anticipation of change in sliding resistance due to degradation of the glass-run or the like, the threshold value can be set low, consequently a pinching load can be reduced.

While pulses from the encoder are detected every half cycle in the example, the pulses may be detected everyone cycle. While an encoder outputting one pulse every one rotation of the rotating shaft 24*a* of the raising/lowering motor 24 was shown as the encoder, the encoder may be an encoder that outputs two pulses every one rotation, that is, the encoder can be an encoder that repeatedly generates pulses every time when the number of rotations is increased in accordance with raising of the window glass 14.

Figure 6:
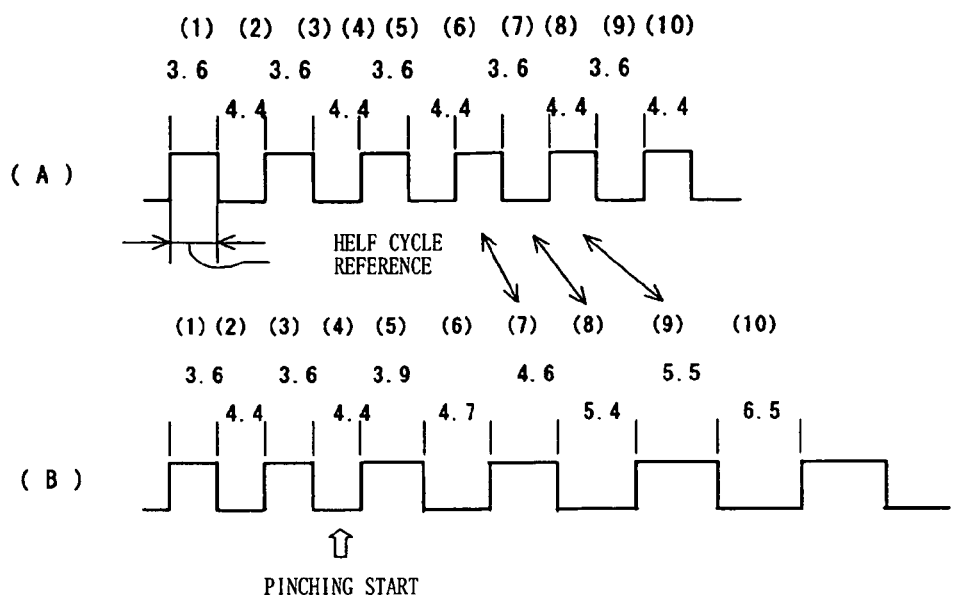
FIG. 6 shows diagrams showing pulses generated by a pulse generator and pulse width of the pulses.

As another embodiment of the invention, FIG. 6(C) shows a table of an embodiment of detecting pinching by obtaining a change rate of measured pulse width to reference pulse width, rather than a difference between the measured pulse width and the reference pulse width. In the embodiment, a change rate of measured pulse width to reference pulse width corresponding to a pulse number of the measured pulse is obtained, and the number of pulses of which the width is increased is counted. This is because pulse width is continuously increased compared with the reference pulse width during pinching. In FIG. 6, it is seen that while the change rate is 0 in pulse numbers (1) to (4), the change rate is not 0 in a pulse number (5) or more, that is, the change rate is increased. In the embodiment, when the control unit detects a fact that the change rate of measured pulse width exceeds a threshold value three times in a row, the control unit determines that pinching occurs. In FIG. 6, count is started from the pulse number (5), and the control unit determines that pinching occurs in a pulse number (7). It is acceptable that when a value of the total of the change rates exceeds a predetermined value, for example, exceeds 20 percent, the control unit determines that pinching occurs, and the threshold value of a change rate of pulse for detecting pinching, the total of change rates, or the number of successive pulses for determining pinching is not limited to each of those in the embodiment.

Figure 8:
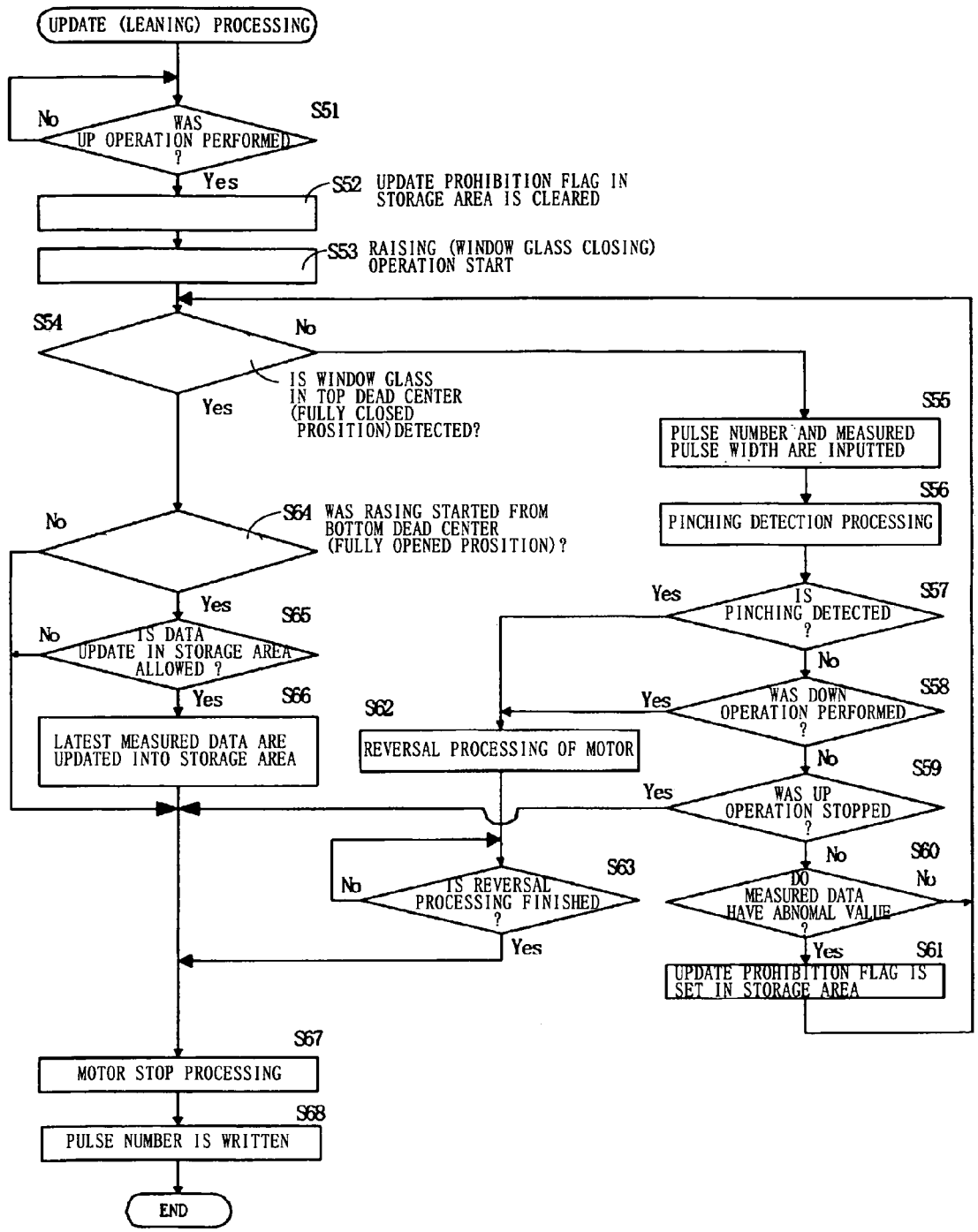
FIG. 8 shows a diagram showing by a flowchart an embodiment of update processing by the safety device for power window according to the invention.

An example of control in updating (learning) the reference pulse width is further described according to a flowchart of FIG. 8. The flowchart of FIG. 8 relates to update processing (learning processing) performed by the control unit 35. The update processing (learning processing) is performed when a setting (update) switch 41 is subjected to on-operation.

When the setting (update) switch 41 is turned on and the control unit 35 thus enters the update processing, the control unit 35 checks whether UP operation was performed using the operational switch 34 from a state of the operational switch 34 (S51), and waits until the UP operation is performed (S51, No). When the UP operation is performed (S51, Yes), the control unit clears an update prohibition flag for identifying whether update of reference pulse width is prohibited to allow data update in the storage unit 42 (S52), then provides a raising signal to the drive circuit 32 to drive the raising/lowering motor 24, so that raising operation (window closing operation) of the window glass 14 is started (S53). When the raising/lowering motor 24 is started to be driven, a pulse is outputted from the pulse generator 36 every time when the rotation shaft 24a is rotated by a certain angle, then the pulse is counted by the window position counter 37, and then such counted value (pulse number) is outputted to the control unit 35. The control unit 35 stores measured pulse width inputted from the pulse width detector 38 into the storage unit 42 as latest measurement data while relating the measured pulse width to a pulse number inputted from the window position counter 37. Then, the control unit 35 detects whether the window glass 14 is in the fully closed state (top dead center) based on the pulse number inputted from the window position counter 37 (S54).

When the window glass 14 is not in the fully closed state (S54, No), the control unit is inputted with the pulse number and the measured pulse width to perform pinching detection processing (S55, S56), so that the control unit determines whether pinching is detected (S57). The pinching detection processing is the same as processing in S17, S18 and S19, wherein when the measured pulse width exceeds corresponding reference pulse width, and a difference between them has a value not smaller than a threshold value, and the window glass is not in a dead zone, the control unit detects pinching. When the control unit does not detect pinching (S57, No), the control unit checks whether DOWN operation was performed from the state of the operational switch 34 (S58). When the control unit detects pinching (S57, Yes), or when the DOWN operation was performed even if the control unit does not detect pinching (S57, No, and S58, Yes), the control unit reversely rotates the raising/lowering motor 24 via the drive circuit 32 (S62), then waits until the reversal processing is finished and then stops the raising/lowering motor 24 via the drive circuit 32 (S63, Yes, and S67), and then inputted with a pulse number and writes the pulse number into the storage unit 42 and finishes the update processing (S67, S68 and END). On the other hand, when the DOWN operation was not performed (S58, No), the control unit checks whether UP operation was stopped from the state of the operational switch 34 (S59), and when the UP operation is stopped, the control unit stops the raising/lowering motor 24 via the drive circuit 32, and then writes the pulse number into the storage unit 42 and finishes the update processing (S59, Yes, S67, S68 and END). In this way, when pinching is detected (S57, Yes), the DOWN operation is performed (S58, Yes), and UP operation is stopped (S59, Yes) before the window glass 14 is into the fully closed state, only part of measured data are acquired, data update in the storage unit 42 is not performed.

When the UP operation was not stopped (S59, No), the control unit checks whether the measured pulse width has an abnormal value or not (S60). Here, a case that the measured pulse width is determined to have an abnormal value includes a case that the measured pulse width suddenly largely varies due to vibration during running. If the measured pulse width has an abnormal value (S60, Yes), the control unit sets the update prohibition flag to prohibit data update in the storage unit 42 (S61), and returns the processing to S54. If the measured pulse width does not have an abnormal value, the control unit directly returns the processing to S54 (S60, No).

Processing of the S54 to S60 is repeatedly performed until the window glass 14 is in the fully closed state. When the window glass 14 is into the fully closed state (S54, Yes), the control unit checks whether raising operation was started from the fully opened state (bottom dead center) of the window glass 14 based on a pulse number (window opening information) (S64). Here, check on whether raising operation was started from the fully opened state of the window glass 14 means check on whether all measurement data in a period from the fully opened state to the fully closed state are acquired. When the raising operation was started from the fully opened state of the window glass 14 (S64, Yes), the control unit checks whether data update in the storage unit 42 is allowed based on whether the update prohibition flag is cleared (S65). If data update in the storage unit 42 is allowed (S65, Yes), the control unit updates the reference pulse width data stored in the storage unit 42 into latest measured pulse width data (S66), stops the raising/lowering motor 24 via the drive circuit 32 (S67), and then writes the pulse number into the storage unit 42 and finishes the update processing (S68, END).

On the other hand, when the raising operation was not started from the fully opened state of the window glass 14 (S64, No), since only part of measurement data were able to be acquired, the control unit stops the raising/lowering motor 24 via the drive circuit 32 without performing data update in the storage unit 42 (S67), and then writes the pulse number into the storage unit 42 and finishes the update processing (S68, END). If data update in the storage unit 42 is not allowed (S65, No), that is, when acquired measurement data are determined to have an abnormal value in S60, the control unit directly stops the raising/lowering motor 24 via the drive circuit 32 without performing data update in the storage unit 42 (S67), and then writes the pulse number into the storage unit 42 and finishes the update processing (S68, END).

According to the above update processing (learning processing), when measured pulse width data are appropriately obtained during raising operation of the window glass 14 from the fully opened state to the fully closed state, the reference pulse width data stored in the storage unit 42 in S66 are updated into the latest measured pulse width data, and thereafter the updated data are used as reference pulse width data. If such update processing is performed regularly or every time when the setting (update) switch 41 is turned on, even if raising speed of the window glass 14 is changed due to change in sliding resistance caused by degradation of the glass-run or the like, normal operation is clearly discriminated from pinching, consequently false detection of pinching is decreased.

In the embodiment of the update processing, the control unit detects a fact that the window glass reached the fully closed state (top dead center), then detects whether raising was started from the fully opened state (bottom dead center). However, it is also acceptable that the control unit checks whether the window glass is in the fully opened state (bottom dead center) before starting raising operation of the window glass 14, and when raising is not performed from the fully opened state (bottom dead center), the control unit moves the window glass 14 to be into the fully opened state, and then performs processing of S54 or later.

Figure 9:
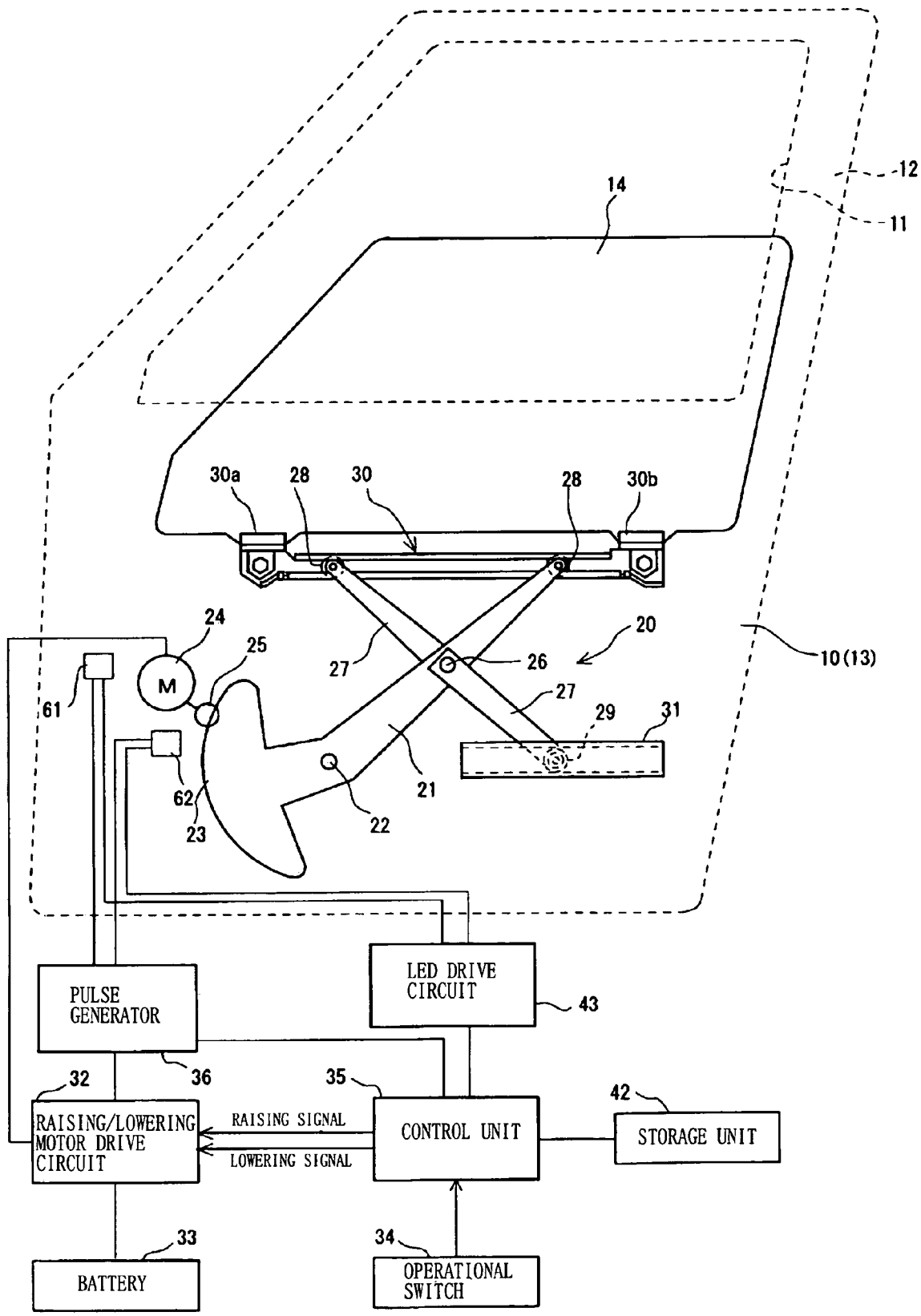
FIG. 9 shows a system connection diagram showing an embodiment in which a safety device for power window according to the invention is applied to the X-arm type power window.

FIG. 9 shows an example that the invention is applied to a vehicle door 10 having an X-arm type power window (regulator) 20. The vehicle door 10 has a sash part 12 having a window opening 11 in an upper side, and a panel part 13 in a lower side. The window opening 11 is opened and closed by a window glass 14.

The X-arm type power window (regulator) 20 for raising and lowering the window glass 14 is supported in the panel part 13. That is, in the panel part 13, a lift arm 21 of the X-arm type power window 20 is swingably supported by a shaft 22, and the lift arm 21 has a sector gear (driven gear) 23 with the shaft 22 as a center in one body. The sector gear 23 is engaged with a pinion 25 that is rotationally driven by a raising/lowering motor 24.

A middle portion in a longitudinal direction of the lift arm 21 is pivotally connected with a middle portion of an equalizer arm 27 by a shaft 26. A guide piece (roller) 28 is pivotally attached in a rotatable manner to an upper end portion (tip) of each of the lift arm 21 and the equalizer arm 27 in. Similarly, a guide piece (roller) 29 is pivotally attached to a lower end portion of the equalizer arm 27. Each of the guide pieces 28 of the lift arm 21 and the equalizer arm 27 is movably fitted in a window glass bracket 30 fixed to a lower end of the window glass 14, and the guide pieces 29 of the equalizer arm 27 are movably guided in an equalizer arm bracket 31 to be fixed in the panel part 13. The window glass 14 is held by holding parts 30a and 30b disposed at both ends in a back and forth direction (right and left direction in FIG. 9) of the window glass bracket 30.

In the X-arm type power window 20, when the pinion 25 is driven positively and negatively via the raising/lowering motor 24, the lift arm 21 swings with the shaft 22 as a center via the sector gear 23, as a result, the window glass bracket 30 (window glass 14) moves up and down while being held in an approximately horizontal manner by the equalizer arm 27, guide pieces 28, 29, and equalizer arm bracket 31. Such up and down motion itself is the same as motion of the typical X-arm type power window 20.

The raising/lowering motor 24 is driven positively and negatively by a raising/lowering motor drive circuit 32. That is, the raising/lowering motor drive circuit 32 to be applied with a current from a battery 33 is supplied with a raising signal or a lowering signal from the control unit 35 via an operational switch 34, and drives the raising/lowering motor 24 positively and negatively according to the signal.

Figure 10:
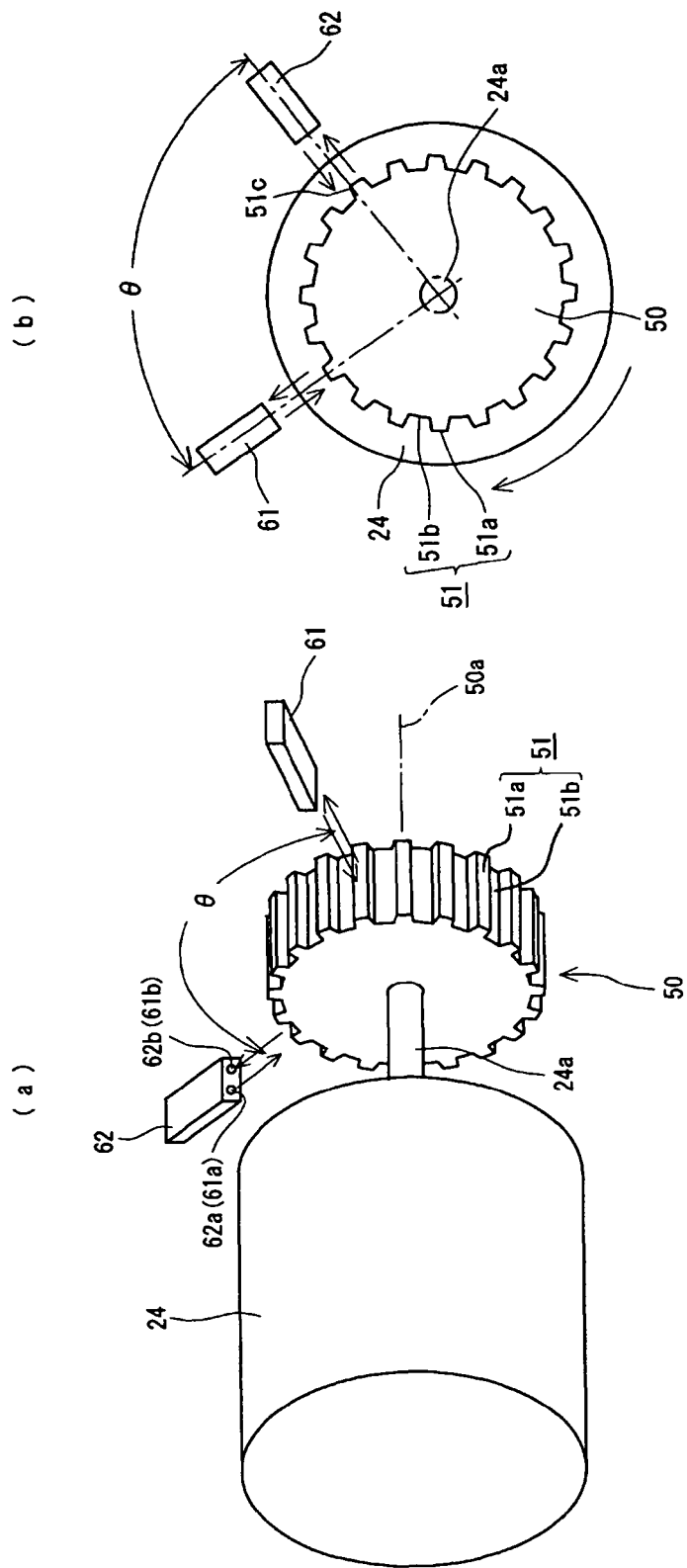
FIG. 10($a$) shows a diagram showing a configuration and a layout of a rotor provided on a rotating shaft of a raising/lowering motor and sensors according to the embodiment, and FIG. 10($b$) shows a plane diagram of the rotor and the sensors.

As shown in FIG. 10, a rotating shaft 24a of the raising/lowering motor 24 is concentrically press-fitted and fixed with a cylindrical rotor 50 formed of resin material by molding. On an outer circumferential face 51 of the rotor 50, convex portions 51a and concave portions 51b extending in an axial direction are alternately formed in equal width. When the raising/lowering motor 24 is driven, the rotor 50 is rotated integrally with the rotating shaft 24a. It is noted that the convex portions 51a and the concave portions 51b can be formed by etching or cutting of the outer circumferential face 51 in addition to molding. Moreover, if a plurality of convex portions 51a are equal in width to one another and a plurality of concave portions 51b are equal in width to one another, width of the convex portion 51a may not be the same as width of the concave portion 51b.

The rotor 50 may be formed in a disk shape if irregularities are provided on the outer circumferential face 51. Moreover, a larger number of irregularities are preferably provided on the outer circumferential face 51 by reducing width of each of the convex portion 51a and the concave portion 51b in a circumferential direction of the outer circumferential face 51, because a rotation cycle of the rotor 50 can be accurately measured.

The rotor 50 may be formed of metal material by molding. When the rotor 50 is formed of metal, even if the rotor 50 is rotated at high speed, it is hardly deformed because of toughness of the metal, therefore the rotation cycle of the rotor can be accurately measured. Furthermore, since metal material generally has high reflectivity compared with resin material, reflected light having large quantity of radiation is obtained, thereby noises are easily removed and consequently the rotation cycle can be accurately measured.

To improve reflectivity of the outer circumferential face 51, a light-reflective layer including a reflective material can be formed by coating, dipping and the like after providing irregularities on the outer circumferential face 51. In particular, when the light-reflective layer is provided only on the convex portions 51a, a difference in quantity of radiation between reflected light from the convex portion 51a and reflected light from the concave portion 51b is increased, therefore noises are easily removed and consequently the rotation cycle can be accurately measured.

The rotor 50 and the rotating shaft 24a are fixed to each other by adhesion or fusion in addition to press-fitting. When the rotor 50 is formed of metal, the rotor is preferably molded integrally with the rotating shaft 24a since productivity is improved.

Around the rotor 50, a sensor 61 and a sensor 62 having the same configuration as that of the sensor 61 are disposed at a certain angular interval (an angle θ in the case of FIG. 10) with respect to a center axis 50a of the rotor. In a positional relationship between the sensor 61, sensor 62, and outer circumferential face 51, as shown in FIG. 10(b), when the sensor 61 is directed to a central portion of the convex portion 51a, the sensor 62 is directed to an end portion 51c of the convex portion 51a (trailing edge portion in the case that the rotor 50 is rotated in a direction of an arrow in the figure). Hereinafter, while description is made with the sensor 62 as an example, the sensor 61 has the same configuration, and has the same operation and effects.

The sensor 62 (61) incorporates LED (light emitting part) 62a (61a) that emits infrared light, and a phototransistor (light receiving part) 62b (61b) that is injected with light being emitted from the LED 62a (61a) and then reflected by the outer circumferential face 51, of which the light emitting surface and the light receiving surface are directed to the outer circumferential face 51 respectively.

The LED 62a (61a) is connected to an LED drive circuit (light-emitting-part drive circuit) 43, and supplied with a drive signal for continuously emitting infrared light according to control by the control unit 35. The LED drive circuit 43 and the LED 62a (61a) configure light emitting means.

When the quantity of radiation of injected light exceeds a threshold value, the phototransistor 62b (61b) considers input is High and outputs a predetermined electric signal, and when the quantity of radiation is not larger than the threshold value, it considers input is Low and does not output the electric signal. Using such a characteristic, when reflected light from the outer circumferential face 51 is inputted, in the case of reflected light from the convex portion 51a having a small distance from the phototransistor 62b (61b), since the reflected light has a large quantity of radiation, input is regarded as High, and the electric signal is outputted to the pulse generator 36. On the contrary, in the case of reflected light from the concave portion 51b having a large distance from the phototransistor 62b (61b), since the reflected light has a small quantity of radiation, input is regarded as Low, and the electric signal is not outputted. Accordingly, when infrared light is continuously irradiated from the LED 62a (61a) to the rotor 50 rotating by drive of the raising/lowering motor 24, an electric signal is regularly outputted to the pulse generator 36 connected to the phototransistor 62b (61b), and the pulse generator 36 generates a square wave pulse that regularly repeats on and off. The phototransistor 62b (61b) and the pulse generator 36 configure pulse generation means.

As described above, the sensor 61 and the sensor 62 are disposed with a certain angular interval (angle θ) with respect to a center axis of the rotor 50, and when the sensor 61 is directed to the central portion of the convex portion 51a, the sensor 62 is directed to the end portion of the convex portion 51a rather than the central portion, therefore certain shift occurs in timing at which light is injected to each of the two sensors from the same point on the outer circumferential face 51. Accordingly, pulses generated by the pulse generator 36 according to the electric signals from the sensors 61 and 62 are shifted in phase by a certain value from each other at any time.

The pulses generated from the pulse generator 36 are inputted into the control unit (control means) 35. The control unit 35 calculates a cycle of an inputted pulse for each of the pulses from the sensors 61 and 62. The calculated cycle is stored in the storage unit 42. Moreover, the control unit 35 may calculate a rotation direction and rotation speed of the rotor 50 based on phase shift between the pulses from the sensors 61 and 62, and a result of the calculation is stored in the storage unit 42. As an arrangement interval between the sensors 61 and 62, an optional angle other than the above 90 degrees may be used, and the rotation direction and the rotation speed of the rotor 50 can be calculated in any angle.

In the storage unit 42, a pulse cycle (reference cycle) corresponding to raising/lowering speed when the window glass is normally moved, and a threshold value for reversely rotating the raising/lowering motor 24 when a cycle of an actual pulse has a large numerical value compared with the reference cycle during raising of the window glass 14 are stored before factory shipment. The control unit 35 compares the calculated cycle to the threshold value stored in the storage unit 42, and when it determines a value of the cycle exceeds the threshold value as a result of the comparison, the control unit outputs a signal instructing reverse rotation of the raising/lowering motor to the raising/lowering motor drive circuit 32.

Figure 11:
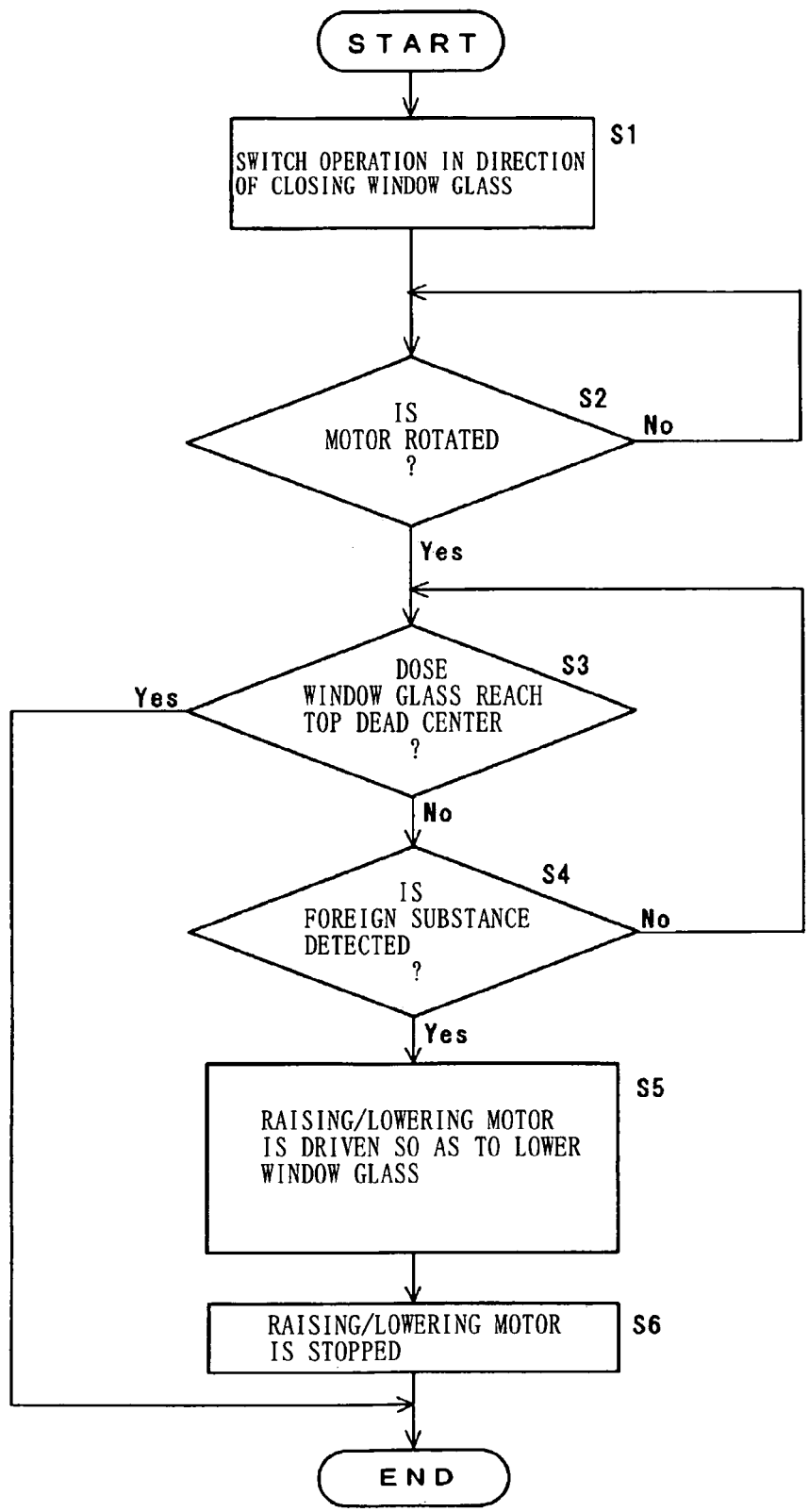
FIG. 11 shows a flowchart showing a flow of control of closing operation of a window glass.
Figure 1:
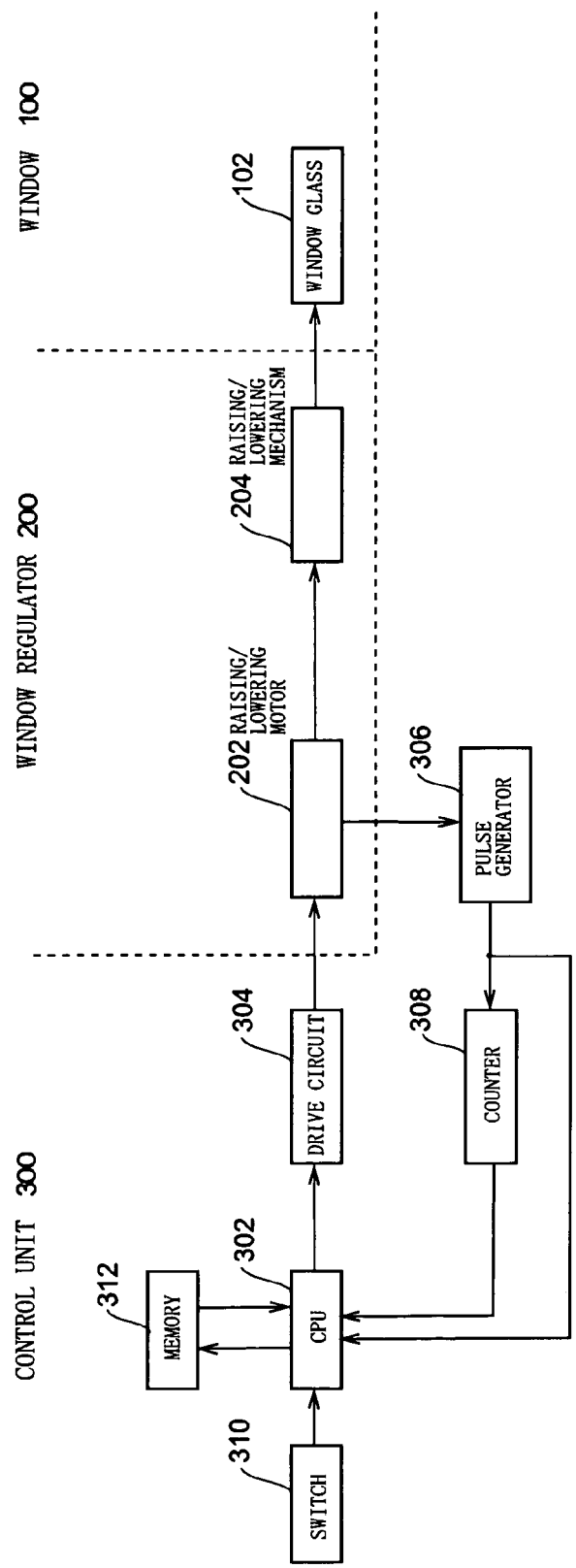

Next, an example of control during closing operation of the window glass 14 is described with reference to FIG. 11.

When a passenger operates the operational switch 34 to close the window glass 14 (step S1), the control unit 35 connected to the operational switch 34 outputs a raising signal to the raising/lowering motor drive circuit 32, and the raising/lowering motor drive circuit 32 that has received the raising signal outputs a drive signal for positive rotation to the raising/lowering motor 24. The raising/lowering motor 24 that has received the drive signal is positively rotated, and the X-arm type power window 20 thus raises the window glass 14. Moreover, the control unit 35 outputs a drive signal to induce continuous emission of the LED (light emitting part) 61a and LED 62a to the LED drive circuit 43, and performs setting of the pulse generator 36. The pulse generator 36 generates two different pulses based on reflected light from the outer circumferential face 51, which was received by each of the phototransistor (light receiving part) 61b and the phototransistor 62b, and outputs the pulses to the control unit 35. The control unit 35 calculates cycles of the inputted two different pulses respectively, and calculates the rotation direction and the rotation speed of the rotor 50 based on phase shift between the two pulses, so that it detects whether the rotor 50 is rotated (step S2).

The storage unit 42 previously stores total pulse number generated by the pulse generator 36 from the fully closed state to the fully opened state of the window glass 14. In a period in which the rotor 50 is rotated, and the window glass 14 is in closing operation (Yes in step S2), the control unit 35 counts the number of pulses generated by the pulse generator 36, and the control unit 35 compares the number of pulses to the total number of pulses being previously stored as needed. When the control unit 35 determines the number of pulses reaches the total number of pulses as a result of the comparison, the control unit 35 considers the window glass 14 reaches the top dead center (fully closed state) (Yes in step S3), and stops output of the raising signal to the raising/lowering motor drive circuit 32 and finishes the closing operation of the window glass 14.

On the other hand, when the rotor 50 is not rotated (No in step S2), the control unit 35 outputs the raising signal to the raising/lowering motor drive circuit 32 again, and then detects whether the rotor 50 is rotated.

Before the window glass 14 reaches the top dead center (No in step S3), the control unit 35 detects whether a foreign substance contacts to the window glass 14 (step S4). Such detection is performed by determining whether the cycle of the pulses, which are generated by the pulse generator 36 in accordance with rotation of the raising/lowering motor 24, exceeds the threshold value. When the control unit 35 detects contact of the foreign substance to the window glass 14 (Yes in step S4), the control unit outputs a lowering signal to the raising/lowering motor drive circuit 32. After receiving the lowering signal, the raising/lowering motor drive circuit 32 outputs a drive signal for reverse rotation to the raising/lowering motor 24. After receiving the drive signal, the raising/lowering motor 24 is reversely rotated irrespectively of a state of the operational switch 34, so that the X-arm type power window 20 lowers the window glass 14 (step S5). Then, the control unit 35 stops output of the lowering signal after a certain time (after 30 sec in the embodiment) has passed since the signal was started to be outputted to the raising/lowering motor drive circuit 32. Thus, rotation of the raising/lowering motor 24 is stopped (step S6).

In a period in which the control unit does not detect contact of the foreign substance to the window glass 14 during closing operation of the window glass 14 (No in step S4), closing operation of the window glass 14 is continued, and when the control unit detects the window glass reaches the top dead center, the closing operation is finished (Yes in step S3).

In the description, the cycle of the pulses calculated by the control unit 35 is compared to the threshold value previously stored in the storage unit 42, and when the control unit 35 determines the value of the cycle exceeds the threshold value as a result of the comparison, the control unit 35 outputs a signal instructing reverse rotation of the raising/lowering motor to the raising/lowering motor drive circuit 32. However, contact of the foreign substance can be determined by using a change rate of pulse cycle. That is, it is possible that the control unit 35 calculates a change rate of a pulse cycle to a pulse cycle just before the relevant pulse cycle or to an average pulse cycle, and compares a result of the calculation to a change rate of pulse cycle being previously stored in the storage unit 42 as a threshold value, as a result, when the control unit determines a value of the change rate exceeds the threshold value, the control unit 35 outputs a signal instructing reverse rotation of the raising/lowering motor to the raising/lowering motor drive circuit 32.

Moreover, while the above embodiment is an example that the invention is applied to the vehicle door 10 having the X-arm type power window (regulator), the invention may be applied to a vehicle door having a wire-type regulator.

FIG. 12 shows a block diagram of an example of a power window. As shown in the figure, the power window includes a window 100, window regulator 200, and control device 300.

The window 100 has a window glass 102. The window regulator 200 has a raising/lowering motor 202 and a raising/lowering mechanism 204, wherein the raising/lowering motor 202 raises/lowers the window glass 102 via the raising/lowering mechanism 204.

The control device 300 controls security of raising/lowering of the window glass 102 by the window regulator 200. The control device 300 may be a device that concentrically controls a plurality of window regulators 200, which are provided in a plurality of windows in the same vehicle interior respectively, from a driver seat or the like.

The control device 300 has CPU 302. The CPU 302 is a center of the control device 300, and performs security control of the window regulator 200 according to a predetermined program. The CPU 302 controls the raising/lowering motor 202 via a drive circuit 304. The amount of rotation of the raising/lowering motor 202 is fed back to the CPU 302 through a pulse generator 306 and a counter 308. The CPU 302 recognizes a window glass position based on a count by a counter 308. An output pulse from the pulse generator 306 is inputted into the CPU 302. The CPU 302 detects pulse width of the inputted pulse signal.

The CPU 302 is inputted with a window glass raising/lowering instruction through a switch 310. The switch is operated by a user. In an automatic mode, the window glass is raised or lowered through one-touch operation of the switch 310. In a manual mode, the window glass is raised or lowered only while the switch 310 is pushed. The CPU 302 has a memory 312, and appropriately writes and reads data during executing the program.

Figure 13:
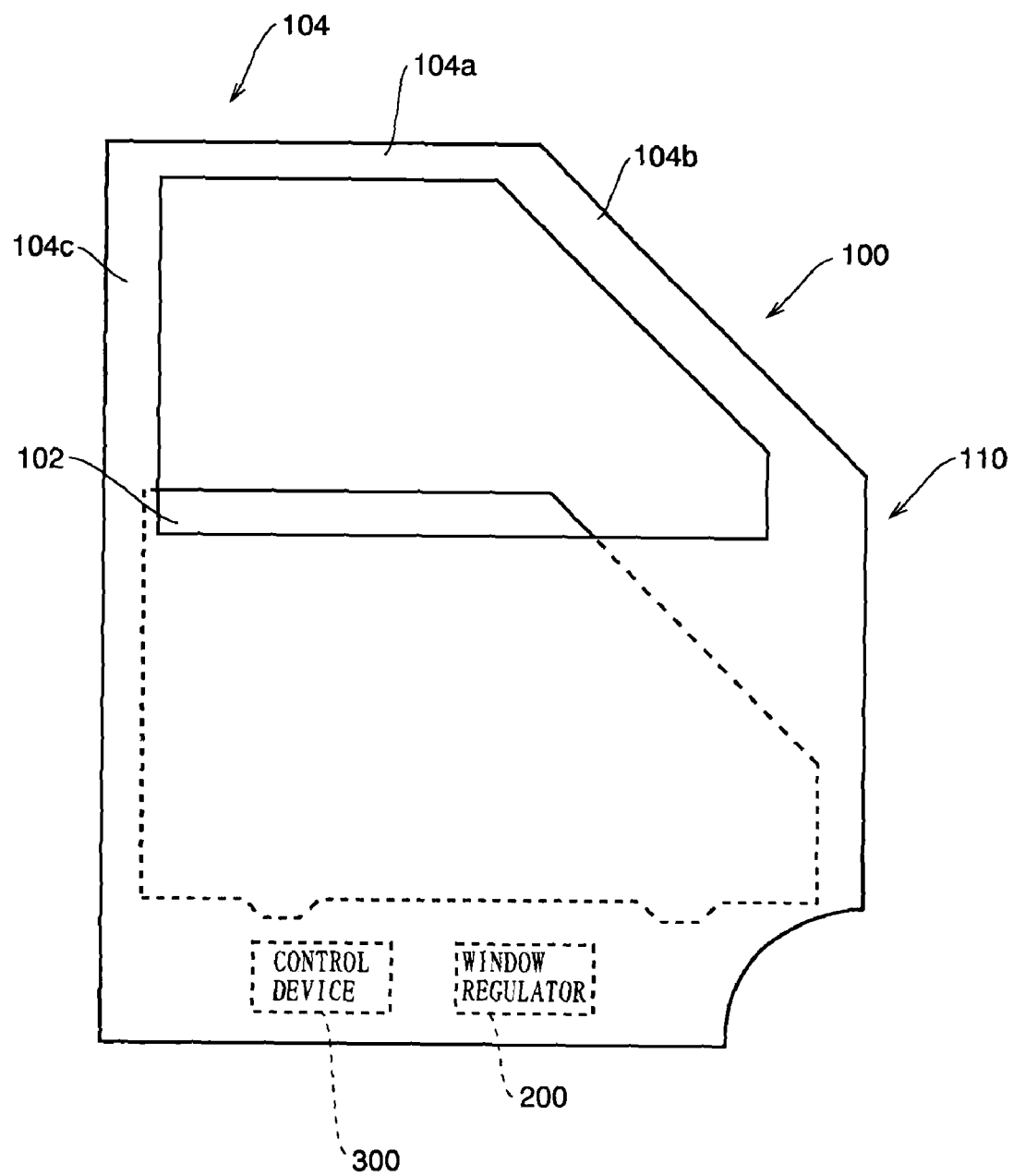
FIG. 13 shows a diagram showing a configuration of the power window using the safety device of an example of the best mode for carrying out the invention.

FIG. 13 shows an example of a vehicle door having such a power window. Here, an example of a rear door of a sedan type vehicle is shown. In the door, an upper part of a door body 110 is formed as the window 100. The window 100 has a structure where a window frame 104 is opened or closed by the window glass 102 that raises/lowers from/into a door body 110 side. The window regulator 200 that raises and lowers the window glass 102 and the control device 300 of the regulator are provided in the door body 110.

The window frame 104 has an upper frame 104*a*, a rear frame 104*b*, and a front frame 104*c*. The upper frame 104*a* is set approximately horizontally. The rear frame 104*b* is sloped approximately downward. The front frame 104*c* is set approximately vertically.

FIG. 14 shows a raising/lowering process of the window glass 102. As shown in the figure, the window glass 102 is raised in order of (a), (b), (c), (d) and (e). The window glass is lowered in reverse order to this. (a) shows a state where the window glass 102 is in the bottom dead center, and (e) shows a state that it is in the top dead center. (b), (c) and (d) show intermediate states respectively.

To further describe the respective states, (a) shows a fully opened state of the power window. (b) shows a state in the initial stage of raising of the window glass 102. In this state, an upper side and a rear side of the window glass 102 are spaced from the upper frame 104*a* and the rear frame 104*b* respectively. It is noted that a front side of the window glass 102 is within the front frame 104*c* through the whole process of raising/lowering.

(c) shows a state where the upper side and the rear side of the window glass 102 are close to the upper frame 104*a* and the rear frame 104*b* respectively. (d) shows a state where the upper side and the rear side of the window glass 102 begin to enter into the upper frame 104*a* and the rear frame 104*b* respectively. (e) shows a state where the upper side and the rear side of the window glass 102 have completely entered into the upper frame 104*a* and the rear frame 104*b* respectively. This corresponds to the fully closed state of the power window.

Figure 15:
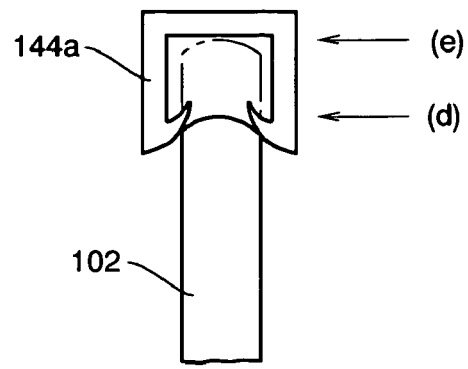
FIG. 15 shows a diagram showing a relationship between the window glass and a glass-run.

To show the states of (d) and (e) further in detail, for example, as shown in FIG. 15, the upper side and the rear side of the window glass 102 contact to glass-runs 144*a* of the upper frame 104*a* and the rear frame 104*b* respectively in the state of (d), and the upper side and the rear side of the window glass 102 completely enter into the glass-runs 144*a* of the upper frame 104*a* and the rear frame 104*b* respectively in the state of (e). The glass-runs 144*a* are formed of an insulative material such as rubber or plastic.

Figure 16:
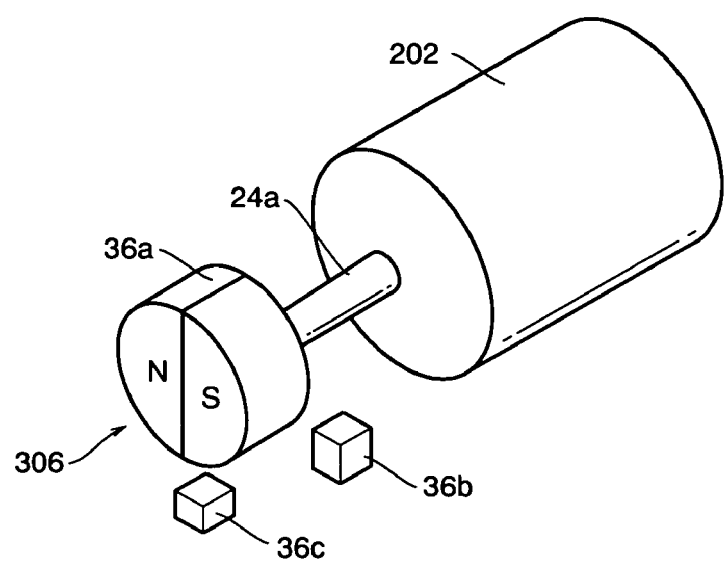
FIG. 16 shows a diagram showing a configuration of a pulse generator.

FIG. 16 shows a schematic configuration of the pulse generator 306. The pulse generator 306 has a permanent magnet 36*a* attached to a rotation shaft 24*a* of the raising/lowering motor 202, and two Hall elements 36*b* and 36*c* for detecting a magnetic flux of the magnet, wherein the Hall elements 36*b* and 36*c* output pulse signals showing periodical change in magnetic flux in accordance with rotation of the permanent magnet 36*a* respectively. Rotation speed of the raising/lowering motor 202 is reflected in pulse width of a pulse signal, and increase and decrease in rotation speed result in decrease and increase in pulse width respectively. The pulse generator 306 may be a pulse generator as shown in FIG. 10.

Figure 17:
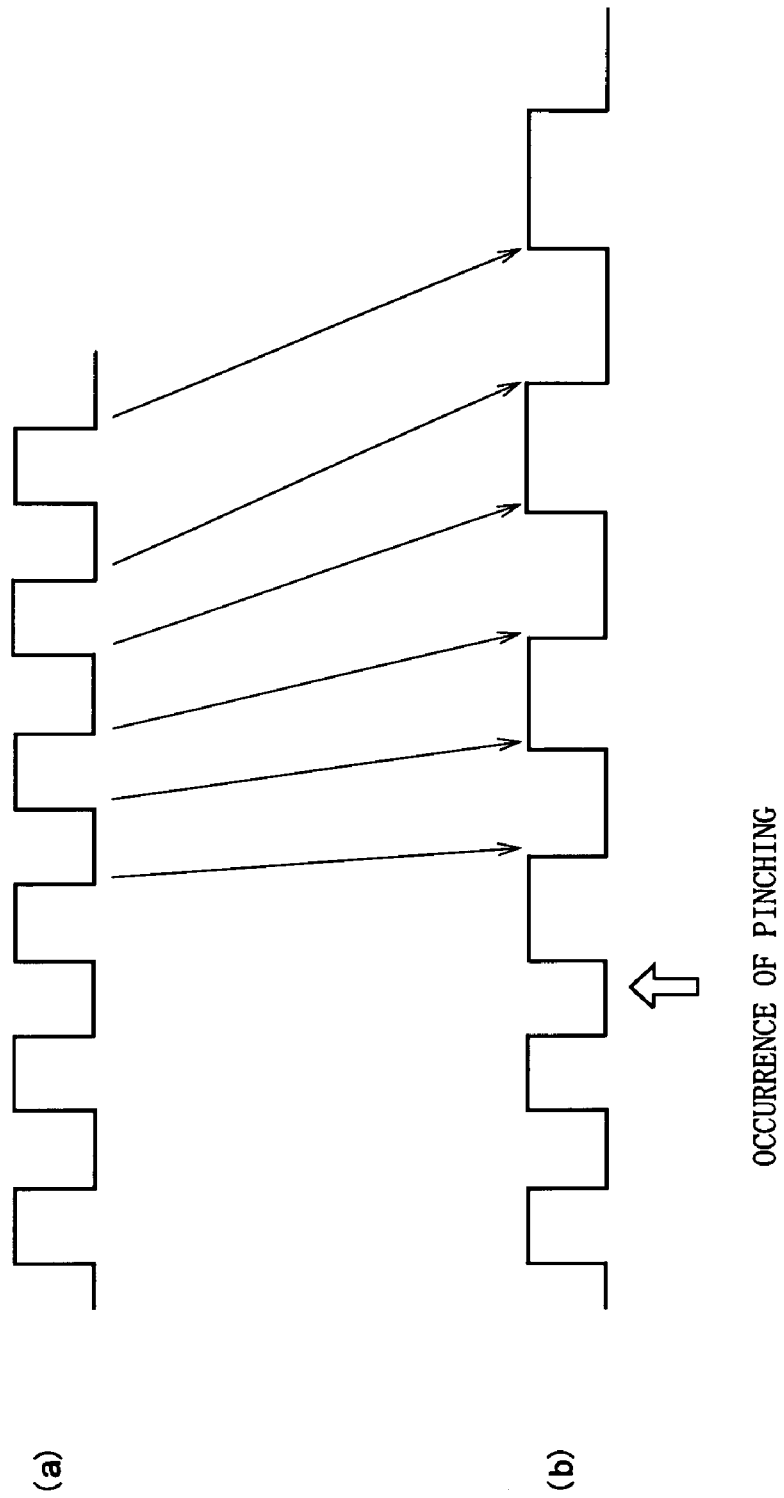
FIG. 17 shows a diagram showing a waveform of pulses generated by the pulse generator.

FIG. 17 shows change in pulse width corresponding to change in rotation speed. (a) shows a pulse signal during constant-speed rotation, wherein pulse width is constant. (b) shows a pulse signal when speed is decreased during rotation, wherein pulse width is increased due to reduction in speed of the raising/lowering motor 202 associated with load increase in occurrence of pinching caused by the window glass 102 and the like. The pulse width is inversely proportional to rotation speed or rotational frequency.

For the pulse width, a predetermined threshold value is stored in the memory 312. The threshold value is used for determination of pinching based on pulse width by the CPU 302. When the CPU 302 determines occurrence of pinching, it lowers the window glass 102 to avoid pinching.

To store a load condition in the case that pinching does not occur, learning of pulse width or a change rate of pulse is performed. The change rate of pulse corresponds to a change rate of pulse width between a pulse and a pulse being one pulse before the relevant pulse. The learning is performed by measuring pulse width or a change rate of pulse for each glass position while the window glass 102 is raised from the bottom dead center to the top dead center, and storing the pulse width or change rate of pulse into the memory 312.

A threshold value for pinching determination is set correspondingly to the pulse width or change rate of pulse for each glass position obtained through such learning. The learning is performed in periodic inspection of a vehicle or the like, and each time the threshold value is updated according to contents of the learning.

Figure 18:
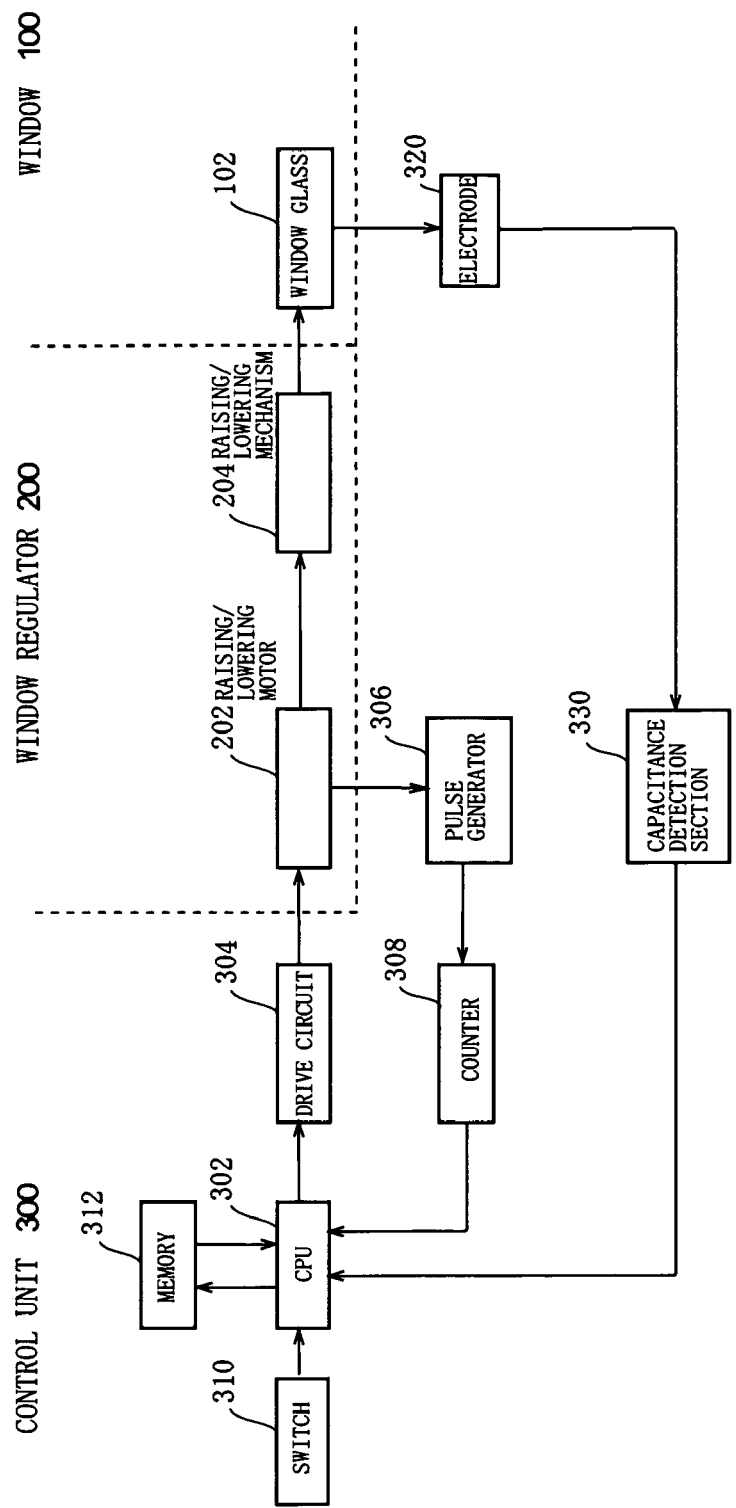
FIG. 18 shows a block diagram of a power window using a safety device of an example of the best mode for carrying out the invention.

FIG. 18 shows a block diagram of another example of a power window. As shown in the figure, the power window includes a window 100, window regulator 200, and control device 300.

The window 100 has a window glass 102. The window regulator 200 has a raising/lowering motor 202 and a raising/lowering mechanism 204, wherein the raising/lowering motor 202 raises/lowers the window glass 102 via the raising/lowering mechanism 204. The control device 300 controls security of raising/lowering of the window glass 102 by the window regulator 200.

The control device 300 has CPU 302. The CPU 302 is a center of the control device 300, and performs security control of the window regulator 200 according to a predetermined program. The CPU 302 controls the raising/lowering motor 202 via a drive circuit 304. The amount of rotation of the raising/lowering motor 202 is fed back to the CPU 302 through a pulse generator 306 and a counter 308.

The CPU 302 is inputted with a window glass raising/lowering instruction through a switch 310. The switch 310 is operated by a user. In an automatic mode, the window glass is raised or lowered through one-touch operation of the switch 310. In a manual mode, the window glass is raised or lowered only while the switch 310 is pushed. The CPU 302 has a memory 312, and appropriately writes and reads data during executing the program.

Figure 19:
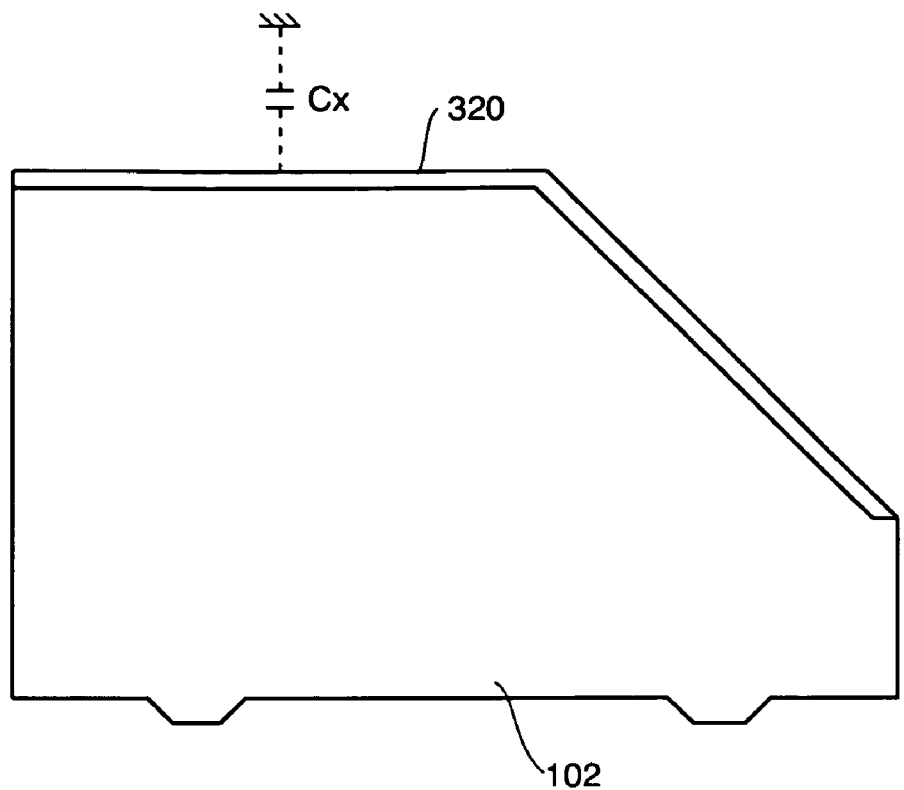
FIG. 19 shows a diagram showing a layout of an electrode in the window glass.

The window glass 102 has an electrode 320. Capacitance of the electrode 320 is detected by a capacitance detection section 330, and a capacitance detection signal is inputted into the CPU 302. FIG. 19 shows a layout of the electrode 320 in the window glass 102. As shown in the figure, the electrode 320 is provided over an area from an upper side to a rear side of the window glass 102. The electrode 320 is configured using a conductive material or the like. An electrode at a window frame side corresponding to the electrode 320 may be metal itself configuring the window frame.

The electrode 320 has a capacitance cx with respect to a corresponding window frame. Since the window frame is at ground potential, the capacitance cx is capacitance to ground. The capacitance to ground is increased when the electrode 320 is contacted with a human body such as a hand or finger of a passenger.

Figure 20:
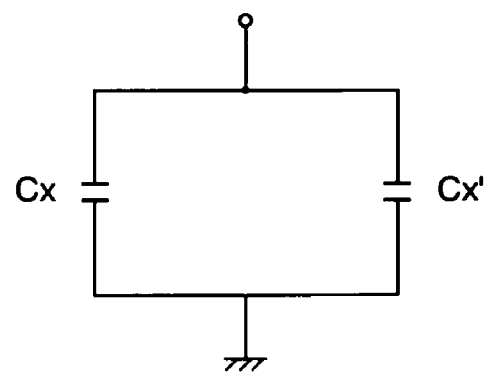
FIG. 20 shows an equivalent circuit diagram showing capacitance of the electrode.

As shown by an equivalent circuit in FIG. 20, this is because the capacitance cx of the electrode 320 is connected in parallel with capacitance cx' of the human body. The capacitance cx of the electrode 320 is, for example, about 80 pF, and the capacitance cx' of the human body is, for example, about 400 pF, therefore capacitance of the equivalent circuit is extremely increased. Such change in capacitance is used for detection of contact of a human body.

Figure 21:
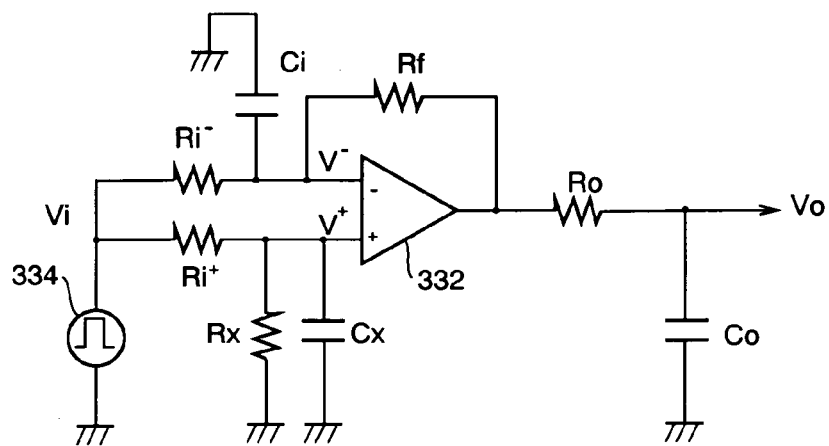
FIG. 21 shows a circuit diagram of a major part of a capacitance detection section.

FIG. 21 shows an example of a circuit for detecting change in capacitance. The circuit configures a major part of the capacitance detection section 330. As shown in the figure, the circuit is configured using an OP amplifier 332. The OP amplifier 332 is supplied with a unipolar DC power of, for example, $VC=+5V$ and $VE=0V$.

In the OP amplifier 332, a capacitor cx and a resistance Rx are connected in parallel between a non-inverting input terminal and ground respectively, a capacitor ci is connected in parallel between an inverting input terminal and the ground, and the inverting input terminal is connected to an output terminal through a resistance Rf.

The capacitor cx corresponds to the capacitance cx of the electrode 320 of the window glass. The capacitor ci is a capacitor for compensation, and has a capacitance corresponding to capacitance of the electrode 320 when a human body or the like does not contact thereto. The resistance Rx has the same value as that of the resistance Rf.

A voltage Vi from the voltage generator 334 is inputted into the non-inverting input terminal and the inverting input terminal of such an OP amplifier 332 through resistances Ri+ and Ri− respectively. The resistances Ri+ and Ri− are equal in value to each other.

The OP amplifier 332 outputs a voltage given by amplifying a voltage difference with an amplification factor of Rf/Ri, the voltage difference being a difference between a voltage V+ of the non-inverting input terminal and a voltage V− of the inverting input terminal. The voltage is smoothed by a smoothing circuit including a resistance Ro and a capacitor Co and thus becomes an output voltage Vo. The output voltage Vo is inputted into the CPU 302 as a capacitance detection signal.

Figure 22:
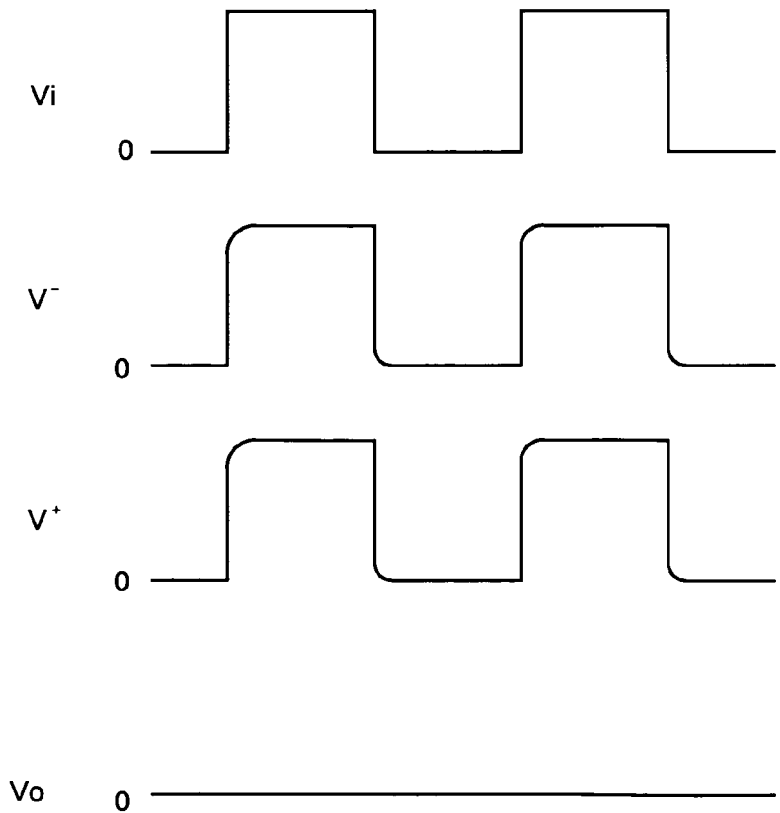
FIG. 22 shows a diagram showing a voltage waveform in a circuit of the major part of the capacitance detection section.
Figure 23:
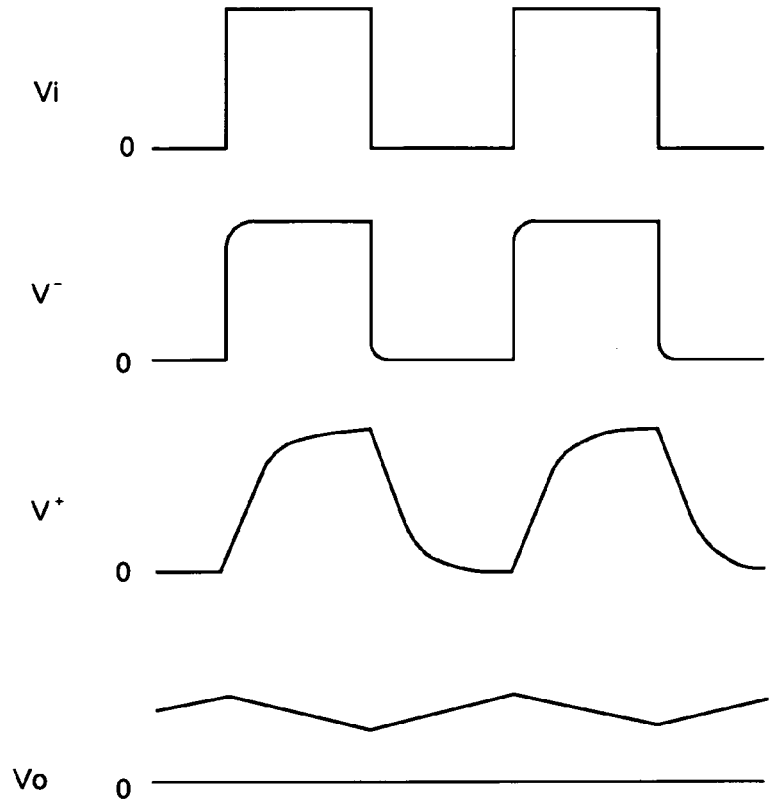
FIG. 23 shows a diagram showing a voltage waveform in the circuit of the major part of the capacitance detection section.

FIGS. 22 and 23 show an example of waveforms of the voltages Vi, V−, V+ and Vo respectively. As shown in the figures, the voltage Vi is a unipolar, square wave pulse voltage with a fixed cycle. The voltages V− and V+ are to be charging voltages for the capacitors Ci and Cx based on the voltage Vi respectively. The voltage Vo corresponds to a voltage given by smoothing an amplified value of a difference between V+ and V−.

FIG. 22 shows a case that a human body or the like is not contacted to the electrode 320 of the window glass, wherein since capacitance is not different between the capacitors Cx and Ci, the voltages V+ and V− are the same in wavelength and amplitude, and the voltage Vo obtained by amplifying and smoothing a difference between them is 0 V.

FIG. 23 shows a case that a human body or the like is contacted to the electrode 320 of the window glass, wherein since a wavelength or amplitude of the voltage V+ is changed due to increase in capacitance of the capacitor Cx, the voltage Vo obtained by amplifying and smoothing a difference between V+ and V− becomes larger than 0 V. The amount of increase in voltage corresponds to increase in capacitance of the capacitor Cx.

Figure 24:
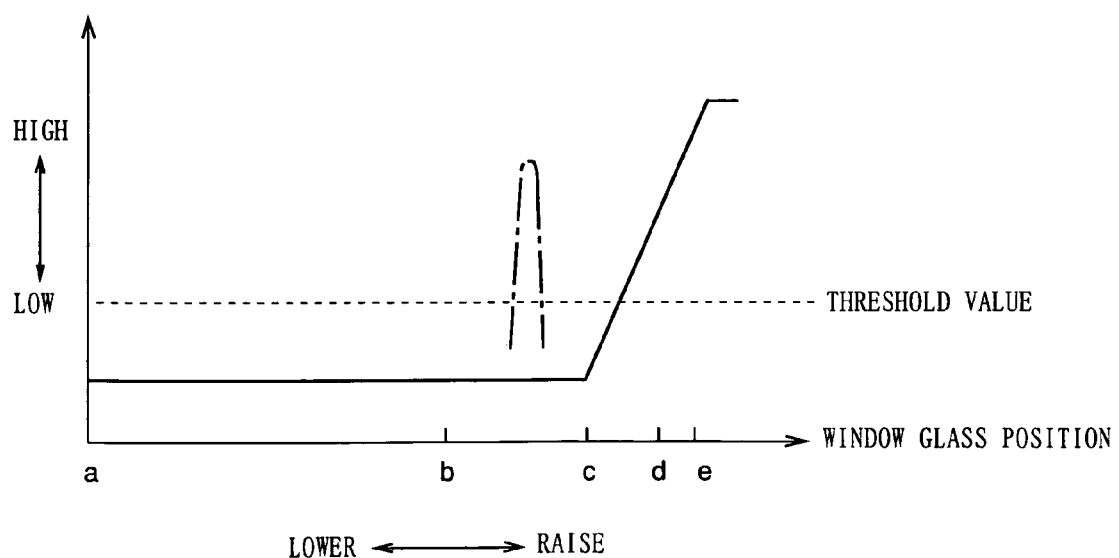
FIG. 24 shows a diagram showing a relationship between a window glass position and a capacitance detection signal.

FIG. 24 shows change in capacitance detection signal in accordance with raising and lowering of the window glass 102. The figure is a graph with the window glass position as a horizontal axis and signal intensity of the capacitance detection signal as a vertical axis. Signs a to e marked at respective points on the horizontal axis correspond to the window glass positions (a) to (e) shown in FIG. 14. Hereinafter, the window glass may be called glass, and the window glass position may be called glass position. Moreover, the capacitance detection signal may be called detection signal.

The detection signal is small in signal intensity and slightly changed in a range from a position a to a position c. This is because a sufficient space exists between the electrode 320 and the window frame 104. The signal is suddenly increased in signal intensity in a range from the position c to a position d. This is because the electrode 320 enters into the window frame 104. The signal is large in signal intensity and slightly changed in a range from the position d to a position e. This is because the electrode 320 has completely entered into the window frame 104.

For such a detection signal, a threshold value is set for determining presence of contact or pinching of the human body. As the threshold value, a value is set as shown by a broken line or the like, which is larger than a value of detection signal intensity when the window glass 102 does not enter into the window frame, and smaller than a value of detection signal intensity when the window glass 102 has entered into the window frame, and enables secure identification of increase in detection signal due to contact of the human body or the like as shown by a dashed line. The threshold value may be set for each glass position. The threshold value is stored in the memory 312, and used for pinching determination by the CPU 302. When the CPU 302 determines occurrence of pinching, it lowers the window glass 102 to avoid pinching.

To store capacitance in the case that pinching does not occur, learning of capacitance is performed. The learning of capacitance is performed by measuring capacitance for each glass position while the window glass 102 is raised from the bottom dead center to the top dead center, and storing the capacitance into the memory 312.

A threshold value for pinching determination is set correspondingly to the capacitance for each glass position obtained through such learning. The learning is performed in periodic inspection of a vehicle or the like, and each time the threshold value is updated according to contents of the learning.

Figure 25:
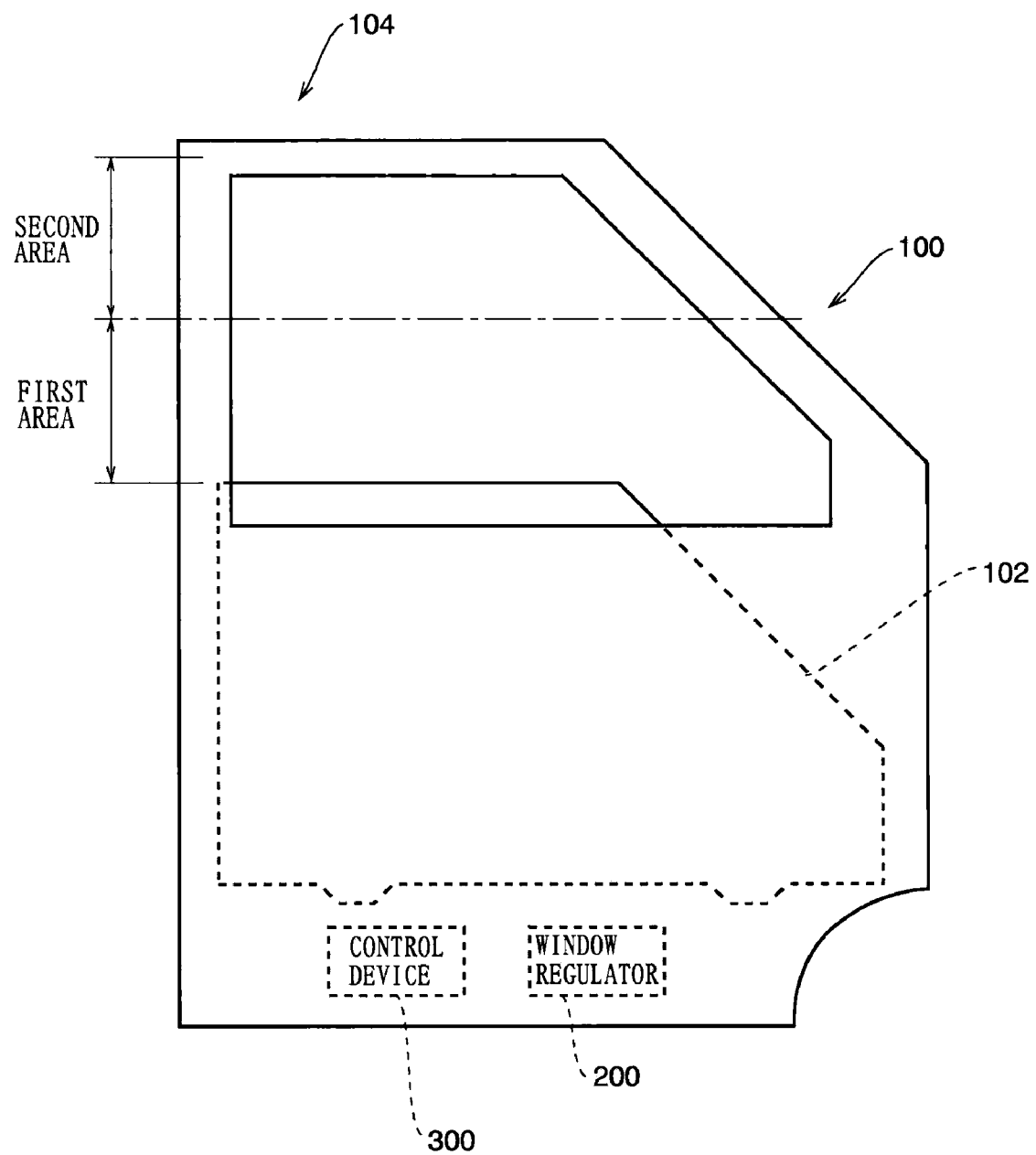
FIG. 25 shows a diagram showing an area in which learning is performed.
Figure 2:
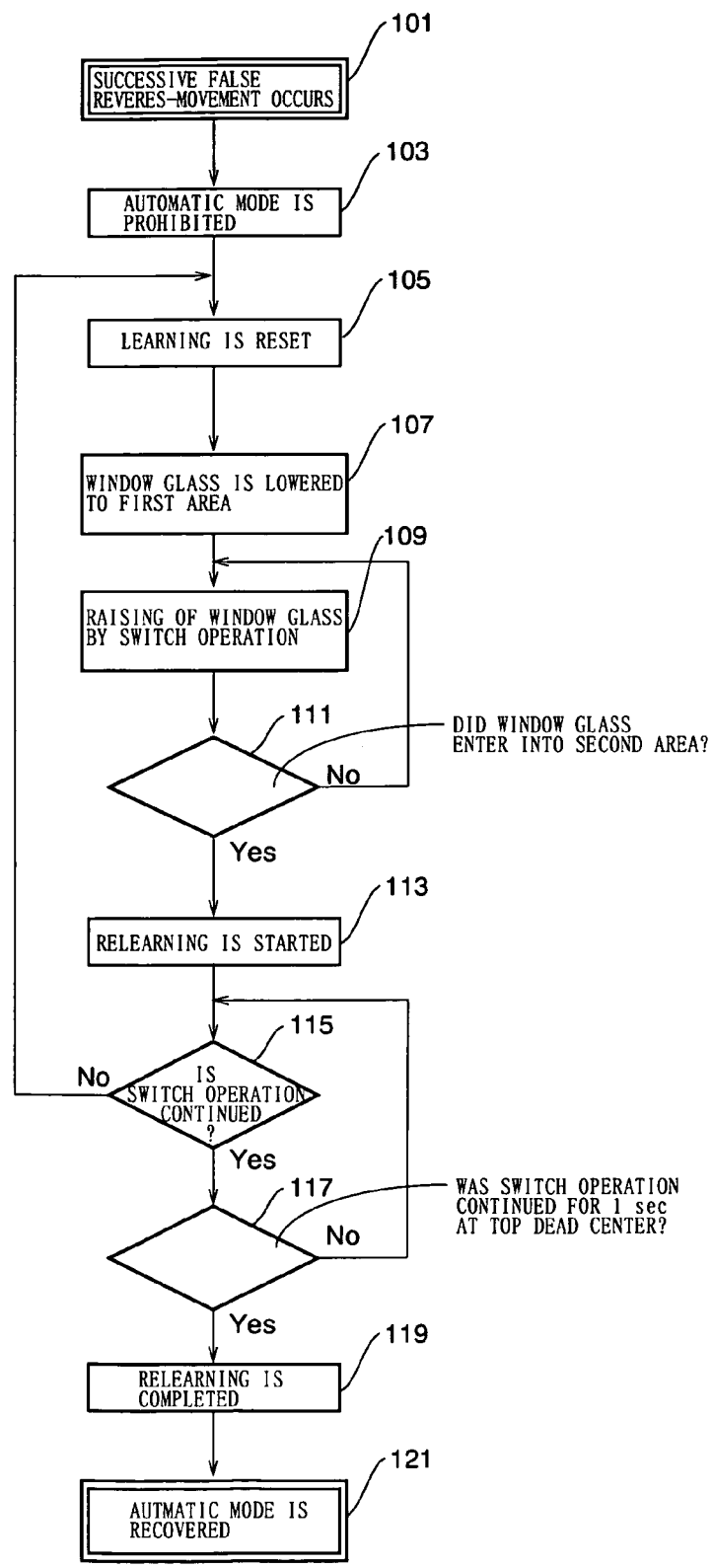

While learning of pulse width or capacitance may be performed over the whole area of movement of the window glass 102, if an area of the learning is limited, efficiency can be improved, and a storage area for storing a learning result can be saved. FIG. 25 shows an example of setting of the learning area. To limit the learning area, a movement area of the window glass is divided into two areas by a boundary as shown by a dashed line.

The boundary divides the movement area of the window glass into two areas of an area at a side of an opened position of the window frame (bottom dead center side) and an area at a side of a closed position of the window frame (top dead center side). Hereinafter, the movement area in the opened position side (bottom dead center side) may be called first area, and the movement area in the closed position side (top dead center side) may be called second area. The first area is a non-learning area, and the second area is a learning area.

A position of the boundary between both areas is set to be the window glass position b shown in FIG. 14, that is, a somewhat raised position of the window glass 102, or a position near the position. It is noted that the whole movement area of the window glass 102 may be set to be the second area (learning area), and in that case, the position of the boundary between both areas corresponds to the bottom dead center, and the bottom dead center corresponds to the first area (non-learning area).

When pinching avoidance operation is repeated a number of times in succession, the CPU 302 determines false pinching avoidance occurs. To cope with such a situation, the following control is performed to the window regulator 200.

FIG. 26 shows a flowchart of operation of the CPU 302 when false pinching avoidance occurs. When successive, false reverse-movement of the window glass, that is, false pinching avoidance occurs in step 101, the CPU 302 prohibits an automatic mode in step 103. Then, the CPU performs learning reset to erase previous learning contents in step 105, and lowers the window glass to the first area in step 107. Thus, the successive, false reverse-movement of the window glass is stopped.

In this state, when raising of the window glass is performed by switch operation in step 109, the CPU determines whether the window glass enters into the second area in step 111, and when the window glass does not enter into the area, the CPU continues raising of the window glass in step 109.

When the window glass enters into the second area, the CPU starts relearning in step 113. The relearning is performed on pulse width in the example shown in FIG. 12, and performed on capacitance in the example shown in FIG. 18.

The CPU 302 determines whether the switch operation is continued in step 115. When the switch operation is continued, the window glass is being raised, or reaches the top dead center. Thus, when the switch operation is continued, the CPU determines whether the switch operation is continued for, for example, 1 sec at the top dead center in step 117. When it is continued for 1 sec, the CPU completes relearning in step 119, and recovers the automatic mode in step 121. A set value of duration time is not limited to 1 sec, and may be another appropriate value.

According to another operation, when successive, false reverse-movement occurs, the CPU performs relearning on pulse width or capacitance, and then recovers the automatic mode. A threshold value for pinching determination is updated based on a result of the relearning, and such an updated threshold value is used for subsequent pinching detection. Thus, correct pinching avoidance is performed in the automatic mode after recovery.

When a user stops switch operation before the window glass reaches the top dead center, determination is made as No in the step 115, thereby the CPU returns processing to the step 105 and performs learning reset, and lowers the window glass to the first area in step 107.

When the behavior of the window glass at that time is seen from a user side, even if the switch operation is stopped, the window glass 102 is lowered rather than remains in a current position, which is contrary to expectation. Thus, when the switch operation is performed in a raising direction of the window glass again, raising of the window glass is restarted in the step 109.

Even if the window glass reaches the top dead center, when duration time of switch operation at the top dead center is shorter than 1 sec, determination is made as No in the step 117, and furthermore determination is made as No in the step 115, thereby the CPU returns processing to the step 105 and performs learning reset, and lowers the window glass to the first area in step 107.

When the behavior of the window glass at that time is seen from a user side, even if the window glass reaches the top dead center, the window glass is lowered rather than remains there, which is contrary to expectation. Thus, when the switch operation is performed in a raising direction of the window glass again, raising of the window glass is restarted in the step 109.

In this way, since operation in the step 111 or later is restarted in any case, the automatic mode can be finally recovered. Therefore, a user performs simple operation that the window glass is raised to the top dead center and kept there for a certain time, thereby the user can easily recover the automatic mode.

Figure 27:
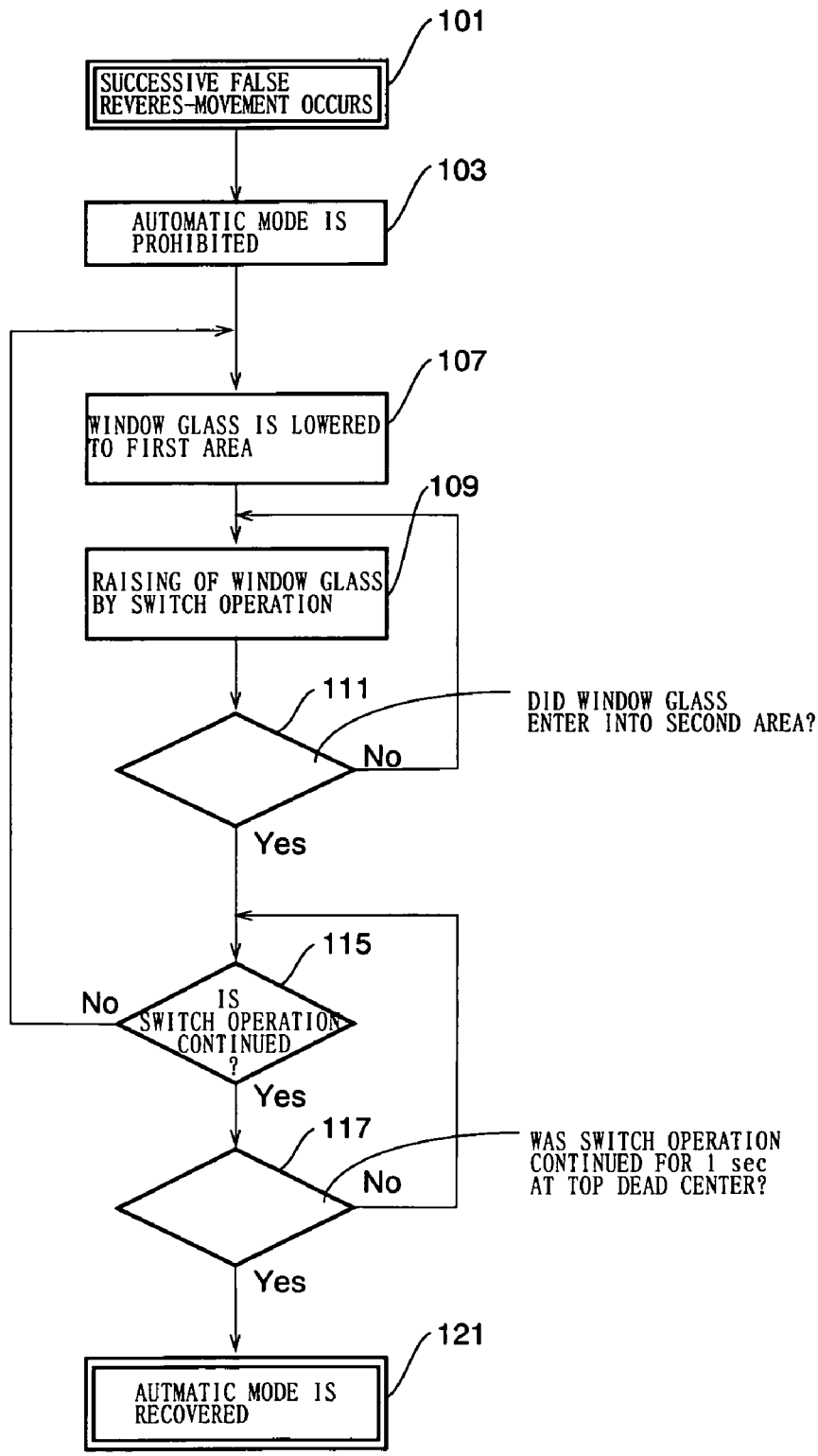
FIG. 27 shows a flowchart of operation of the safety device of an example of the best mode for carrying out the invention.

Relearning is sometimes not needed depending on a cause of successive, false reverse-movement, and relearning can be omitted in such a case. In the case that relearning is not performed, a flowchart of automatic mode recovery operation when successive, false reverse-movement occurs is as shown in FIG. 27. The flowchart corresponds to a flowchart given by removing the steps 105, 113 and 119 from the flowchart of FIG. 26. According to such operation, when the successive, false reverse-movement occurs, automatic mode recovery can be performed.

While examples of the power window for vehicle have been shown hereinbefore, a power window is not limited to the power window for vehicle, and any power window can be used if it moves the window glass using a window regulator. Moreover, while examples of the power window that closes the window frame by raising the window glass have been shown, a power window that closes the window frame by lowering the window glass can be used, or a power window that closes the window frame by moving the window glass in a horizontal or oblique direction can be used.

While examples that use pulse width or capacitance as physical quantity used for pinching detection have been shown, an electromagnetic wave including light, an ultrasonic wave, temperature, pressure, distortion and the like may be used in addition to such physical quantity.

Figure 28:
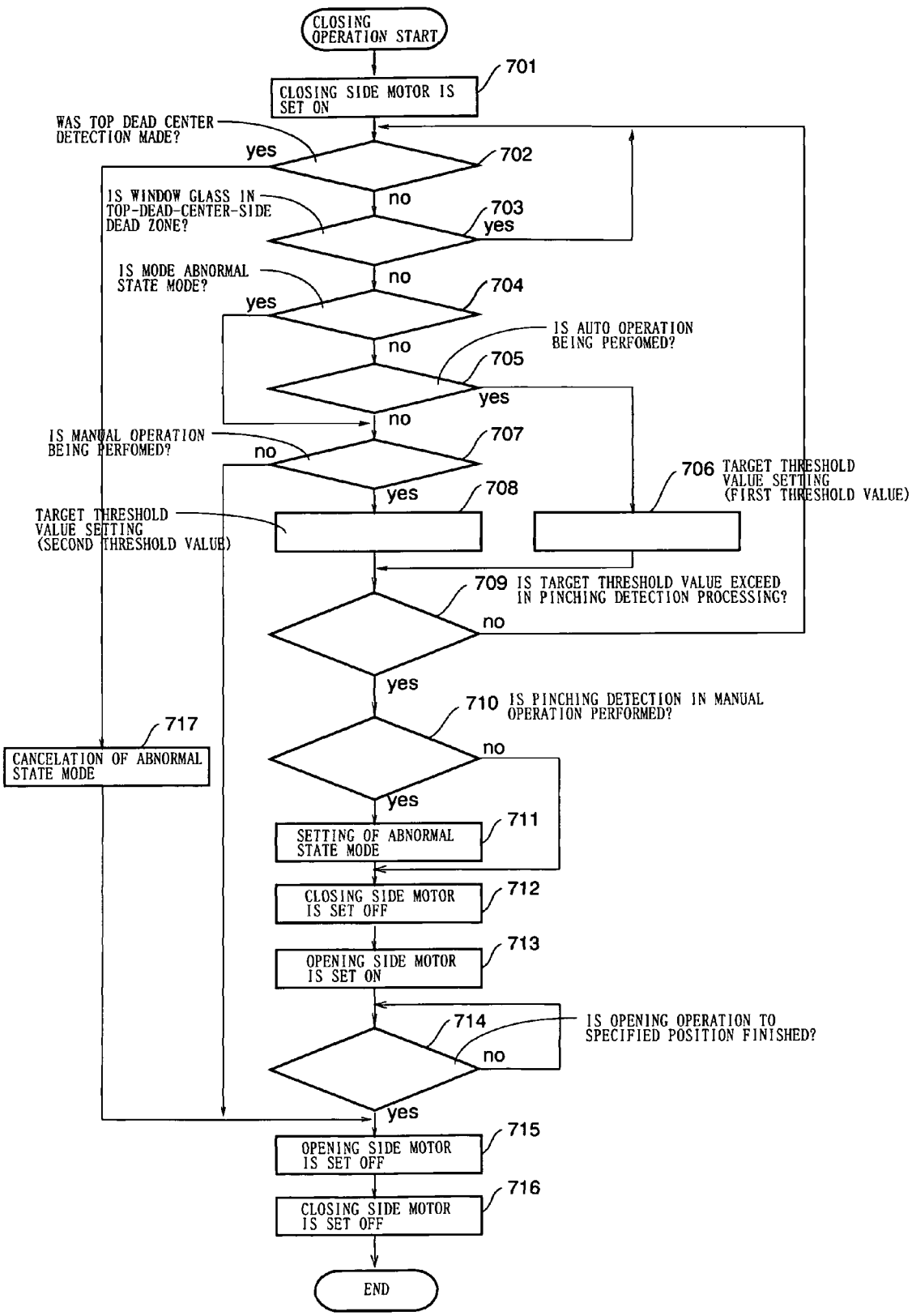
FIG. 28 shows a flowchart of operation of a control device of an example of the best mode for carrying out the invention.

Another example of operation of the control device 300 for pinching avoidance is described. FIG. 28 shows by a flowchart an example of operation of the control device 300. The operation is substantially operation of the CPU 302. As shown in FIG. 28, a closing side motor is set ON in step 701. The ON setting of closing side motor is performed in response to operation of the switch 310 in a direction of closing the window 100. The ON setting of closing side motor means that the raising/lowering motor 202 is driven in the direction of closing the window 100. Thus, raising of the window glass 102 is started.

In step 702, whether top dead center detection was made is determined. The top dead center detection is detection of a state where the window glass 102 reaches the top dead center. When determination on the top dead center detection is made as no, whether the window glass is in a top-dead-center dead zone area is determined in step 703. The top-dead-center dead zone is a dead zone set from a position slightly short of the top dead center to the top dead center, which is not an object of detection and avoidance of pinching. When the window glass is in the top-dead-center dead zone area, processing is returned to the top dead center detection in the step 702.

When the window glass is not in the top-dead-center dead zone, whether a mode is an abnormal state mode is determined in step 704. When a mode is not the abnormal state mode, whether AUTO operation is being performed is determined in step 705. The AUTO operation means operation in the automatic mode.

When AUTO operation is being performed, a first threshold value is set by target threshold value setting in step 706. The first threshold value is a threshold value for performing pinching avoidance in the automatic mode. In step 709, whether a target threshold value is exceeded in pinching detection processing is determined. When the target threshold value is not exceeded, processing is returned to the step 702.

In a period in which the top dead center detection is not made, the window glass is not in the top-dead-center dead zone area, operation is not in the abnormal state mode, and the target threshold value is not exceeded in the automatic mode, operation in each of the steps 702, 703, 704, 705, 706 and 709 is repeated. During this, raising of the window glass 102 is continued.

When it is determined in the step 709 that the target threshold value is exceeded in the pinching detection processing, whether pinching detection in manual operation was made is determined in step 710. During AUTO operation, determination is made as no, and a closing side motor is set OFF in step 712, and an opening side motor is set ON in step 713. The ON setting of opening side motor means that the raising/lowering motor 202 is driven in a direction of opening the window 100. Thus, lowering of the window glass 102 is started.

Whether opening operation to a specified position is finished is determined in step 714, and when the opening operation to the specified position is finished, the opening side motor is set OFF in step 715, and the closing side motor is set OFF in step 716. In this way, pinching avoidance in the automatic mode is performed based on the first threshold value.

When a value of a load of the raising/lowering motor 202 is increased to the first threshold value or more due to aged deterioration in resistance of a sliding portion of the window glass 102 or the like, pinching avoidance is performed even if pinching of a foreign substance does not occur. That is, since false pinching avoidance (false reverse-movement) is performed, the window 100 cannot be fully closed. In such a case, operation of closing the window 100 is performed in the manual mode.

The manual mode is a manual mode associated with automatic mode prohibition when false reverse-movement occurs. It is noted that a manual mode is not limited to the manual mode under such a situation, and a typical manual mode can be used. This is the same in description below.

When full closing operation of the window 100 is performed in the manual mode, the same operation as in the automatic mode is performed in the steps 701 to 704. However, the AUTO operation is determined to be not performed in the step 705, manual operation is determined to be being performed in step 707, and a second threshold value is set through target threshold value setting in step 708. The second threshold value is a threshold value corresponding to a further large load of the raising/lowering motor 202 or the like, and when it is a threshold value for pulse width, a threshold value larger than the first threshold value is set as the second threshold value.

Determination in the step 709 is made based on the second threshold value, and when a load value does not exceed the second threshold value, processing is returned to the step 702. In a period in which the top dead center detection is not made, the window glass is not in the top-dead-center dead zone, operation is not in the abnormal state mode, and a load value does not exceed the second threshold value in the manual mode, operation in each of the steps 702, 703, 704, 705, 707, 708 and 709 is repeated. Therefore, even if a load value exceeds the first threshold value, pinching avoidance is not performed, and the window glass 102 is continuously raised.

When it is determined in the step 709 that a load value exceeds the second threshold value, whether pinching detection in manual operation is performed is determined in the step 710. Determination is made as yes since operation is currently in the manual mode, and abnormal state mode setting is performed in step 711.

Then, the closing side motor is set OFF in the step 712, and the opening side motor is set ON in the step 713. Whether opening operation to a specified position is finished or not is determined in the step 714, and when the opening operation to the specified position is finished, the opening side motor is set OFF in the step 715, and the closing side motor is set OFF in the step 716. In this way, pinching avoidance in the manual mode is performed based on the second threshold value.

Since the second threshold value is larger than the first threshold value, false pinching avoidance due to aged deterioration in resistance of the sliding portion of the window glass 102 or the like does not occur unlike a case of using the first threshold value. Therefore, the window 100 can be fully closed.

However, when a foreign substance is actually pinched, it is determined that a load exceeds the second threshold value. Therefore, in that case, pinching avoidance is performed even in the manual mode as described above. Consequently, danger such as pinching of a human body is prevented.

When pinching avoidance is performed in the manual mode, an abnormal state mode is set in step 711. The state is displayed by lighting of a lamp provided near the switch 310 or the like, thereby occurrence of abnormality is notified to an operator. The lamp provided near the switch 310 is an example of display means in the invention.

The set abnormal state mode is used for determination in the step 704 in next window operation. When a mode is determined to be the abnormal state mode in the step 704, AUTO operation determination of the step 705 is skipped, and only manual operation determination of the step 707 is performed, and when the manual operation determination is made as no, processing is skipped to the step 715. In this way, the automatic mode is prohibited in next operation, so that safety is ensured.

Next window operation is performed in the manual mode while a foreign substance is removed, thereby the window 100 can be fully closed. When the window 100 is fully closed, top dead center detection is made in the step 702. When the top dead center detection is made, the abnormal state mode is canceled in step 717. Thus, abnormality display is erased, and a control state is returned to an initial state. Then, the opening side motor is set OFF and the closing side motor is set OFF in the steps 715 and 717 respectively. The CPU 302 that cancels the abnormal state mode in the step 717 is an example of cancellation means of the invention.

Figure 29:
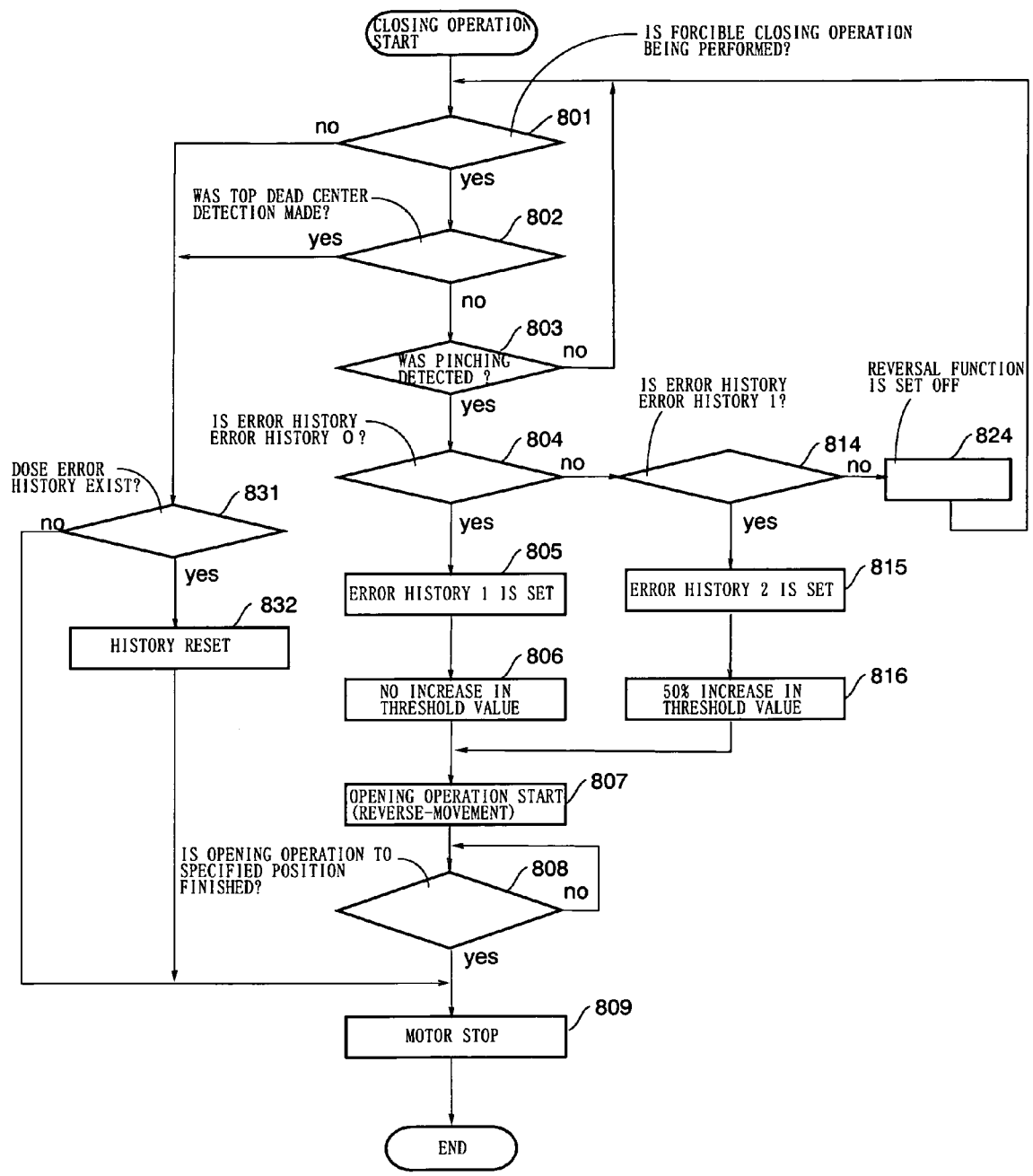
FIG. 29 shows a flowchart of operation of the control device of an example of the best mode for carrying out the invention.

FIG. 29 shows by a flowchart another example of operation of the control device 300. The operation is substantially operation of the CPU 302. The operation begins with operating the switch 310 in a direction of closing the window 100. As shown in FIG. 29, whether forcible closing operation is being performed is determined in step 801. The forcible closing operation is closing operation of the window 100 in the manual mode.

When the forcible closing operation is being performed, whether the top dead center detection was made is determined in step 802. When the top dead center detection was not made, whether pinching detection was made is determined in step 803. Presence of pinching is determined based on a predetermined threshold value. When the pinching detection was not made, processing is returned to the step 801. While the forcible closing operation is being performed, the top dead center detection was not made, and the pinching detection was not made, operation of each of the steps 801 to 803 is repeated.

When pinching is not detected in the step 803, the window glass 102 is continuously raised, and consequently the top dead center detection is made in the step 802. When the top dead center detection is made, whether error history exists is determined in step 831. The error history is history of occurrence of pinching described later.

When error history does not exist, a motor is stopped in step 809. Thus, the window 100 is fully closed. Similarly, when it is determined that forcible closing operation is not performed, whether error history exists is determined in step 831, and when error history does not exist, a motor is stopped in step 809.

When pinching is detected in the step 803, whether error history is error history 0 is determined in step 804. Error history 0 means error history does not exist. When error history is error history 0, error history 1 is set in step 805. Error history 1 means pinching occurred one time. The CPU 302 that sets error history as error history 1 in step 805 is an example of storage means of the invention.

In step 806, no increase in determination threshold value is set. Thus, a threshold value is kept to be an initial threshold value. In step 807, opening operation is started (reverse-movement). In step 808, whether opening operation to a specified position is finished is determined, and when opening operation to the specified position is finished, the motor is stopped in the step 809. In this way, when pinching is detected during forcible closing operation, pinching avoidance is performed.

Thus, pinching of a human body or the like is avoided and danger is prevented. However, such pinching avoidance may be false pinching avoidance due to aged deterioration in resistance of the sliding portion of a window glass 102 or the like.

Since the window 100 cannot be fully closed due to pinching avoidance, the forcible closing operation is performed again. Thus, operation of each of the steps 801 to 803 is performed. When pinching is not detected in the step 803, the window glass 102 is continuously raised, and consequently top dead center detection is made in the step 802.

When the top dead center detection is made, whether error history exists is determined in step 831, and when error history exists, history reset is performed in step 832, and the motor is stopped in the step 809. Thus, the window 100 is fully closed. Error history becomes error history 0 through the history reset, and the control state is initialized. The CPU 302 that performs history reset in the step 832 is an example of erasing means of the invention.

On the contrary, when pinching is detected again in the step 803, whether error history is error history 0 is determined in the step 804. Since error history 1 is being set because pinching detection was previously made, determination is made as no.

Thus, whether error history 1 is being set is determined in the step 814. Since determination is made as yes, error history 2 is set in step 815. Error history 2 means pinching occurred two times in succession. The CPU 302 that sets the error history to be error history 2 in the step 815 is an example of storage means of the invention.

In step 816, 50% increase in determination threshold value is set. Thus, a threshold value is increased 50% compared with an initial threshold value. Opening operation is started (reverse-movement) in step 807, and whether opening operation to a specified position is finished is determined in step 808, and when determination is made as yes, the motor is stopped in the step 809.

In this way, when pinching occurs during the second forcible closing operation, pinching avoidance is similarly performed. Thus, pinching of a human body or the like is avoided and danger is prevented. However, the human body or the like may be pinched two times in succession at low possibility, and such pinching avoidance may be false pinching avoidance at higher possibility, which is due to aged deterioration in resistance of the sliding portion of the window glass 102 or the like.

While pinching avoidance occurs two times in succession and thus the threshold value is increased 50%, such a rate of increase is made large compared with a rate of increase in load expected from aged deterioration in resistance of the sliding portion of the window glass 102 or the like. The rate of increase need not be limited to 50%. Moreover, the threshold value may be increased when the error history 1 is set.

Since the window 100 cannot be fully closed due to pinching avoidance performed two times in succession, third forcible closing operation is performed. Thus, operation of each of the steps 801 to 803 is performed. Pinching detection in the step 803 is performed based on the 50% increased threshold value.

Since the threshold value is increased 50%, increase in load due to aged deterioration in resistance of the sliding portion of the window glass 102 or the like may be determined as occurrence of pinching at low possibility. Therefore, determination is typically made as no, and operation of each of the steps 801 to 803 is repeated.

Thus, the window glass 102 is continuously raised, and consequently the top dead center detection is made in the step 802. When the top dead center detection is made, whether error history exists is determined in step 831. When error history exists, history is reset in the step 832, and the motor is stopped in the step 809. Thus, the window 100 is fully closed.

In an extremely special case, increase in load due to aged deterioration in resistance of the sliding portion of the window glass 102 or the like can exceed the 50% increased threshold value. In such a case, pinching is detected in the step 803.

Since pinching is detected, whether error history 0 is being set is then determined in the step 804. Since error history 2 is being set because pinching detection was performed twice in succession, determination is made as no. Determination on whether error history 1 is being set in the step 814 is similarly made as no.

Since any determination is made as no, reversal function OFF is set in step 824, and processing is returned to the step 801. Since reversal function OFF is set, reverse-movement of the window glass 102 does not occur although pinching detection is performed.

Therefore, the window 100 is forcibly closed. Thus, the window 100 is finally fully closed without being affected by false pinching detection. Then, the top dead center detection is made in the step 802, error history is determined to exist in the step 831, and the error history is reset to be 0 in the step 832.

When pinching detection is performed three times in succession, forcible closing is performed hereinbefore. However, the number of pinching detection before forcible full closing is performed is not limited to three, and may be set to be an appropriate number being not smaller or larger than three.

Figure 30:
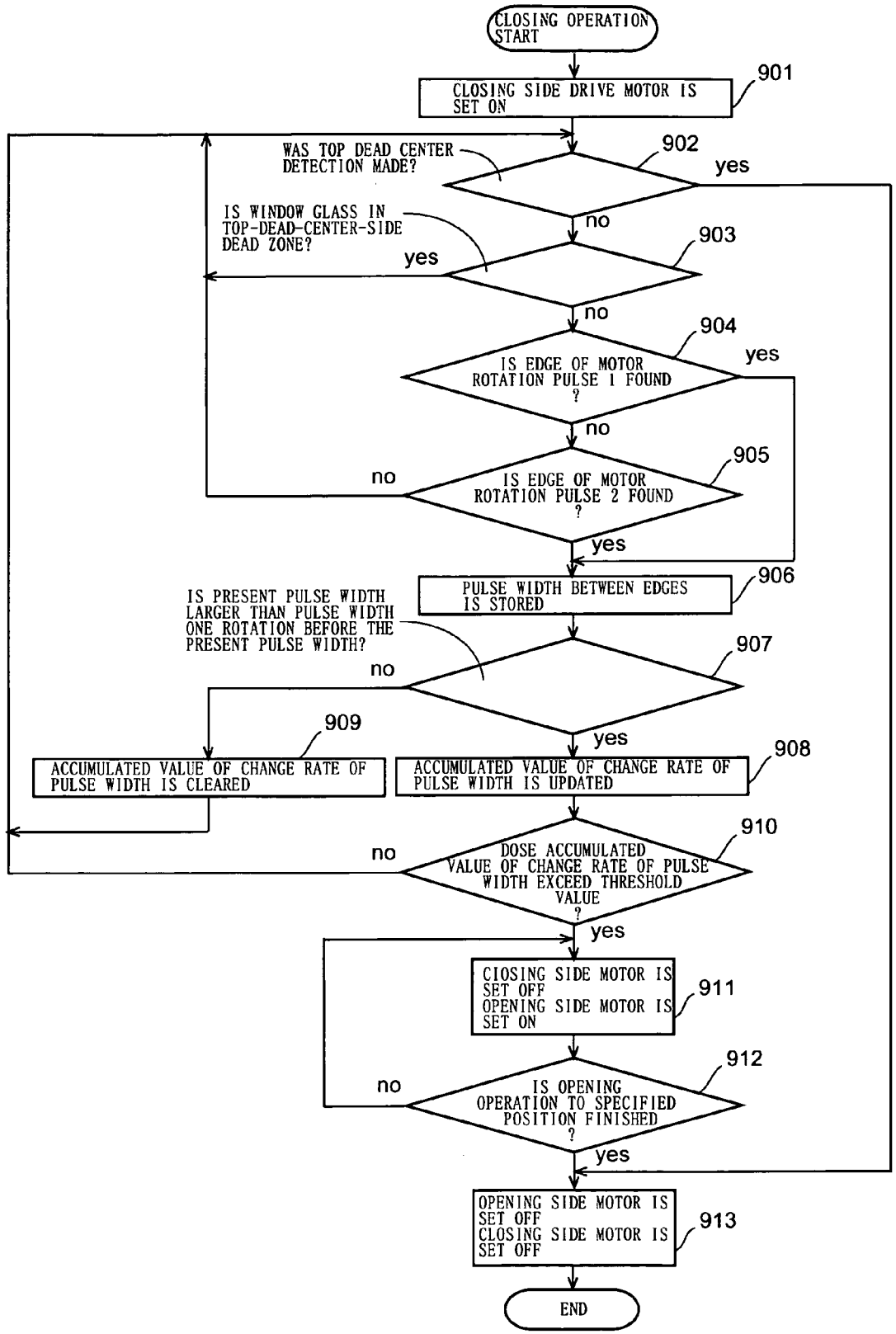
FIG. 30 shows a flowchart of operation of the control device of an example of the best mode for carrying out the invention.

FIG. 30 shows by a flowchart still another example of operation of the control device 300. The operation is substantially operation of the CPU 302. As shown in FIG. 30, a closing side motor is set ON in step 901. The ON setting of the closing side motor is performed in response to operation of the switch 310 in a direction of closing the window 100. The ON setting of closing side motor means that the raising/lowering motor 202 is driven in the direction of closing the window 100. Thus, raising of the window glass 102 is started.

In step 902, whether top dead center detection is made is determined. The top dead center detection is detection of a state where the window glass 102 reaches the top dead center. When the top dead center detection is made, the opening side motor is set OFF and the closing side motor is set OFF respectively in step 913.

When determination on the top dead center detection in the step 902 is made as no, whether the window glass is in a top-dead-center dead zone area is determined in step 903. The top-dead-center dead zone is a dead zone set from a position slightly short of the top dead center to the top dead center, which is not an object of detection and avoidance of pinching. When the window glass is in the top-dead-center dead zone area, processing is returned to the top dead center detection in the step 902.

When the window glass is not in the top-dead-center dead zone area, whether an edge of a motor rotation pulse 1 is found is determined in step 904. When the edge of the motor rotation pulse 1 is not found, whether an edge of a motor rotation pulse 2 is found is determined in step 905. When the edge of the motor rotation pulse 2 is also not found, processing is returned to the step 902.

Figure 31:
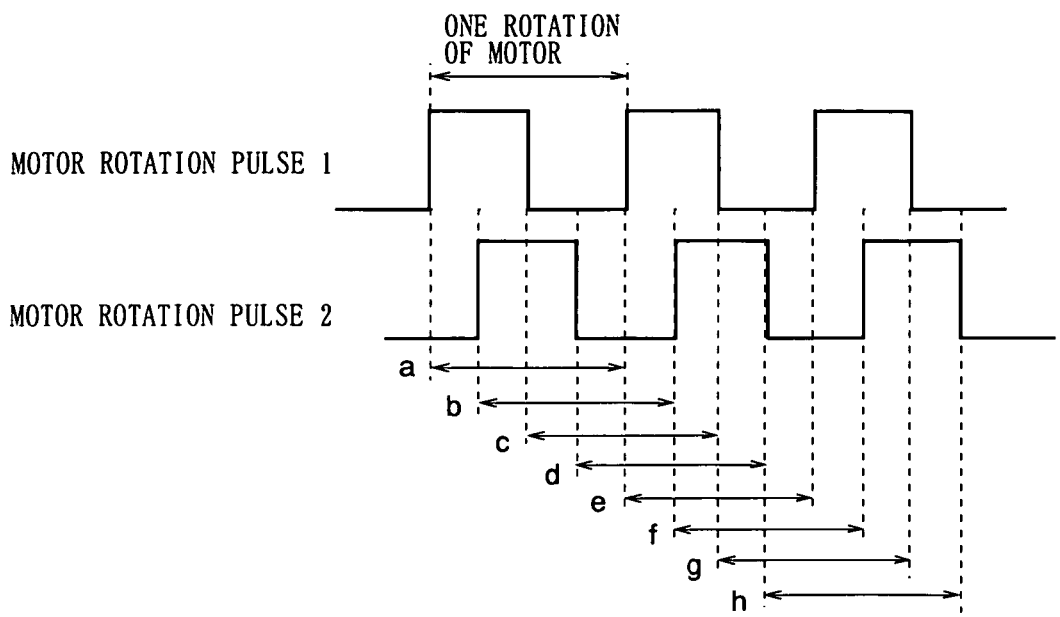
FIG. 31 shows a time chart in pulse width detection.

The motor rotation pulses 1 and 2 are, for example, output pulses of the Hall elements 36b and 36c of the pulse generator 306, which are biphasic pulse having phase difference of 90 degrees as shown in FIG. 31. A cycle of each of the motor rotation pulses 1 and 2 corresponds to one rotation of a motor. It is noted that a plurality of cycles may correspond to one rotation of a motor in the motor rotation pulses 1 and 2.

Each of the motor rotation pulses 1 and 2 has rising edges and trailing edges in timing as shown by broken lines. An edge interval through the motor rotation pulses 1 and 2 is a quarter cycle.

When the edge of either pulse is detected in the step or 905, pulse width between edges is stored in step 906. As the pulse width to be stored, an interval between a rising edge to a next rising edge, and an interval between a trailing edge to a next trailing edge of each pulse are stored. Such pulse width is obtained every quarter cycle. The CPU 32 that stores the pulse width between the edges in the step 906 is an example of pulse width measurement means of the invention.

In step 907, whether present pulse width is larger than pulse width one rotation before the present pulse width is determined. A value of the present pulse width may be compared with a value of pulse width several rotations before the present pulse width without being limited to one rotation. When determination is made as yes, an accumulated value of change rates of pulse width is updated in step 908. The CPU 32 that updates the accumulated value of pulse width change rate is an example of change measurement means of the invention. When determination is made as no in the step 907, the accumulated value of change rates of pulse width is cleared in step 909, and processing is returned to the step 902.

When the accumulated value of change rates of pulse width is updated in the step 908, whether the accumulated value of change rates of pulse width exceeds a threshold value is determined in step 910. When determination is made as no, processing is returned to the step 902.

When it is determined that the accumulated value of change rates of pulse width exceeds the threshold value, the closing side motor is set OFF and the opening side motor is set ON in step 911. The ON setting of opening side motor means that the raising/lowering motor 202 is driven in a direction of opening the window 100. Thus, lowering of the window glass 102 is started.

Whether opening operation to a specified position is finished is determined in step 912, and when the opening operation to the specified position is finished, the opening side motor is set OFF, and the closing side motor is set OFF in step 913. In this way, pinching avoidance is performed based on the threshold value.

A pulse width signal to be compared to the threshold value is obtained every quarter cycle. Therefore, whether the accumulated value of change rates of pulse width exceeds the threshold value in step 910 is determined with high time resolution. Consequently, pinching detection can be promptly performed, in addition, pinching avoidance can be promptly performed.

While the control device for a power window of a car has been described hereinbefore, the control device of the invention can be applied to control of not only the power window of the car, but also any component having a structure for opening and closing an opening with a movable plate, such as sunroof and sliding door.

Figure 32:
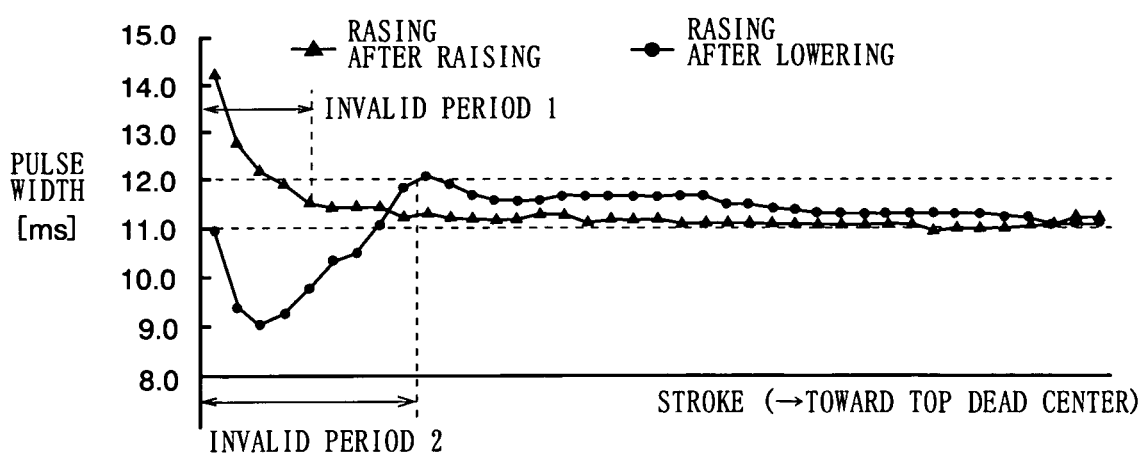
FIG. 32 shows a graph showing an example of change in pulse width during raising of the window glass.

FIG. 32 shows by a graph an example of change in pulse width during raising of a window glass. In FIG. 32, a plot with Δ shows a graph of raising after raising, and a plot with • shows a graph of raising after lowering. As shown in FIG. 32, in raising after raising, pulse width is monotonously decreased at the start of raising and stabilized in a short time. On the contrary, in raising after lowering, pulse width is stabilized through a process that the pulse width is temporarily abruptly decreased at the start of raising and then abruptly increased.

An initial stage of raising of the window glass, which is a period in which pulse width is largely changed, is considered to be an invalid period, and therefore considered to be not an object of pinching avoidance. The invalid period includes an invalid period 1 for raising after raising, and an invalid period 2 for raising after lowering. Between them, the invalid period 2 is large in variation for each power window, in addition, longer than the invalid period 1. Thus, learning of the invalid period 2 is performed to appropriately achieve invalidation of pinching avoidance.

Figure 33:
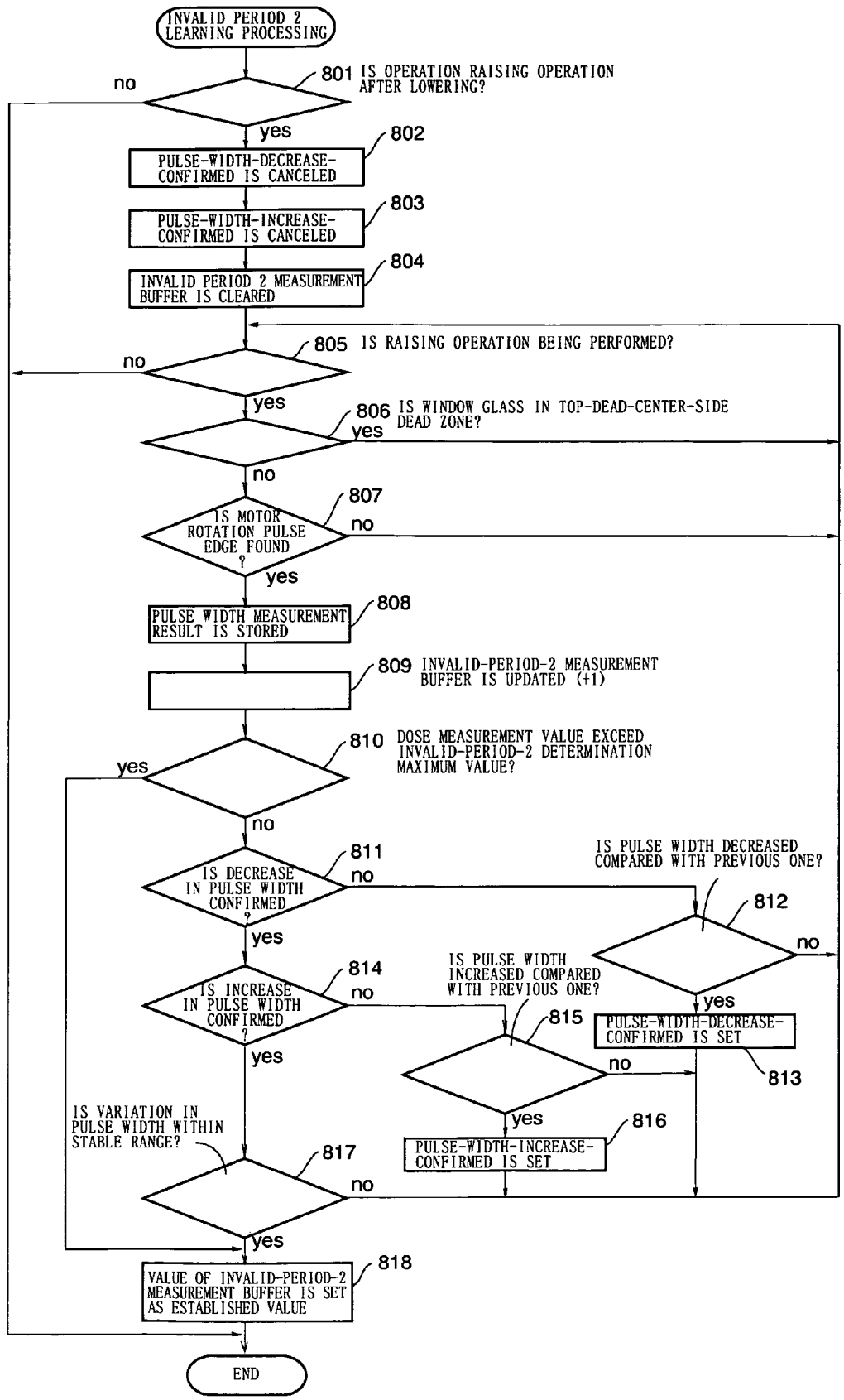
FIG. 33 shows a flowchart of operation of a control device of an example of the best mode for carrying out the invention.

Description is made on operation of the control device 300 when learning of the invalid period 2 is performed. FIG. 33 shows by a flowchart an example of operation of the control device 300. The operation is substantially operation of the CPU 302. As shown in FIG. 33, whether operation is raising operation after lowering is determined in step 801. When determination is made as no, learning is finished. When determination is made as yes, pulse-width-decrease-confirmed is canceled in step 802, pulse-width-increase-confirmed is canceled in step 803, and invalid-period-2 measurement buffer is cleared in step 804. The invalid-period-2 measurement buffer, which is a buffer for keeping a measurement value of the invalid period 2, is cleared and thus the measurement value is initialized to be 0.

In step 805, whether raising operation is being performed is determined. When determination is made as no, learning is finished. When determination is made as yes, whether the window glass is in a top-dead-center-side dead zone is determined in step 806. The top-dead-center-side dead zone is a dead zone set from a position slightly short of the top dead center to the top dead center, which is not an object of detection and avoidance of pinching. When the window glass is in the top-dead-center-side dead zone, processing is returned to the step 805.

When the window glass is not in the top-dead-center-side dead zone, whether a motor rotation pulse is found is determined in step 807. When determination is made as no, processing is returned to the step 805. When determination is made as yes, pulse-width measurement result storage is performed in step 808, and invalid-period-2 measurement buffer update (+1) is performed in step 809. Thus, a measurement value of the invalid period 2 is incremented by 1.

In step 810, whether the measurement value exceeds an invalid-period-2 determination maximum value is determined. For the invalid period 2, the maximum value is previously set. When determination is made as yes, a value in the invalid-period-2 measurement buffer is set as an established value in step 818. When determination is made as no, whether decrease in pulse width is confirmed is determined in step 811.

Since pulse-width-decrease-confirmed was canceled in step 802, determination is made as no. Thus, whether pulse width is decreased compared with a previous case is determined in step 812. When determination is made as no, processing is returned to the step 805. When determination is made as yes, pulse-width-decrease-confirmed setting is performed in step 813, and then processing is returned to the step 805.

The invalid-period-2 measurement buffer obtains a measurement value 1 through operation until here. After that, operation of steps 805 to 811 is performed as above. In such a case, determination in the step 811 is made as yes, therefore whether increase in pulse width is confirmed is determined in step 814.

Since pulse-width-increase-confirmed was canceled in step 803, determination is made as no. Thus, whether pulse width is increased compared with a previous case is determined in step 815. When determination is made as no, processing is returned to the step 805. The invalid-period-2 measurement buffer obtains a measurement value 2 through operation until here. In a period in which pulse width is not increased, operation of steps 805 to 815 is repeated, thereby a count value of the invalid-period-2 measurement buffer is incremented by 1.

The pulse width is changed to be increased in a short time. In such a case, since determination in the step 815 is made as yes, pulse-width-increase-confirmed setting is performed in step 816, and then processing is returned to the step 805. After that, operation of steps 805 to 814 is performed as above.

In such a case, since determination in the step 814 is made as yes, whether variation in pulse width is within a stable range is determined in step 817. The determination is performed by comparing the variation in pulse width to a predetermined threshold value. When a value of the variation in pulse width is not larger than the threshold value, the variation is determined to be within the stable range, and in other cases, the variation is determined to be out of the stable range.

When the variation in pulse width is not within the stable range, processing is returned to the step 805. In a period in which the variation in pulse width is not within the stable range, operation of steps 805 to 817 is repeated, thereby a count value of the invalid-period-2 measurement buffer is incremented by 1.

The variation in pulse width is stabilized in a short time. In such a case, since determination in the step 817 is made as yes, a count value of the invalid-period-2 measurement buffer is set as an established value in the step 818. Thus, the measurement value of the invalid period 2 is established and learning is finished.

The established measurement value is stored in the memory 312. When at least part of the memory 312 is formed as a nonvolatile memory such as EEPROM, and the established measurement value is stored therein, the stored contents are not lost even if loss of power or the like occurs. The memory 312 is an example of storage means of the invention.

Such learning is performed for each power window, thereby an invalid period 2 suitable for each power window can be obtained. The learning is performed, for example, before shipment or during periodic inspection of a car and the like. The learning may be performed by a user or the like as needed.

Figure 34:
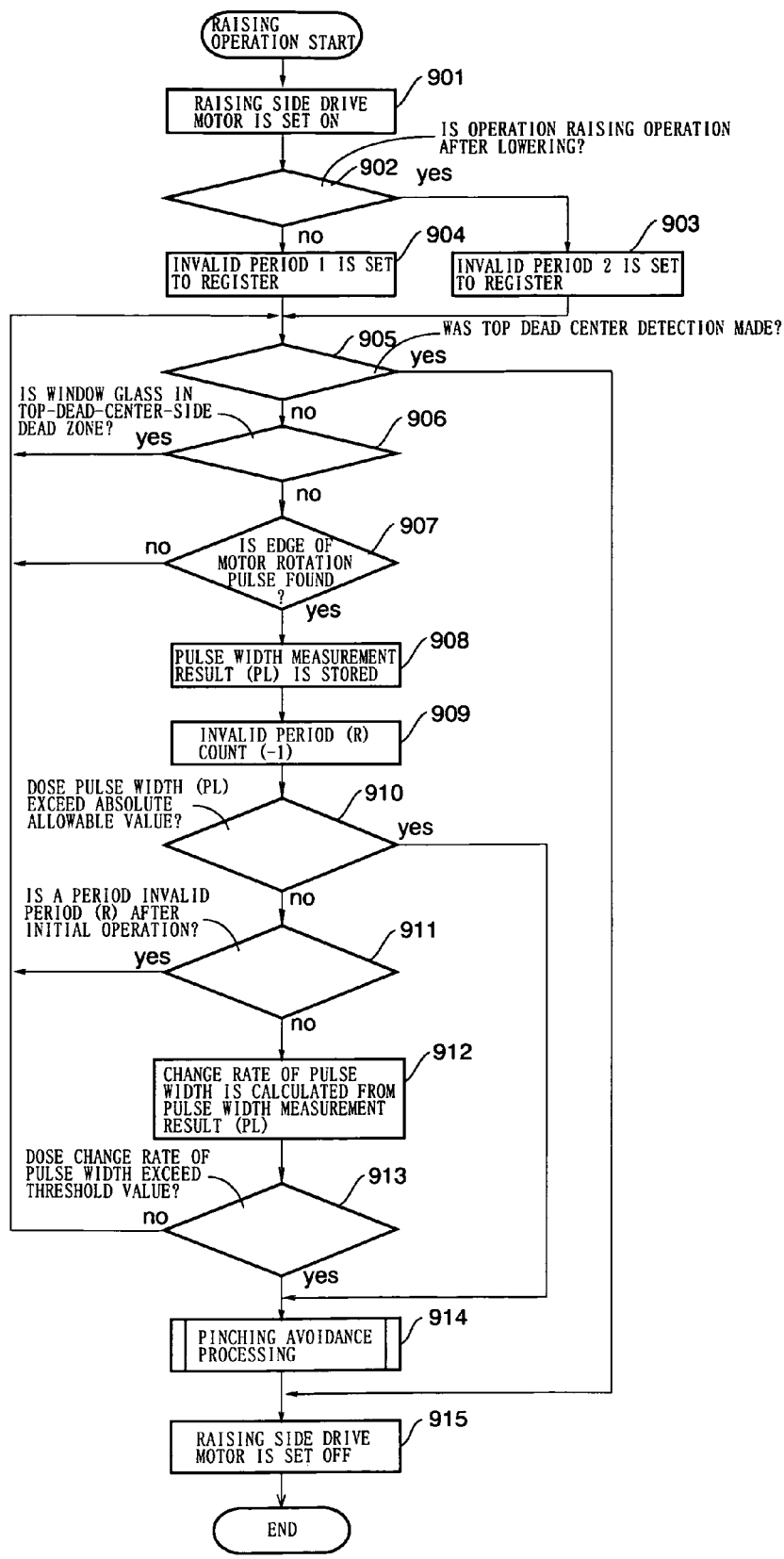
FIG. 34 shows a flowchart of operation of the control device of an example of the best mode for carrying out the invention.

Description is made on operation of the control device 300 using a learning value of the invalid period 2. FIG. 34 shows by a flowchart an example of operation of the control device 300. The operation is substantially operation of the CPU 302.

As shown in FIG. 34, a raising side drive motor is set ON in step 901. The ON setting of raising side drive motor is performed in response to operation of the switch 310 in a direction of closing the window 100. The ON setting of raising side drive motor means that the raising/lowering motor 202 is driven in a direction of closing the window 100. Thus, raising of the window glass 102 is started.

In step 902, whether operation is raising operation after lowering is determined. When determination is made as yes, invalid period 2 setting is performed in step 903. For the invalid period 2 setting, the established value of the invalid-period-2 measurement buffer obtained through the above learning is used. The invalid period 2 setting is performed to a register.

When determination is made as no, operation is raising operation after raising. In such a case, invalid period 1 setting is performed in step 904. For the invalid period 1 setting, a previously prepared setting value is used. It is noted that the invalid period 1 setting may be performed based on a result of learning. Learning of the invalid period 1 can be performed according to the procedure described before.

In step 905, whether top dead center detection was made is determined. The top dead center detection is detection of a state where the window glass 102 reaches the top dead center. When determination is made as no, whether the window glass is in a top-dead-center-side dead zone is determined in step 906. When the window glass is in the top-dead-center-side dead zone, processing is returned to the step 905.

When the window glass is not in the top-dead-center-side dead zone, whether a motor rotation pulse edge is found is determined in step 907. When determination is made as no, processing is returned to the step 905. When determination is made as yes, pulse width measurement result (PL) storage is performed in step 908, invalid period (R) count (-1) is performed in step 909, and whether a value of pulse width (PL) exceeds an absolute allowable-value is determined in step 910.

The absolute allowable-value is, for example, a pulse width corresponding to overload of the raising/lowering motor 202, and a fact that a pulse width exceeds such pulse width means some abnormal situation. Thus, in such a case, pinching avoidance processing is performed in step 914, and the raising side drive motor is set OFF in step 915. In this way, the control device copes with an exceptional event.

When the pulse width (PL) does not exceed the absolute allowable-value, whether a period is an invalid period (R) after initial operation is determined in step 911, and when determination is made as yes, processing is returned to the step 905. In a period in which the value of the pulse width (PL) does not exceed the absolute allowable-value, and a period is the invalid period (R) after initial operation, operation of the steps 905 to 911 is repeated.

Thus, invalid period (R) count is decremented by 1 every time when the operation is repeated, and the invalid period (R) count becomes below 0 in a short time. At that time, since a period is not the invalid period (R) after initial operation, determination in the step 911 is made as no.

Thus, a change rate of pulse width is calculated based on the pulse width measurement result (PL) in step 912, and whether the change rate of pulse width exceeds a threshold value is determined in step 913. When the change rate of pulse width does not exceed a threshold value, processing is returned to the step 905. When the change rate of pulse width exceeds a threshold value, pinching avoidance processing is performed in step 914, and the raising side drive motor is set OFF in step 915.

In this way, the pinching avoidance processing is invalidated during the invalid period in the initial stage of raising of the window glass 102, and validated after the invalid period has passed. Since the invalid period is set based on learning, pinching avoidance invalidation control being optimal for each power window can be performed.

The CPU 302 that performs operation shown in the flowchart of FIG. 33 is an example of setting means of the invention. The CPU 302 that performs operation shown in the flowchart of FIG. 34 is an example of invalidation means of the invention.

While the control device for a power window of a car has been described hereinbefore, the control device of the invention can be applied to not only control of the power window of the car, but also control of any component having a structure for opening and closing an opening with a movable plate, such as sunroof and sliding door.

Figure 35:
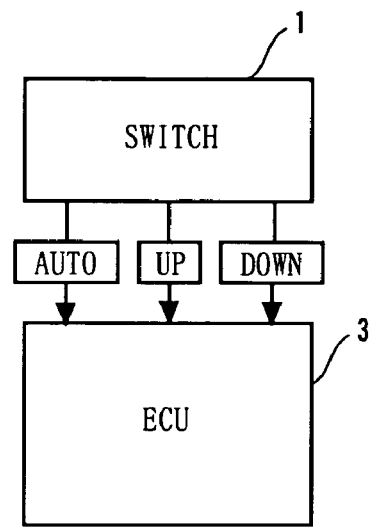
FIG. 35 shows a block diagram of the control device of an example of the best mode for carrying out the invention.

FIG. 35 shows a block diagram of a power window. As shown in FIG. 35, the device has a switch 1 and ECU (Electronic Control Unit) 3. The switch 1, which is operated by a user, generates an AUTO signal, an UP signal, and a DOWN signal. The AUTO signal is a signal for instructing power window control with pinching prevention, UP signal is a signal for instructing raising of a window glass, and DOWN signal is a signal for instructing lowering of the window glass.

The ECU 3 performs control with pinching prevention to the power window in an automatic mode. The ECU 3 is configured by LSI and the like. The ECU 3 detects occurrence of pinching by comparing a detection signal from a pinching sensor to a threshold value. The detection signal from the pinching sensor is a signal showing a load condition of a motor for raising and lowering the window glass. As such a detection signal, for example, a signal corresponding to rotational frequency of the motor, or a signal corresponding to a motor drive signal is used.

The ECU 3 has a function of detecting opening and closing of a door based on an on/off signal from a courtesy switch or the like. The ECU 3 further has means for adjusting the threshold value for pinching determination in accordance with an opening and closing state of the door. The means is an example of adjusting means of the invention.

Figure 36:
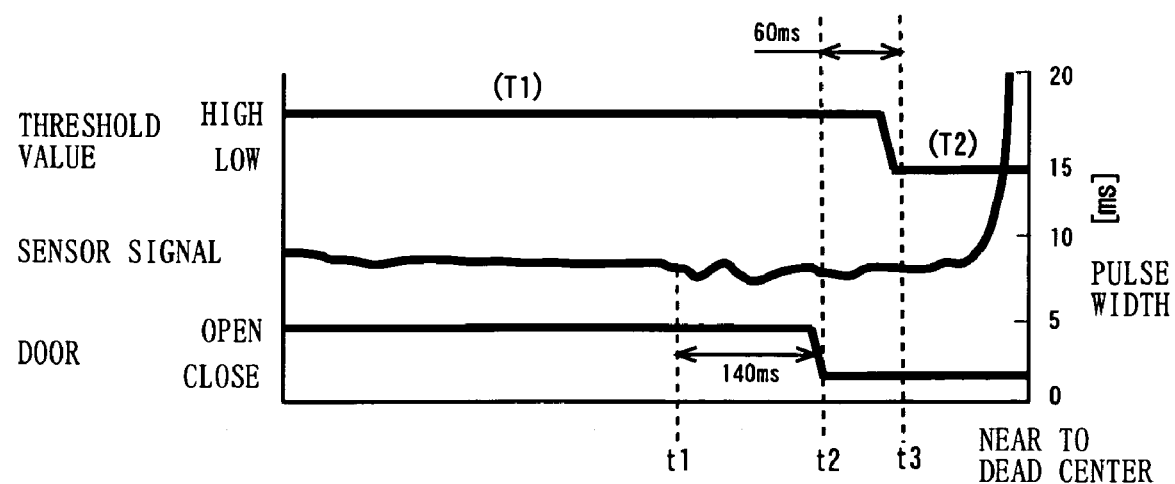
FIG. 36 shows a diagram showing an example of adjustment of a threshold value.

FIG. 36 shows an example of threshold value adjustment. FIG. 36 is a time chart showing transition of a door opening/closing detection signal, detection signal from the pinching sensor, and threshold value for the detection signal when the door is closed during raising of the window glass in the automatic mode. Hereinafter, the detection signal from the pinching sensor may be called sensor signal.

In FIG. 36, times t1, t2 and t3 show timing of door closing, door closing detection, and threshold value change respectively. Variation in sensor signal begins at the time t1 due to shock, vibration or the like in door closing. The door closing detection is performed at the time t2 being delayed from actual closing due to a positional relationship between the door and the courtesy switch, a signal transmission characteristic and the like. The delay time is, for example, about 140 msec. The threshold value change is performed at the time t3 being delayed by a specified time from the door closing detection. The specified time to be delayed is, for example, about 60 msec.

Initially, the threshold value is a large value T1, and the value is changed into a small value T2 at the time t3. T1 is a relatively high threshold value. Such a value is, for example, 17.5 msec in terms of pulse width. T2 is a typical threshold value. Such a value is, for example, 15 msec in terms of pulse width. Values of T1 and T2 are not limited to these, and may be appropriate values respectively.

In this way, since the threshold value is set to be the large value T1 in a period in which door closing is not detected, sensitivity of pinching detection is relatively low in the period. Therefore, even if variation in sensor signal begins before door closing detection due to delay in door closing detection, the sensor does not misunderstand the variation as occurrence of pinching. Consequently, false reverse-movement of a window glass does not occur.

For the threshold value, since the large value T1 is kept for a specified time (for example, 60 msec) even after the door closing detection, the sensitivity of pinching detection is still relatively low in such a period. Therefore, even if the sensor signal is continuously varied in the period, the sensor does not misunderstand the variation as pinching. Consequently, false reverse-movement of the window glass does not occur. The specified time is not limited to 60 msec, and may be a time having an appropriate length.

The threshold value is changed into the small value T2 at the time t3 when variation in sensor signal is sufficiently stabilized, and thereafter the sensitivity of pinching detection is changed into typical sensitivity, namely relatively high sensitivity. Thus, while pinching that occurs thereafter is correctly detected, the window glass can be reversely moved.

Figure 37:
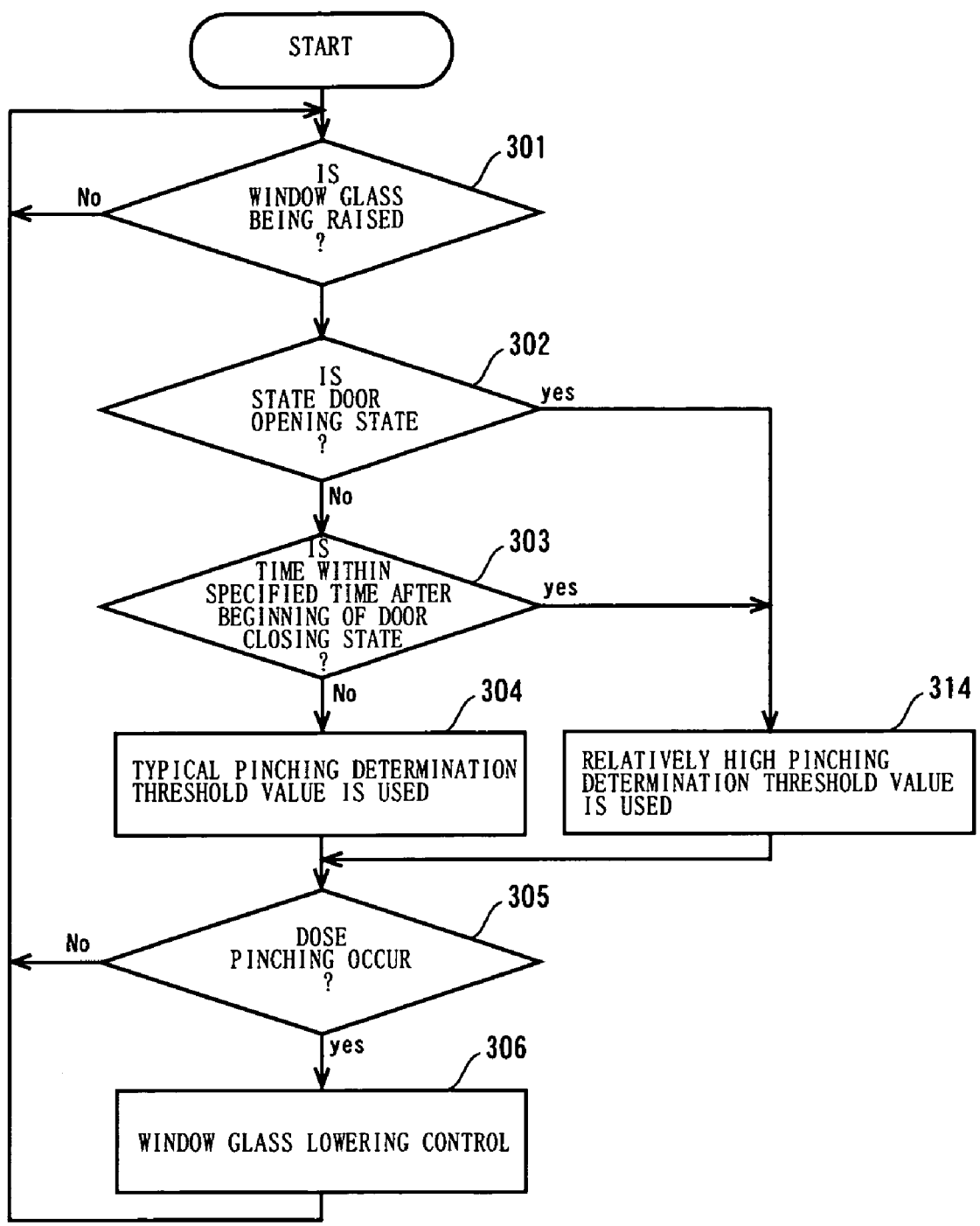
FIG. 37 shows a flowchart of operation of a control device of an example of the best mode for carrying out the invention.

FIG. 37 shows a flowchart of operation of the device. As shown in FIG. 37, whether the window glass is being raised is determined in step 301. When the window glass is not being raised, looping is performed in the step, and when the window glass is being raised, whether a state is a door opening state is determined in step 302.

When the state is not the door opening state, whether time is within a specified time after beginning of a door closing state is determined in step 303. The specified time is, for example, 60 msec. When it is not within the specified time, the typical pinching determination threshold value is used in step 304. The typical pinching determination threshold value is T2. Then, with the threshold value T2 as a reference, whether pinching occurs is determined in step 305. Thus, relatively highly sensitive pinching determination is performed.

When it is determined that pinching does not occur, processing is returned to the step 301. When it is determined that pinching occurs, window glass lowering control is performed in step 306. Thus, the window glass is reversely moved according to relatively highly sensitive pinching detection.

When it is determined that a state is the door opening state in step 302, the relatively high pinching determination threshold value is used in step 314. The relatively high pinching determination threshold value is T1. Then, with the threshold value T1 as a reference, whether pinching occurs is determined in step 305.

Thus, pinching determination is performed with relatively low sensitivity compared with the typical sensitivity. Therefore, even if the sensor signal is varied in door closing, the sensor does not misunderstand the variation as occurrence of pinching. Therefore, it is possible that processing is returned to the step 301, so that whether the window glass is being raised is continuously determined. In this way, stable raising of the window glass can be performed without being affected by variation in sensor signal in door closing.

Similarly, when it is determined that time is within the specified time after beginning of the door closing state in the step 303, the relatively high pinching determination threshold value, namely, the threshold value T1 is used in the step 314. Then, with the threshold value T1 as a reference, whether pinching occurs is determined in the step 305. Thus, pinching determination is performed with relatively low sensitivity. Therefore, it is possible that processing is returned to the step 301, so that whether the window glass is being raised is continuously determined without misunderstanding variation in sensor signal in door closing as occurrence of pinching. In this way, stable raising of the window glass can be performed without being affected by variation in sensor signal in door closing.

While an example that a value of a sensor signal is increased with increase in load was shown in the above, the value of the sensor signal may be decreased with increase in load. In such a case, a threshold value can be decreased to relatively increase pinching detection sensitivity, and the threshold value can be increased to relatively decrease the pinching detection sensitivity.

The invention claimed is:

1. A safety device for power window, characterized by having:

a raising/lowering motor that raises or lowers a window glass of a vehicle, an operational switch that provides a positive or negative rotation instruction to the raising/lowering motor, a pulse generator that generates repetitive pulses in accordance with the amount of rotation of the raising/lowering motor, a window position counter that counts the pulses generated by the pulse generator to obtain opening information of the window glass, a pulse width detector that detects pulse width of each pulse generated by the pulse generator, a calculation unit that extracts predetermined, particular two kinds of pulse width from a plurality of kinds of pulse width detected by the pulse width detector, and calculates a change rate between the extracted, two kinds of pulse width while relating the change rate to window position information given by the window position counter, a storage unit that stores the change rate of pulse width calculated by the calculation unit in a certain reference setting condition, the change rate being related to the window position information, and a control unit that compares stored values of the change rate of pulse width stored by the storage unit, the change rate being related to the window position information, to calculation values of the change rate of pulse width calculated by the calculation unit respectively during raising operation of the window glass, the change rate being related to the window position information, and when the total of differences between both change rates of pulse width exceeds an allowable value, drives the raising/lowering motor in a direction of opening the window glass irrespectively of a state of the operational switch.

2. The safety device for power window according to claim 1:

wherein the control unit regularly updates storage of pulse width into the storage unit.

3. The safety device for power window, characterized by having:

a raising/lowering motor that raises or lowers a window glass of a vehicle, an operational switch that provides a rotation instruction for raising or lowering to the raising/lowering motor, a pulse generator that generates repetitive pulses in accordance with the amount of rotation of the raising/lowering motor, a window position counter that counts the pulses outputted by the pulse generator to obtain opening information of the window glass, a pulse width detector that detects width of each pulse generated by the pulse generator, a storage unit that stores each pulse width detected by the pulse width detector while relating the pulse width to window position information given by the window position counter during raising operation of the window glass in a reference condition, and a control unit that compares the pulse width measured by the pulse width detector during raising operation of the window glass, to reference pulse width corresponding to the window position information given by the window position counter, and when a difference between the two kinds of pulse width exceeds an allowable value, reversibly drives the raising/lowering motor in a direction of opening the window glass irrespectively of a state of the operational switch.

4. The safety device for power window according to claim 3:

wherein the window position counter counts the pulses generated by the pulse generator every half cycle of the pulses, the pulse width detector detects half cycle width of the pulses, and the storage unit stores the pulse width obtained in the half cycle of the pulses while relating the pulse width to the window position information.

5. The safety device for power window according to claim 3 or 4:

wherein storage of the pulse width in the reference condition and the window position information into the storage unit is performed regularly or when update switch means is operated.

6. The safety device for power window according to claim 1 or 3, characterized by having:

a raising/lowering motor that raises or lowers a window glass of a vehicle door, in which a rotor having a plurality of irregularities with constant intervals on an outer circumferential face of the rotor is provided on a rotating shaft of the motor, an operational switch that provides a positive or negative rotation instruction to the raising/lowering motor, light emitting means that emit light to the outer circumferential face of the rotor, pulse generation means that receives reflected light from the outer circumferential face, and generates pulses depending on quantity of radiation of the reflected light, and control means that reversely rotates the raising/lowering motor to lower the window glass irrespectively of a state of the operational switch based on a cycle of the pulses generated by the pulse generation means during raising operation of the window glass.

7. The safety device for power window according to claim 6:

wherein the rotor is formed of resin material by molding.

8. The safety device for power window according to claim 6:

wherein the rotor is formed of metal material by molding.

9. The safety device for power window according to claim 6:

wherein a light-reflective layer is provided on at least a convex portion in the outer circumferential face.

10. The safety device for power window according to claim 6:

wherein the light emitting means are disposed with constant angular intervals with respect to a central axis of the rotor, and have two light emitting sections that emit light to the outer circumferential face respectively.

11. The safety device for power window according to claim 1 or 3, characterized in that:

the control unit is operated such that when false pinching avoidance occurs in an automatic mode, the control unit moves the window glass in a direction of opening a window frame, and prohibits the automatic mode, when duration time of operation of a user reaches a predetermined time in a condition that the window frame is fully closed in a manual mode, the operation being for moving the window glass in a direction of closing the window frame, the control unit recovers the automatic mode, and when the operation is stopped before the window frame is fully closed, or the duration time of the operation is shorter than the predetermined time in the condition that the window frame is fully closed in the manual mode, the control unit moves the window glass in the direction of opening the window frame.

12. The safety device for power window according to claim 1 or 3, characterized in that:

the control unit is operated such that when false pinching avoidance occurs in an automatic mode, the control unit invalidates previous learning contents and moves the window glass in a direction of opening a window frame, and prohibits the automatic mode, the control unit starts learning for pinching avoidance with start of operation of a user for moving the window glass in a direction of closing the window frame in a manual mode, when duration time of the operation reaches a predetermined time in a condition that the window frame is fully closed in the manual mode, the control unit finishes the learning for pinching avoidance, and recovers the automatic mode, and in the manual mode, when the operation is stopped before the window frame is fully closed, or the duration time of the operation is shorter than the predetermined time in the condition that the window frame is fully closed, the control unit stops the learning, and moves the window glass in the direction of opening the window frame.

13. The safety device for power window according to claim 12, characterized in that:

the learning is learning in a learning area in a movement area of the window glass, the movement area being divided into two areas of the learning area and a non-learning area, and the movement of the window glass in the direction of opening the window frame is movement to the non-learning area.

14. The safety device for power window according to claim 1 or 3, characterized in that:

the control unit has detection means that detects a load condition of a motor for driving a movable plate, and control means that allows operation of pinching avoidance based on a comparison result between a first threshold value and a detection signal from the detection means in an automatic mode, and allows operation of pinching avoidance based on a comparison result between a second threshold value and the detection signal from the detection means in a manual mode.

15. The safety device for power window according to claim 14, characterized by having:

display means that displays pinching detection in the manual mode.

16. The safety device for power window according to claim 15, characterized by having:
cancelling means that cancels the display when an opening is fully closed.

17. The safety device for power window according to claim 14, characterized in that:
the control means concentrically controls at a place opening-and-closing devices being dispersedly disposed in a plurality of places.

18. The safety device for power window according to claim 14, characterized in that:
the control means increases the second threshold value when pinching avoidance is repeated in the manual mode.

19. The safety device for power window according to claim 18, characterized in that:
the control means does not allow operation of pinching avoidance after a repetition number of pinching avoidance reaches a predetermined number in the manual mode.

20. The safety device for power window according to claim 18, characterized by having:
storage means that stores history of pinching avoidance in the manual mode.

21. The safety device for power window according to claim 20, characterized by having:
erasing means that erases the history when an opening is fully closed.

22. The safety device for power window according to claim 14, characterized in that:
the detection means has
conversion means that converts rotational frequency of a motor for driving a movable plate into two-phase pulses having a phase difference of 90 degrees in which pulse width is inversely proportional to the rotational frequency,
pulse width measurement means that measures pulse width of the two-phase pulses at timing of each of rising and trailing edges of the two-phase pulses given by the conversion means respectively; and
change measurement means that measures change in pulse width of the measured two-phase pulses respectively.

23. The safety device for power window according to claim 22, characterized in that:
the change measurement means measures change in pulse width with respect to a pulse at least one cycle before the relevant pulse.

24. The safety device for power window according to claim 1 or 3, characterized in that:
the control unit has
invalidation means that invalidates pinching avoidance in an initial stage of movement of a movable plate in a direction opposite to a direction in which the movable plate has been moved, and
setting means that sets a period in which the pinching avoidance is invalidated through learning of the period.

25. The safety device for power window according to claim 24, characterized in that:
the setting means learns the period based on stability of rotational frequency of a motor for driving the movable plate.

26. The safety device for power window according to claim 25, characterized in that:
the stability is stability of rotational frequency that has temporarily increased and then decreased.

27. The safety device for power window according to claim 24, characterized by having:
storage means that stores the period.

28. The control device for power window according to claim 1 or 3, characterized in that:
the control unit has
adjustment means that adjusts the threshold value such that pinching detection sensitivity is relatively low in an opening state of the door, and the pinching detection sensitivity is relatively high in a closing state of the door.

29. The control device for power window according to claim 28, characterized in that:
the adjustment means keeps a threshold value to which the pinching detection sensitivity is relatively low until a predetermined time passes after the door is closed.

* * * * *